(12) United States Patent
Lochner et al.

(10) Patent No.: US 12,151,413 B2
(45) Date of Patent: Nov. 26, 2024

(54) PLASTIC COMPOSITE PANEL AND ASSOCIATED PRODUCTION METHOD

(71) Applicant: PREH GMBH, Bad Neustadt A.D. Saale (DE)

(72) Inventors: Peter Lochner, Wollbach (DE); Steffen Neubauer, Hohenroth (DE); Benedikt Rueckert, Bad Koenigshofen (DE); Martin Suennemann, Hoechheim (DE)

(73) Assignee: PREH GmbH, Bad Neustadt A.D. Saale (DE)

( * ) Notice: Subject to any disclaimer, the term of this patent is extended or adjusted under 35 U.S.C. 154(b) by 0 days.

(21) Appl. No.: 17/266,113

(22) PCT Filed: Aug. 7, 2020

(86) PCT No.: PCT/EP2020/072250
§ 371 (c)(1),
(2) Date: Feb. 5, 2021

(87) PCT Pub. No.: WO2021/023864
PCT Pub. Date: Feb. 11, 2021

(65) Prior Publication Data
US 2022/0305707 A1  Sep. 29, 2022
US 2023/0116914 A2  Apr. 13, 2023

(30) Foreign Application Priority Data

Aug. 8, 2019 (DE) .................... 10 2019 121 403.3
Jan. 22, 2020 (DE) .................... 10 2020 101 458.9
(Continued)

(51) Int. Cl.
B29C 45/14 (2006.01)
B29C 51/14 (2006.01)
(Continued)

(52) U.S. Cl.
CPC .... B29C 45/14811 (2013.01); B29C 45/1418 (2013.01); B29C 51/14 (2013.01);
(Continued)

(58) Field of Classification Search
None
See application file for complete search history.

(56) References Cited

U.S. PATENT DOCUMENTS 4,101,698 A * 7/1978 Dunning ........... B29C 45/14811
428/209
5,475,192 A 12/1995 Inagaki et al.
(Continued)

FOREIGN PATENT DOCUMENTS

DE  20 2009 011 177 U1  12/2010
DE  10 2012 003 412 A1  8/2013
(Continued)

OTHER PUBLICATIONS

Song, H. C. "Interior Trim Using Natural Korean Paper and Production Method Thereof". Espacenet. EPO. 2023 (Year: 2023).*
(Continued)

*Primary Examiner* — Farah Taufiq
*Assistant Examiner* — Jonathan B Woo
(74) *Attorney, Agent, or Firm* — Norman B. Thot

(57) ABSTRACT

A method for producing a plastic composite panel which is provided as a layer structure. The method includes providing a film layer structure comprising an adhesive layer which is arranged between two transparent plastic films. The film layer structure is pre-molded to assume an approximately final shape and is arranged in a molding tool so that a first main surface of the film layer structure is towards the molding surface of the molding tool and so that a cavity is formed between the second main surface of the film layer structure and a surface of the molding tool. The film layer
(Continued)

structure is then back-molded in a thermal molding method step while introducing a thermoplastic material into the cavity to provide the layer structure. A pre-molding and back-molding step, a rigidification of the thermoplastic layer, and a demolding of the layer structure is further performed.

13 Claims, 33 Drawing Sheets

(30) Foreign Application Priority Data

| Jan. 22, 2020 | (DE) | .................... | 10 2020 101 462.7 |
| Jan. 22, 2020 | (DE) | .................... | 10 2020 101 464.3 |
| Jun. 15, 2020 | (DE) | .................... | 10 2020 115 719.3 |

(51) Int. Cl.
  *B32B 7/023* (2019.01)
  *B32B 7/12* (2006.01)
  *B32B 27/08* (2006.01)
  *B29L 9/00* (2006.01)
  *B29L 31/30* (2006.01)

(52) U.S. Cl.
  CPC ............. *B32B 7/023* (2019.01); *B32B 7/12* (2013.01); *B32B 27/08* (2013.01); *B29C 2045/14237* (2013.01); *B29K 2995/0026* (2013.01); *B29L 2009/005* (2013.01); *B29L 2031/3005* (2013.01); *B32B 2250/02* (2013.01); *B32B 2307/412* (2013.01); *B32B 2307/414* (2013.01)

(56) References Cited

U.S. PATENT DOCUMENTS

| 6,382,448 | B1 | 5/2002 | Yuhara et al. |
| 9,987,907 | B1* | 6/2018 | Temchenko ........... B32B 27/285 |
| 2002/0009594 | A1* | 1/2002 | Smith ..................... B29C 51/14 |
| | | | 428/411.1 |
| 2002/0114930 | A1* | 8/2002 | Okamura ................ B32B 27/08 |
| | | | 428/195.1 |
| 2003/0178739 | A1* | 9/2003 | Tziovaras ............... B32B 38/10 |
| | | | 264/132 |
| 2009/0274922 | A1 | 11/2009 | Roys et al. |
| 2010/0080968 | A1* | 4/2010 | Mizuno ................... B32B 5/022 |
| | | | 428/205 |
| 2011/0305869 | A1 | 12/2011 | Pollak et al. |
| 2013/0127782 | A1 | 5/2013 | Lochner et al. |
| 2014/0302293 | A1* | 10/2014 | Takano ................ B32B 37/025 |
| | | | 428/447 |
| 2014/0376237 | A1 | 12/2014 | Hwang et al. |
| 2015/0016144 | A1 | 1/2015 | Keist et al. |
| 2016/0318222 | A1 | 11/2016 | Deckert et al. |
| 2020/0031034 | A1 | 1/2020 | Hattensperger et al. |

FOREIGN PATENT DOCUMENTS

| EP | 1 743 756 A1 | 1/2007 | |
| KR | 20130139483 A | * 12/2013 | ............. B29C 45/14 |
| WO | WO 2018/073111 A1 | 4/2018 | |

OTHER PUBLICATIONS

DIN 5033: "Farbmessung, Farbmaβzahlen", Part 3, pp. 1-5 (1992), English Machine Translation.

* cited by examiner

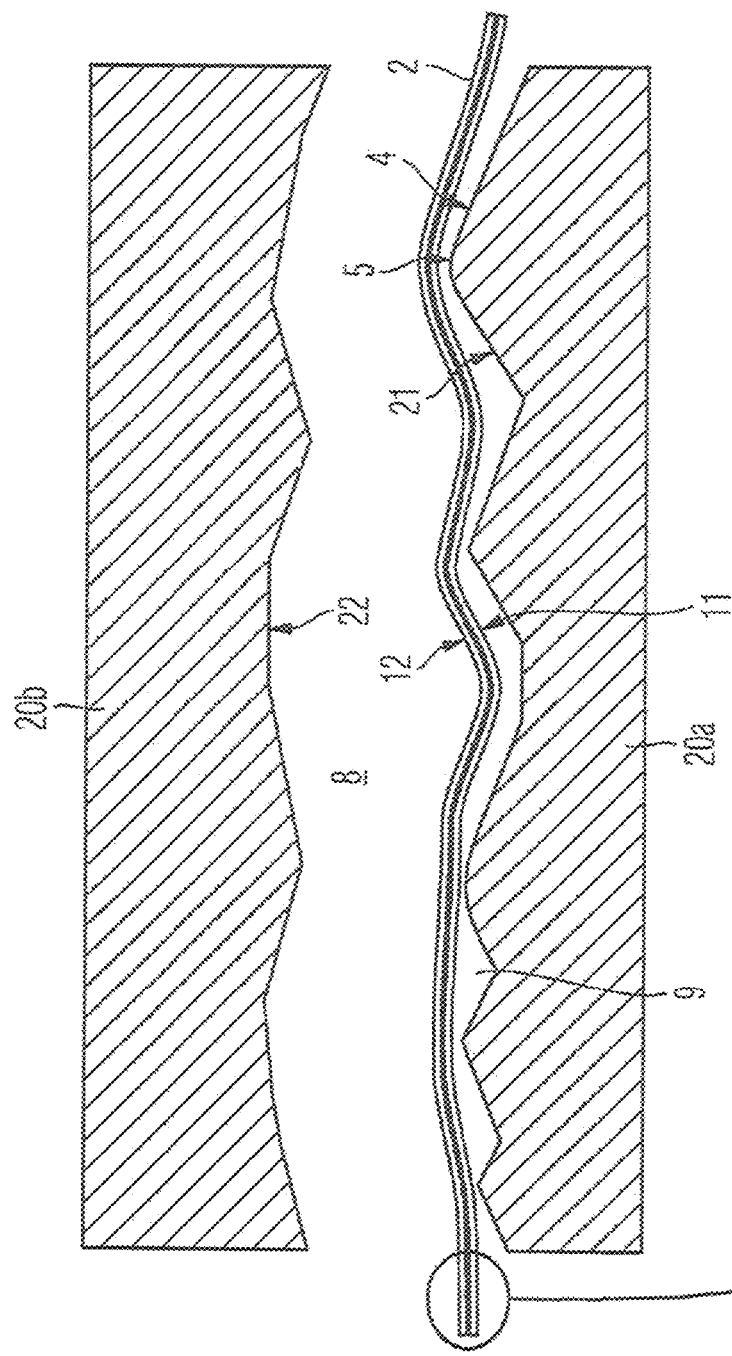
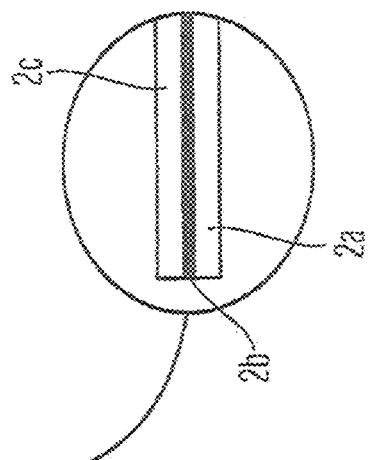
Fig. 1a
Fig. 1b

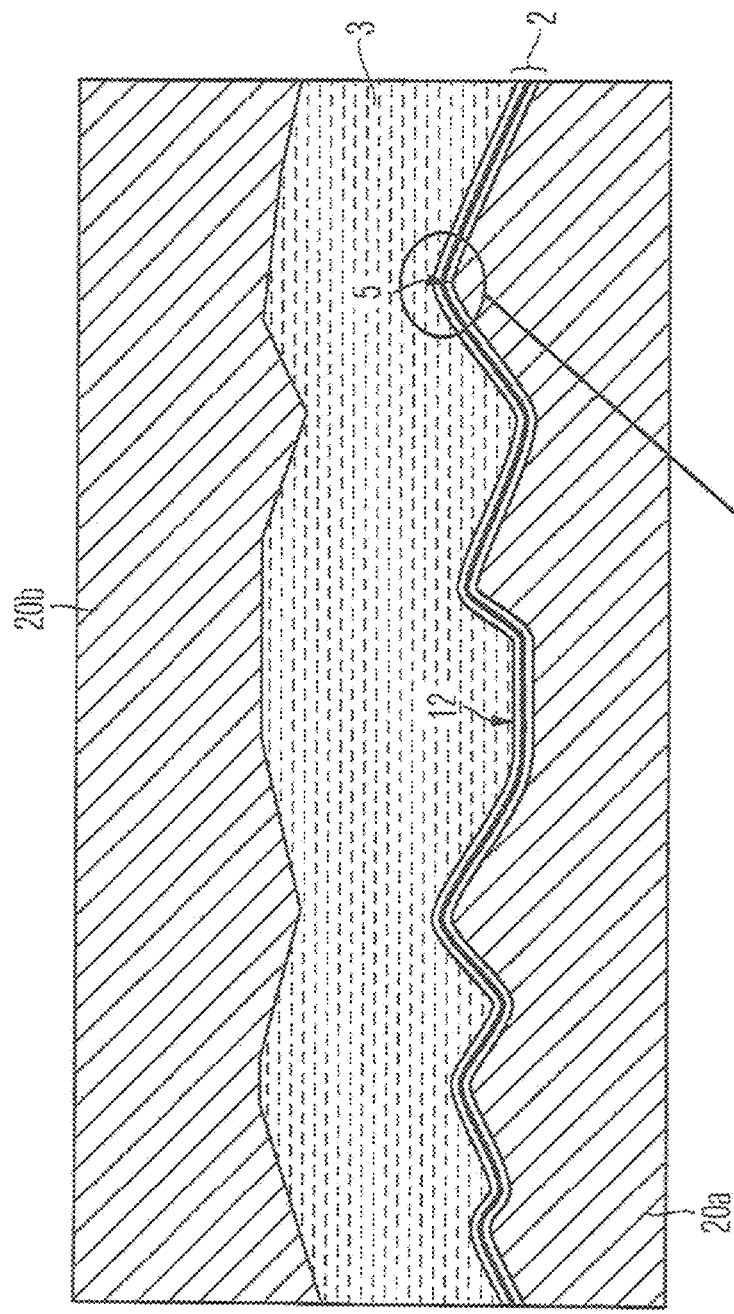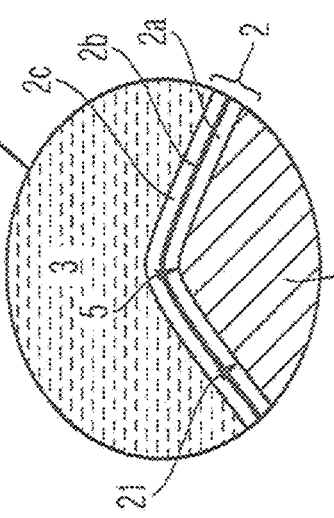

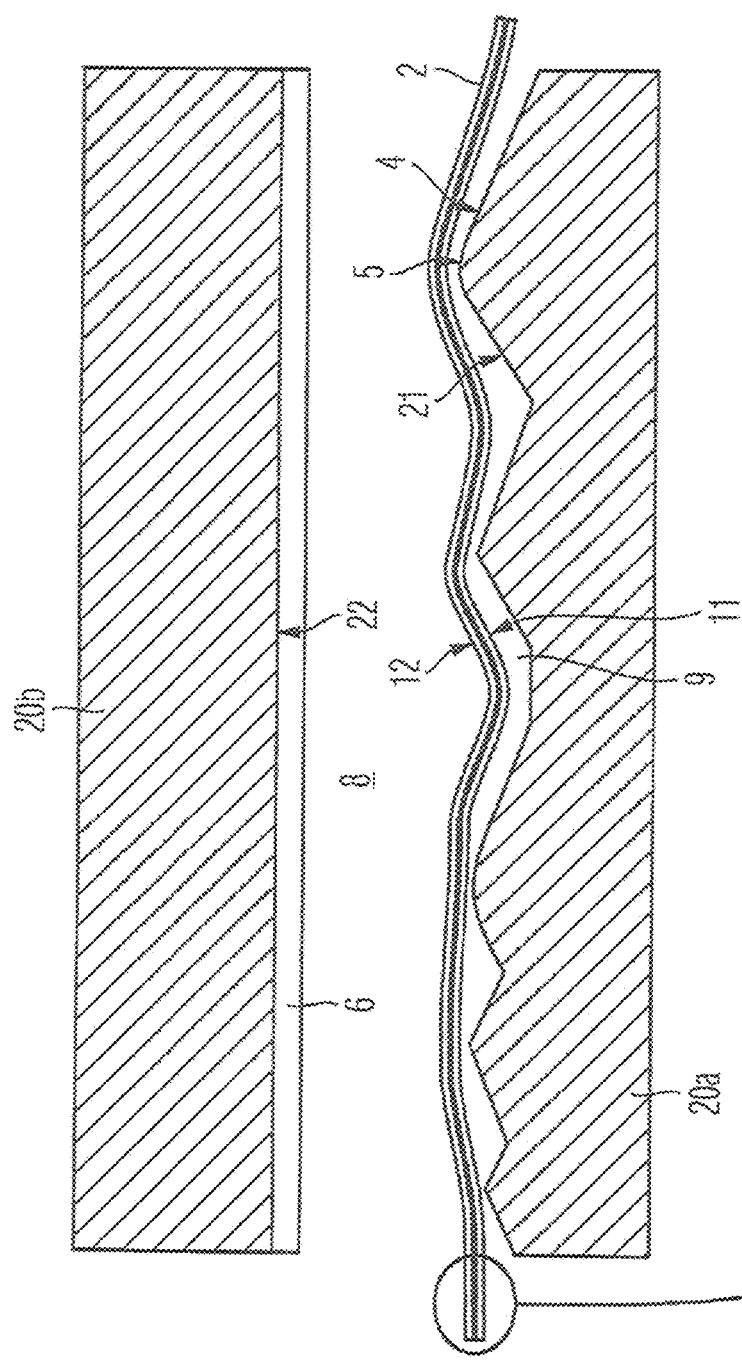
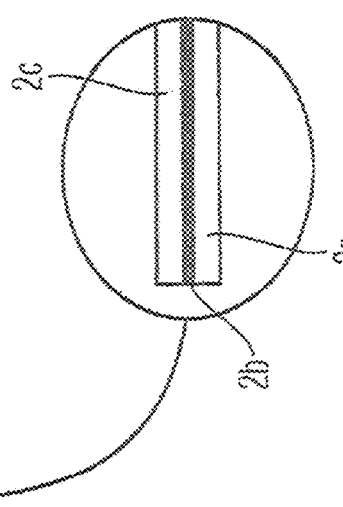
Fig. 6a
Fig. 6b

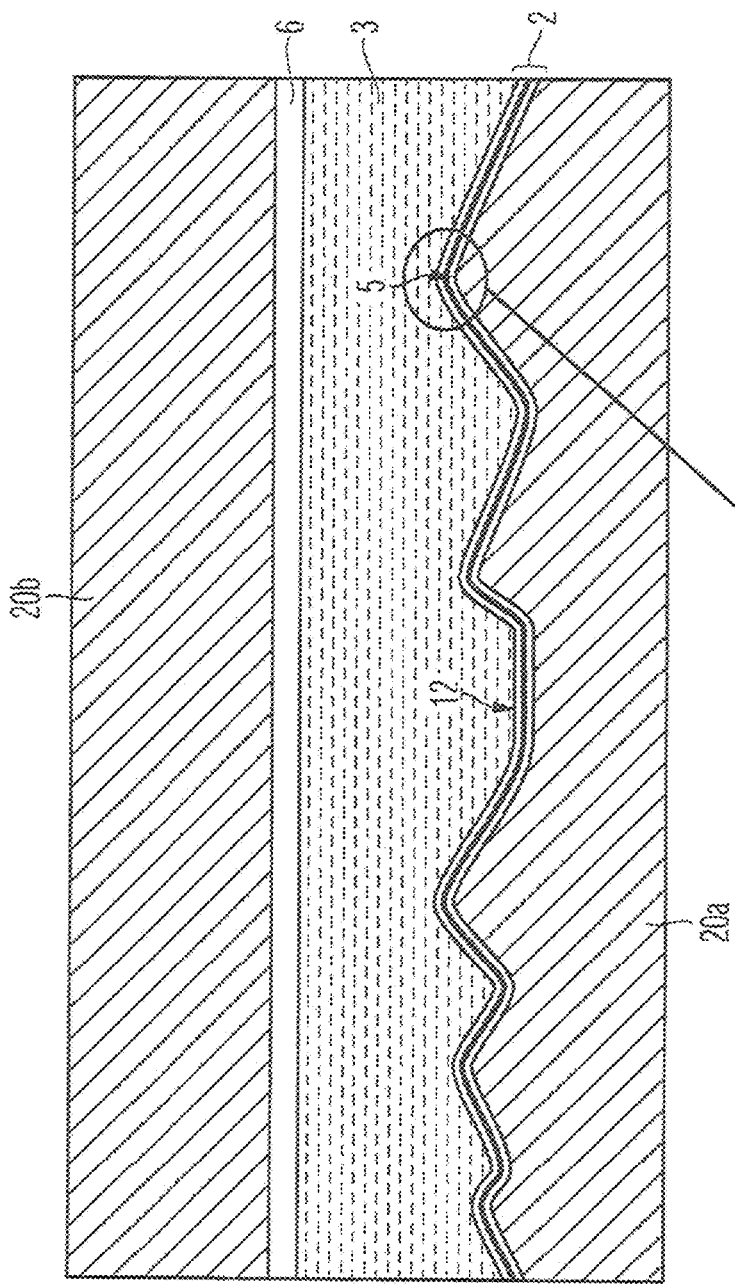
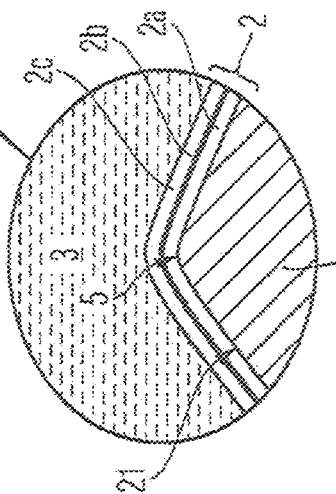
Fig. 8a
Fig. 8b

PLASTIC COMPOSITE PANEL AND ASSOCIATED PRODUCTION METHOD

CROSS REFERENCE TO PRIOR APPLICATIONS

This application is a U.S. National Phase application under 35 U.S.C. § 371 of International Application No. PCT/EP2020/072250, filed on Aug. 7, 2020 and which claims benefit to German Patent Application No. 10 2019 121 403.3, filed on Aug. 8, 2019, to German Patent Application No. 10 2020 101 458.9, filed on Jan. 22, 2020, to German Patent Application No. 10 2020 101 464.3, filed on Jan. 22, 2020, to German Patent Application No. 10 2020 101 462.7, filed on Jan. 22, 2020, and to German Patent Application No. 10 2020 115 719.3, filed on Jun. 15, 2020.

FIELD

The present invention relates to a plastic composite panel with a surface imitating the surface of a cut diamond, and to an associated production method.

BACKGROUND

At present, the use of panels consisting of glass materials is preferred for a variety of reasons. On the one hand, using glass, surfaces can be generated with high precision that imitate a cut surface of a diamond, on the other hand, such a glass surface is usually perceived as highly valuable by an observer due to the high transparency of the glass material and the pleasing appearance of the surface produced thereby. The comparatively expensive production and the weight of such panels is disadvantageous, particularly if the panel needs to have a certain thickness so that the three-dimensional surface contours resulting from the diamond structure can be integrated into the panel. On the other hand, the danger of breakage and the accompanying splintering results in a not inconsiderable risk of injury, so that the integration of panels that consist entirely or partially of glass materials into the region of the dashboard in motor vehicles is out of the question. The production of a panel from plastic bears the risk that the panel does not attain over the entire extent the uniform degree of transparency of a glass material panel, and that is has local clouded portions. In particular, the imitation of the sharp edge transitions necessary for an imitation of the diamond structure with a realistic appearance is most frequently unattainable and often makes the result appear visually unattractive.

SUMMARY

An aspect of the present invention is to provide a method for producing a generic plastic composite panel which is comparatively light, durable and which has a high-quality appearance which at least comes close to that of glass materials, and which is permanently dimensionally stable after production and in use.

The present invention provides a method for producing a plastic composite panel which is provided as a layer structure. The method includes providing a film layer structure comprising at least one adhesive layer which is made from an adhesive which is not fully solidified and which is transparent at least in a solidified state, and at least two transparent plastic films comprising at least one first outer plastic film and a second inner plastic film, at least one of the at least two transparent plastic films being translucently metallized. The at least one adhesive layer is arranged between the at least two transparent plastic films so as to connect the at least two transparent plastic films and to provide a first main surface and a second main surface which is arranged opposite to the first main surface The film layer structure is pre-molded so that the film layer structure assumes a shape which approximates a final shape. A molding tool comprising a molding surface and a surface which is arranged opposite to the molding surface is provided. The molding surface is arranged to form a plurality of three-dimensional contours formed from planar surfaces that are arranged at an angle with respect to each other and which adjoin each other in an edge. The pre-molded film layer structure is arranged in the molding tool so that the first main surface of the film layer structure is towards the molding surface of the molding tool and so that a cavity is formed between the second main surface of the film layer structure and the surface of the molding tool. The film layer structure is then back-molded in a thermal molding method step while introducing a thermoplastic material which is transparent at least in a rigid state into the cavity so as to provide the layer structure as a molded article. An adjacent arrangement of the first main surface of the film layer structure to the molding surface of the molding tool and a final shape of the film layer structure thereby replicates the plurality of three-dimensional contours, so that the layer structure comprises the at least one first outer plastic film, the second inner plastic film, the at least one adhesive layer between the at least one first plastic layer and the second plastic layer, and a thermoplastic layer arranged adjacent to the second main surface of the film layer structure which is formed by the thermoplastic material. A solidification of the at least one adhesive layer and a stabilization the film layer structure to correspond to the molding surface is achieved via at least one of pre-molding and back-molding. The thermoplastic layer is rigidified, and the layer structure is demolded.

BRIEF DESCRIPTION OF THE DRAWINGS

The present invention is described in greater detail below on the basis of embodiments and of the drawings in which:

FIGS. 1a to 9 relate to the first aspect of the present invention:

FIG. 1a shows a schematic cross-sectional view of a disposing step of a first embodiment of the method of the present invention for producing a plastic composite panel;

FIG. 1b shows an enlarged view of a detail associated with FIG. 1a;

FIG. 3 shows a schematic cross-sectional view during the back-molding step of the first embodiment of the method of the present invention for producing the plastic composite panel;

FIG. 4a shows a schematic cross-sectional view prior to the demolding step of the first embodiment of the method of the present invention for producing the plastic composite panel;

FIG. 4b shows an enlarged view of a detail associated with FIG. 3a;

FIG. 5 shows a perspective top view onto the plastic composite panel 1 produced in accordance with the first embodiment of the method according to the present invention;

FIG. 6a shows a schematic cross-sectional view of a disposing step of a second embodiment of the method of the present invention for producing a plastic composite panel;

FIG. 6b shows an enlarged view of a detail associated with FIG. 6a;

FIG. 7 shows a schematic cross-sectional view during the back-molding step of the second embodiment of the method of the present invention for producing the plastic composite panel;

FIG. 8a shows a schematic cross-sectional view prior to the demolding step of the second embodiment of the method of the present invention for producing the plastic composite panel;

FIG. 8b shows an enlarged view of a detail associated with FIG. 8a; and

FIG. 9 shows a perspective top view onto the plastic composite panel 1 produced in accordance with the second embodiment of the method according to the present invention.

FIG. 10 shows a perspective view of an embodiment of the plastic composite cover 1 according to the present invention;

FIG. 11 shows a sectional view of a first embodiment of the assembly 10 according to the present invention consisting of the plastic composite cover 1 shown in FIG. 10 and a lighting means mount 5;

FIG. 12 shows a sectional view of a second embodiment of the assembly 10 according to the present invention consisting of a plastic composite cover 1, which is modified as compared with the plastic composite cover 1 from FIG. 10, and a lighting means mount 5;

FIG. 13 shows a schematic illustration of an intermediate state of a first embodiment of the method of the present invention for producing the plastic composite cover 1 from FIG. 10; and FIG. 14 shows a schematic illustration of an intermediate state of a second embodiment of the method of the present invention for producing the plastic composite cover 1 from FIG. 12.

FIGS. 15 to 18c relate to the third aspect of the present invention:

FIG. 15 shows a perspective view of an embodiment of the plastic composite cover 1 according to the present invention;

FIG. 16 a sectional view of the assembly 10 according to the present invention consisting of the plastic composite cover shown in FIG. 15 and a lighting means 11;

FIGS. 18a-18c each show sectional views of alternative embodiments of the plastic composite cover 1 according to the present invention.

FIGS. 19 to 21c relate to the fourth aspect of the present invention:

FIG. 19 shows a perspective view of an embodiment of the plastic composite cover 1 according to the present invention;

FIG. 20 shows a sectional view of the assembly 10 according to the present invention consisting of the plastic composite cover shown in FIG. 19 and a lighting means 11; and FIGS. 21a-c show the initial, final and intermediate states, respectively, of the method of the present invention for producing the plastic composite cover from FIG. 19.

FIG. 22 shows a perspective view of an embodiment of the plastic composite cover 1 according to the present invention;

FIG. 23 shows a sectional view of the assembly 10 according to the present invention consisting of the plastic composite cover shown in FIG. 22 and a lighting means 11.

DETAILED DESCRIPTION

Figure 2A:
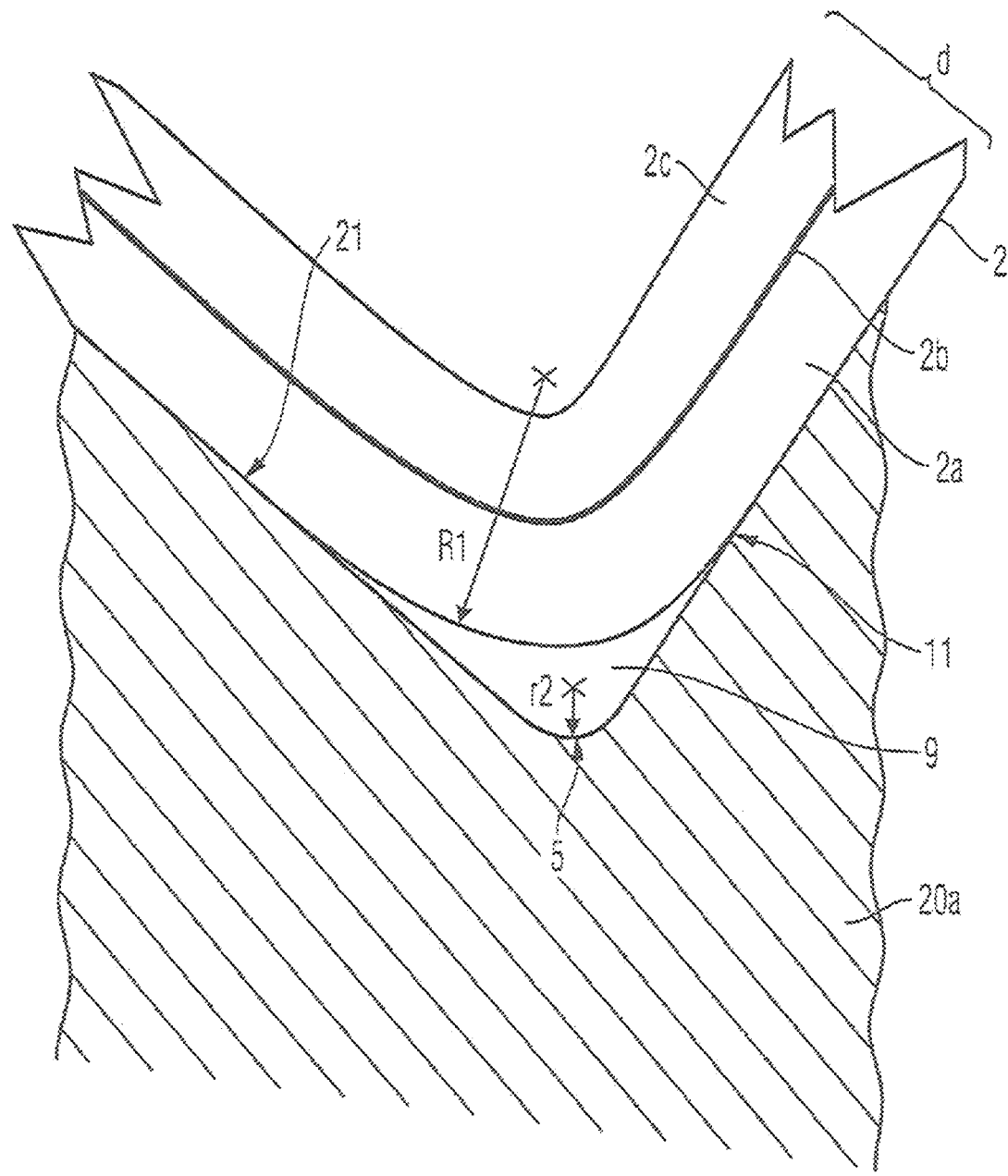
FIG. 2a shows a schematic cross-sectional view of a detail of the pre-molded film layer structure 2 disposed in the molding tool.

First Aspect:

The invention relates to a method for producing a plastic composite panel having a layer structure, in particular for a motor vehicle. According to the invention, a providing step is provided in which a film layer structure is provided, which includes several transparent plastic films and an adhesive layer disposed between two adjacent plastic films of the film layer structure in order to connect the two plastic films with each other, preferably by substance-to-substance connection. According to the invention, the at least one adhesive layer is formed from an adhesive not fully solidified which, however, is transparent at least in the solidified state. The film layer structure has two main surfaces, a first and a second main surface, which are spaced apart in the stacking direction of its layers, and which are formed by plastic films and the adhesive layer. Here, the film layer structure defines the greatest extent. The term plastic film is to be interpreted in a broad sense so that an additional coating is not excluded. For example, the film is in each case formed from a thermoplastic, preferably a polycarbonate or a polymethyl methacrylate or a polyethylene terephthalate. According to the invention, one of the plastic films is translucently metallized, preferably non-conductively metallized. For example, this results in a decorative, very thin (layer thickness <20 μm) light effect layer with a metallic gloss, leading to a semi-transparent (transmission approx. 5% to 25% in the more visible range) mirror effect. Such layers can be obtained, for example, by physical vapor deposition (PVD) or, if the light effect layer is supposed to be electrically non-conductive, by a combination of PVD and paint (NCVM-non-conductive vapor metallization). Optionally, each of the plastic films is coated by a roll-to-roll coating. For example, at least one plastic film has an antireflective coating, scratch resistant coating or a coating increasing abrasion resistance. A particularly uniform coating with corresponding uniform optical properties is possible due to the roll-to-roll coating process. For example, the thickness of the film layer structure in the stacking direction of its layers or films is between 0.125 mm to 0.50 mm, preferably 0.20 mm to 0.30 mm.

According to the invention, the film layer structure provided is pre-molded, so that it has a shape merely approximated to a final shape, i.e. the approximated shape is not congruent with the final shape. An approximated shape is obtained, for example, if at least the local distribution of peaks and troughs across the main surfaces of the film layer structure in the approximated and identical shapes matches. Preferably, the pre-molding process is a thermal forming and/or isostatic high-pressure forming of the film layer structure. For example, a planar piece of the film layer structure, which is cut to size during the providing step, is provided and three-dimensionally pre-molded by means of pre-molding.

After the pre-molding, the pre-molded film layer structure is disposed in a molding tool. When the film layer structure is being disposed in the molding tool, it is disposed with a first one of its two main surfaces facing towards a specific molding surface of the molding tool. The specific molding surface is characterized in that it forms one or several three-dimensional contours as raised portions and/or depressions formed from planar surfaces that are placed at an angle to each other and adjoin each other in straight edges, that is, viewed in totality, it imitates the surface contour of one or several cut diamonds. For example, the roughness of the molding surface is VDI 3400 Ref 12 or better.

When the film layer structure is disposed in the molding tool, a cavity is formed between the second main surface facing away from the first main surface and the molding tool, whereas the remaining cavity between the first main surface of the film layer structure and the molding surface, which is the result of the merely approximated shape of the film layer structure and of the two not being arranged so as to adjoin each other full-surface, is reduced by the back-molding step explained below.

According to the invention, the film layer structure is subsequently back-molded in a thermal molding method step while introducing a thermoplastic material, such as polycarbonate, which is transparent, at the latest, in the rigid state, into the first cavity in order to produce the layer structure as a molded article and to cause the adjacent approximation, preferably a greater level of approximation as compared with the pre-molded shape, more preferably a full-surface approximation, of the first main surface of the film layer structure to the molding surface. In other words, during this process, the film layer structure is deformed once more in this process, though possibly slightly, and the film layer structure takes on, in particular, the desired sharp, straight edges, which are predefined by the molding surface, between two adjacent, substantially planar surfaces. The layer structure obtained has at least one first outer plastic film belonging to the film layer structure, a second plastic film belonging to the film layer structure, an adhesive layer extending between the first and second plastic films, and a thermoplastic layer, which is adjacent to the second main surface of the film layer structure and formed by the thermoplastic material.

Simultaneously with pre-molding and/or back-molding, a solidification of the adhesive layer is caused, wherein the film layer structure is stabilized in a shape corresponding to the specific molding surface. A solidification is understood to mean a chemical or physical hardening of the adhesive, which is generally accompanied by a loss of viscosity. For example, this is a thermosetting adhesive, or the solidification is caused by means of irradiation, e.g. with UV light.

When the thermoplastic layer has rigidified, the film layer structure is removed and processed into the plastic composite panel, or mounted as a plastic composite panel. The plastic composite panel produced imitates the diamond structure of the molding tool in an optically ideal manner. As a result, a plastic composite panel with ideal optical properties can be produced. This is ascribed to the use of a film layer structure containing several plastic films and an adhesive layer as the surface shape of the component of the plastic composite panel primarily accommodating the molding tool. The optical properties of the plastic films of the film layer structure are preserved over their course in the film layer structure, despite the further processing in the molding process, due to the stabilizing effect of the adhesive layer or layers. Moreover, coatings with an optical effect, such as the light effect layer and/or paint layers, can be applied to the films particularly uniformly to the individual, separated film, if necessary even prior to producing the film layer structure, i.e. even before connecting the films to the adhesive layers. This application can be carried out, if necessary, by comparatively simple processes, such as a roll-to-roll application to the film arranged in a planar manner, without jeopardizing the desired visually attractive properties in the overall structure of the plastic composite panel.

According to a preferred variant of the method, pre-molding is carried out in a pre-molding tool with a pre-molding surface, wherein the latter, if not free of edges, only has such edges, which are referred to herein for clearer distinction as pre-edges, which in each case have a radius which is greater, preferably several times greater, than the radius of the corresponding edge of the molding surface of the later back-molding step. In other words, the pre-edges of the pre-molding surface are "rounded" compared with the edges of the molding surface disposed at the corresponding location. Thus, a curvature in the film layer structure is produced in two stages at the location of the edges which, on the one hand, ensures that the final shape is reliably produced, that the edges of the final shape can be formed in a comparatively sharp-edged manner without having to fear the risk that the curvatures produced during pre-molding irreversibly damage the film layer structure due to faulty placement and/or excessive strain.

Still more preferably, the radius of all pre-edges of the pre-molding surface is more than twice, most preferably more than five times the greatest radius of the edges of the molding surface.

According to a preferred embodiment, the pre-molding surface also has one or several three-dimensional contours as raised portions and/or depressions formed from planar surfaces that are placed at an angle to each other and adjoin each other in straight edges, that is, viewed in totality, it imitates the surface contour of one or several cut diamonds.

Preferably, the pre-edges are configured in such a way, e.g. their radius is selected such, that, subsequent to the pre-molding of the film layer structure, a curvature of the first main surface of the film layer structure with a radius corresponding to at least one thickness, preferably at least twice the thickness of the film layer structure, is produced at the location corresponding to the respective pre-edge.

Later, this comparatively large radius permits a relatively easy and rapid positioning of the pre-molded film layer structure in the molding tool used later during the subsequent back-molding process.

Preferably, back-molding is carried out laterally, with respect to the stacking direction of the layers of the layer structure, in order to avoid visually unattractive density fluctuations in the thermoplastic layer. In this case, "laterally" means a feed direction which includes a right angle, or an angle deviating by at most 20° from the right angle, with the stacking direction.

Preferably, the thermoplastic layer forms a planar or structured, coated or uncoated, outer, more preferably exposed, third main surface of the layer structure defining the plastic composite panel. Preferably and alternatively, the third main surface has in this case also one or several three-dimensional contours formed in each case from planar surfaces that are placed at an angle to each other and adjoin each other in straight edges.

The back-molding process can be carried out in several stages, using another molding tool. Subsequent to back-molding the film layer structure with a first thermoplastic material in a first stage and after the solidification of the latter, the molded article obtained is, for example, transferred into a further molding tool, while forming another cavity formed between the outer surface of the first thermoplastic layer and the further molding tool. In a second stage, a second thermoplastic material is introduced into the further cavity in order to form a second thermoplastic layer, the first thermoplastic layer and the second thermoplastic layer being connected by substance-to-substance connection and forming a common inner interface.

Preferably, the adhesive is a thermosetting adhesive and the temperature of the adhesive is set, for example by means of selecting the temperature of the tool, e.g. to more than 280° C., in such a way that a solidification or setting of the adhesive is achieved. A solidification is understood to be, for example, a chemical and/or physical hardening of the adhesive, such as an increasing cross-linking of the adhesive. This is advantageous in that an additional setting step may be omitted.

According to a preferred embodiment of the method according to the invention, an additional plastic film, preferably consisting of a transparent thermoplastic material, is disposed in the molding tool and adjacent thereto, so that the cavity is formed between the additional plastic film and the film layer structure and the additional plastic film is an outer plastic film of the obtained layer structure, in order to produce another visually attractive surface. Preferably, the surface of the molding tool adjacent to the additional plastic film in this case also has one or several three-dimensional contours formed in each case from planar surfaces that are placed at an angle to each other and adjoin each other in straight edges.

In a process added to the aforementioned process, the layer structure, after demolding, is coated in a cast molding step with a casting resin, preferably a polyurethane-containing casting resin. Preferably, the surface of the molding tool adjacent to the casting resin layer in this case also one or several three-dimensional contours formed in each case from planar surfaces that are placed at an angle to each other and adjoin each other in straight edges. It is preferably provided that the casting resin layer is formed from a polyurethane-containing casting resin, the polyurethane preferably being an aliphatic polyurethane or a thermoplastic polyurethane. The casting resin may also contain further fillers or additives, e.g. additives for improving the resistance of the casting resin to UV irradiation.

In this case, the casting resin layer may have a varying thickness, or an approximately uniform thickness, over its course. For example, the maximum thickness of the casting resin layer is no greater than 1/10 of the maximum total thickness of the layer structure of the plastic composite panel in the stacking direction of the layers. For example, the mean thickness of the casting resin layer is 0.2 to 3 mm. Preferably, the maximum thickness of the casting resin layer is less than 1 mm, preferably less than 0.7 mm. Due to the thickness of the casting resin layer, which is only small compared with the total thickness of the layer structure of the plastic composite panel, effects of tension within the panel may be avoided. Further steps for micro-coating or processing the surface of the casting resin layer may be provided. For example, additional micro-coatings for increasing force resistance may be applied to the surface of the casting resin layer. Micro-coatings are understood to be such coatings that have a layer thickness of a few to a few tens of micrometers.

Preferably, the cast molding step is selected as an alternative to the step of providing the additional plastic film, so that the casting resin layer formed from the casting resin is disposed adjacent to the thermoplastic layer.

Preferably, at least the plastic films of the film layer structure are formed from a transparent plastic, the adhesive layer is furthermore formed from a transparent or at least transparently setting plastic and the thermoplastic is transparent, in order to make the contour introduced into the film layer structure visible when looking through the thermoplastic layer. Preferably, at least the plastic films, the adhesive layer and the thermoplastic layer have an optical refractive index, wherein these refractive indices do not deviate from each other by more than 0.2, preferably 0.1.

According to a preferred variant, all layers of the layer structure, with the exception of an optionally provided metallization, have a refractive index deviating by no more than 0.2, preferably 0.1, from that of the thermoplastic layer. Preferably, the plastic films, the adhesive layer and the thermoplastic layer have the same color according to DIN 5033, or are colorless or achromatic. An optical "depth" similar to that of a diamond may thus be obtained.

Preferably, the minimum demolding angle of the molding surface of the molding tool is more than 3°, e.g. 8°.

For example, the film layer structure includes three plastic films and adhesive layers situated between them; preferably, the sequence of the layers of the film layer structure is as follows: transparent protective paint layer; transparent polycarbonate film with a film thickness of 125 μm; transparent adhesive layer; unilaterally metallized polyethylene terephthalate film coated in a non-conductive and translucent manner (NCVM) with a film thickness of 25 μm; transparent adhesive layer; transparent polycarbonate film with a film thickness of 125 μm; transparent protective paint layer.

Preferably, the edges of the molding surface have a radius for shaping the first main surface of the film layer structure of less than 0.1 mm, preferably of equal to 0.08 mm or less.

According to a preferred embodiment of the method according to the invention, a maximum extent of the film layer structure is greater by at least 10 times, preferably at least 20 times, more preferably at least 30 times, than a minimum dimension of the layer structure. The minimum dimension is determined by a section through the layer structure of the plastic composite panel carried out in a direction perpendicular to the maximum extent of the film layer structure, the minimum dimension being the minimum thickness of this section.

The invention further relates to a plastic composite panel with a layer structure. The layer structure of the plastic composite panel comprises a film layer structure consisting of at least two transparent plastic films and at least one transparent adhesive layer disposed between, in each case, two plastic films and connecting the two plastic films in each case by substance-to-substance connection, wherein the film layer structure defines two outer main surfaces that are opposite each other in the stacking direction of its layers, of which a first one is an outer main surface, i.e. a main surface defining an exposed surface, which is defined by one of the outer plastic films of the film layer structure or, if provided, its coating, and wherein at least one of the plastic films is translucently metallized, in order to provide a decorative light effect layer with a metallic gloss.

For example, a plastic film of the film layer structure is metallized by vapor deposition, such as chemical or physical vapor deposition, or sputtering, or so-called non-conductive vacuum metallizing (NCVM). For example, the translucently metallized film is an inner film of the film layer structure and acts as a light effect layer. Preferably, the translucently metallized film is coated so as to be electrically non-conductive, in order to not interfere with the electromagnetic field propagation and thus, the detection or charging process, if the plastic composite panel is later disposed in front of a capacitive or inductive touch or proximity detection means or an inductive electrical charging device.

The layer structure further comprises a thermoplastic layer of a transparent thermoplastic material, which is disposed adjacent, preferably adjacent over its entire surface, to the second main surfaces of the film layer structure. Preferably, the thermoplastic layer and the film layer structure are connected by substance-to-substance connection, e.g. by back-molding. In this case, the film layer structure is formed in such a way, according to the invention, that all surfaces and interfaces of the film layer structure, i.e. all surfaces or interfaces between the plastic films, their optional coatings and the adhesive layer or adhesive layers, form one or several three-dimensional contours formed from planar surfaces that are placed at an angle to each other and adjoin each other in straight edges. For example, the contour has a tip pointing in the direction of the thermoplastic layer or in the opposite direction. Thus, the plastic composite panel according to the invention imitates in an optically ideal manner a surface structure of one or more polished diamonds. This is ascribed to the use of a film layer structure containing several plastic films and an adhesive layer, which takes on the surface shape containing the contour perfectly and retains it permanently. In particular, the straight and sharp-edged course of the edges typical for a polished diamond can thus be ideally replicated; this is advantageous particularly if the contour is supposed to be discernible when viewed through the thermoplastic layer.

Preferably, the thermoplastic layer forms a planar or structured, coated or uncoated, outer, more preferably exposed, third main surface of the layer structure defining the plastic composite panel. Preferably the surface also has one or several three-dimensional contours formed in each case from planar surfaces that are placed at an angle to each other and adjoin each other in straight edges.

The term plastic film is to be interpreted in a broad sense so that an additional coating is not excluded. For example, the film is in each case formed from a thermoplastic, preferably a polycarbonate or a polymethyl methacrylate or a polyethylene terephthalate. Each of the films is optionally coated, e.g. by vapor deposition or roll-to-roll coating. For example, at least one plastic film is metallized, has an antireflective coating, scratch resistant coating or a coating increasing abrasion resistance. For example, the total thickness of the film layer structure in the stacking direction of its layers is between 0.125 mm to 0.50 mm, preferably 0.20 mm to 0.30 mm.

According to a preferred embodiment of the plastic composite panel, in order to improve the visual attractiveness of the outer surface of the plastic composite panel on the side of the plastic composite panel opposite the film layer structure, an additional plastic film and/or a casting resin layer is provided on the side of the thermoplastic layer facing away from the film layer structure. Preferably the surface of the casting resin layer here also has one or several three-dimensional contours formed in each case from planar surfaces that are placed at an angle to each other and adjoin each other in straight edges.

It is preferably provided that the casting resin layer is formed from a polyurethane-containing casting resin, the polyurethane preferably being an aliphatic polyurethane or a thermoplastic polyurethane. The casting resin may also contain further fillers or additives, e.g. additives for improving the resistance of the casting resin to UV irradiation. Preferably, the additional plastic film is formed from a transparent thermoplastic material, or the casting resin layer is formed from a casting resin that at least sets transparently.

In this case, the casting resin layer may have a varying thickness, or an approximately uniform thickness, over its course. For example, the maximum thickness of the casting resin layer is no greater than $1/10$ of the maximum total thickness of the layer structure of the plastic composite panel in the stacking direction of the layers. For example, the mean thickness of the casting resin layer is 0.2 to 3 mm. Preferably, the maximum thickness of the casting resin layer is less than 1 mm, preferably less than 0.7 mm. Further steps for micro-coating or processing the surface of the casting resin layer may be provided. For example, additional micro-coatings for increasing force resistance may be applied to the surface of the casting resin layer. Micro-coatings are understood to be such coatings that have a layer thickness of a few to a few tens of micrometers.

Preferably, at least the plastic films, the adhesive layer and the thermoplastic layer have an optical refractive index, wherein these refractive indices do not deviate from each other by more than 0.2, preferably 0.1. According to a preferred variant, all layers of the layer structure, with the exception of an optionally provided metallization, have a refractive index deviating by no more than 0.2, preferably 0.1, from that of the thermoplastic layer. Preferably, the plastic films, the adhesive layer and the thermoplastic layer have the same color according to DIN 5033, or are colorless or achromatic. An optical "depth" similar to that of a diamond may thus be obtained.

For example, the film layer structure includes three plastic films and adhesive layers situated between them; preferably, the sequence of the layers of the film layer structure is as follows: transparent protective paint layer; transparent polycarbonate film with a film thickness of 125 μm; transparent adhesive layer; unilaterally metallized polyethylene terephthalate film coated in a non-conductive and translucent manner (NCVM) with a film thickness of 25 μm; transparent adhesive layer; transparent polycarbonate film with a film thickness of 125 μm; transparent protective paint layer.

Preferably, the outer first plastic film of the film layer structure defining the exposed first main surface of the film layer structure has a radius of less than 0.1 mm, preferably of equal to 0.08 mm or less, in order to form the edges of the at least one contour. Moreover, a correspondingly larger radius results at the further layers of the film layer structure; for example, for forming the edges, the radius of the plastic film, which defines the second main surface of the film layer structure and is disposed most closely adjacent to the thermoplastic layer, corresponds to about the layer thickness of the film layer structure and is, for example, no greater than 0.25 mm. Preferably, a maximum extent of the film layer structure is greater by at least 10 times, preferably at least 20 times, more preferably at least 30 times, than a minimum dimension of the layer structure. The minimum dimension is determined by a section through the layer structure of the plastic composite panel carried out in a direction perpendicular to the maximum extent of the film layer structure, the minimum dimension being the minimum thickness of this section.

The invention further relates to an assembly of the plastic composite panel according to any one of the above-described embodiments and a lighting means for backlighting or transmitting light through the plastic panel, wherein the first main surface of the film layer structure faces towards the lighting means. The second main surface of the film layer structure faces towards the observer, wherein the third main surface, which is defined by the thermoplastic layer or the additional plastic film or the casting resin layer, forms a surface facing towards the observer.

The invention further relates to a use of the plastic composite panel in any one of the above-described embodiments in a motor vehicle.

Second Aspect:

The invention further relates to a method for producing a plastic composite cover with at least one plastic film, wherein the latter serves for connection and fixing, i.e. attachment, to another component, such as a lighting means mount, and to a corresponding plastic composite cover. At present, the use of covers consisting of glass materials is preferred for a variety of reasons. On the one hand, the cool touch is perceived as haptically pleasing, and the high transparency of the glass material and the pleasing appearance of the surface produced thereby is usually perceived as highly valuable by an observer. The comparatively expensive production and the weight of such covers is disadvantageous, particularly if the cover needs to have a certain thickness so that the three-dimensional surface contours can be integrated into the cover. Moreover, the danger of breakage and the accompanying splintering results in a not inconsiderable risk of injury, so that the integration of covers that consist entirely or partially of glass materials into the region of the dashboard in motor vehicles is out of the question. The production of a plastic cover entails the problem of an attachment to further components, such as a lighting means mount carrying the lighting means serving for backlighting the cover. Here, the point is to obtain a durable connection, which is, in particular, as free from play and thus from gaps as possible, between the cover and the respective component, wherein the connection can be placed in such a way, that the visual impression to be obtained by means of the cover, namely to imitate that of a cut glass material, can be obtained. In particular, there is the requirement for having the cover appear "edgeless" if possible. Given this requirement, the placement of the connecting means is a particular problem.

Against this background, there was a demand for a method for producing a generic plastic composite cover which is comparatively light, durable and which has a high-quality appearance which at least comes close to that of glass materials, and which, after production and in use, permits a mechanical connection to another component, such as a lighting means mount, which little affects the visual appearance.

The invention relates to a method for producing a plastic composite cover having a layer structure, in particular for a motor vehicle. According to the invention, a disposing step is provided, in which a first plastic film is disposed in a molding tool so that a cavity is formed between the plastic film and the molding tool. Both with respect to the first plastic film and the second plastic film mentioned below, the term plastic film is to be interpreted broadly, so that only a film-shaped substrate consisting of a plastic, such as a thermoplastic, preferably a polycarbonate, a polymethyl methacrylate and/or polyurethane, is mandatorily provided, which may also be coated, e.g. metallized by vapor deposition, provided with antireflective coating, scratch resistant coating or a coating increasing abrasion resistance, or coated with a casting resin in a cast molding step. For example, the film is manufactured by film extrusion.

According to the invention, a back-molding process, which is subsequent to the disposing process, of the first plastic film takes place in a thermal molding method step while introducing a thermoplastic material, such as a polycarbonate or polymethyl methacrylate, into the cavity in order to produce a layer structure as a molded article, wherein the layer structure, which is not to be understood as final, has the first plastic film and a base layer formed by the thermoplastic material. Preferably, the base layer and the first plastic film are connected by substance-to-substance connection by means of the thermal molding method. In this case, the first plastic film, with the side thereof facing away from the base layer, defines an outer surface of the layer structure, while the base layer, not mandatorily but, for example, also, defines another outer surface of the layer structure. According to the invention, the cavity is formed in such a manner that the first plastic layer forms on at least two opposite flanks of the layer structure at least one projection each, which protrudes over the base layer and serves for being fixed to another component, such as a lighting means mount. The layer structure includes, for example, two main surfaces as outer surfaces, which are respectively formed by one of its plastic films or the base layer, and which are disposed so as to be spaced apart in the stacking direction, one of which, if disposed as intended, faces towards the vehicle occupant and the other faces away from the vehicle occupant and faces towards the further component and preferably serves as a contact surface for it. For example, the outer boundary surfaces of the layer structure, which are opposite each other in a direction orthogonal to the stacking direction and are preferably parallel to each other, are understood to be opposite flanks. Preferably, the layer structure is formed to be elongated, and the opposite flanks on which the projections of the invention are formed are the longer ones of all flanks.

In a subsequent step, the layer structure is demolded while obtaining the plastic composite cover from the molding tool. Then, in the method according to the invention, additional surface-processing or surface-finishing steps and/or steps for removing the sprue parts and burrs on the plastic composite cover may also be provided.

Not only is a durable and load-bearing connection between the plastic composite cover and the component achieved by the first plastic film protruding over the base layer of the layer structure while forming lateral projections serving for being fixed to other components, but an arrangement of the attachment means with little visual interference is found by placing the attachment means at the outermost parts of the plastic composite cover, particularly in the case of a largely translucent or transparent layer structure. Moreover, the plastic film serves for mechanical stabilization and avoidance of splintering.

According to a preferred embodiment of the method according to the invention, a lighting means mount carrying a lighting means is provided in a providing step following the previously described steps, and in a subsequent mounting step, in which, preferably by producing a positive and/or non-positive and/or substance-to-substance connection, preferably at least a substance-to-substance connection, between at least one of the projections and the lighting means mount, the latter is fixed to the plastic composite cover in order to form a joint assembly. In this case, the lighting means is disposed so as to backlight the plastic composite cover. For example, at least one latching connection consisting of a latching recess and a latching lug engaging the latching recess, which are latched together in pairs during the mounting step, is provided in each case. Alternatively or additionally, an alternative embodiment provides that a substance-to-substance connection is produced between the lighting means mount and the projection, e.g. by ultrasonic welding.

It is preferably provided that the projections are formed in a cranked manner such that they come into lateral contact with the lighting means mount during the mounting step.

It is preferably provided that, after the mounting step, the outer surface of the plastic composite cover defined by the first plastic film is disposed in such a way that it is disposed facing away from the lighting means mount and forms an outer surface of the assembly, and that this surface is disposed so as to face towards the vehicle occupant if used as intended in a motor vehicle. For example, the film serves as a protective film for the thermoplastic base layer situated thereunder. An optional second plastic film which, for example, is disposed with its full surface against the base layer on the side facing towards the lighting means mount and has no projection over the base layer, is provided, for example, on the side of the base layer facing towards the lighting means mount and serves as a contact portion for the lighting means mount.

According to an alternative embodiment of the method, the outer surface of the plastic composite cover defined by the first plastic film is disposed in such a way that it is disposed facing towards the lighting means mount and forms a light-entry surface for the light of the lighting means to be coupled into the plastic composite cover. Preferably, the first plastic film, which protrudes over the base layer, forms a contact portion for the lighting means mount.

As was mentioned above, it is provided, according to a preferred variant, that, during the disposing process, a second plastic film is additionally disposed in the molding tool and the cavity to be filled with the thermoplastic material is formed between the first plastic film and the second plastic film. Preferably, the thermoplastic material is injected laterally, with respect to the stacking direction of the two films, so that the two plastic films each form an outer surface of the plastic composite cover.

In order to imitate the optical impression of a cut glass material, e.g. its multiple reflections, preferably at least one of the plastic films and the base layer are formed to be translucent or transparent.

Preferably, at least one of the plastic films of the first and second plastic films and the base layer have an optical refractive index, wherein these refractive indices do not deviate from each other by more than 0.2, preferably 0.1. Preferably, the first or second plastic film, or all plastic films, and the base layer have the same color according to DIN 5033, or are colorless or achromatic. An optical "depth" similar to that of a crystal may thus be obtained.

In one embodiment of the method, at least the base layer and/or one of the plastic films of the plastic composite cover are metallized, preferably translucently metallized, and/or coated in an opaque manner, preferably coated in an opaque manner exclusively in some regions. In one embodiment, the surface of the plastic composite cover facing away from the observer is translucently metallized, e.g. coated by vapor deposition, such as chemical or physical vapor deposition, or sputtering, or so-called non-conductive vacuum metallizing (NCVM).

According to a preferred embodiment of the method according to the invention, it is provided that at least one outer surface of the plastic composite cover, preferably the surface of the plastic composite cover facing towards the vehicle occupant if disposed as intended, forms one or more three-dimensional contours, preferably in each case a contour formed from planar surfaces, most preferably a contour forming one or more straight edges. For example, rhombus-like, facet-like and/or prismatic structures are provided in the surface. Preferably, the respective surface is faceted multiple times in order to imitate the visual impression of a cut diamond. Visually attractive light-refractive effects may thus be produced, which make the cover appear more attractive.

It is preferably provided that a maximum extent of the first plastic film is greater by at least 10 times, preferably at least 20 times, more preferably at least 30 times, than a minimum dimension, also referred to as a minimum thickness, of the obtained plastic composite cover. The minimum dimension is determined, for example, by a section through the plastic composite cover carried out in a direction perpendicular to the maximum extent of the first plastic film, and is the minimum thickness of this section.

The invention also relates to a plastic composite cover for a motor vehicle having a layer structure. Here, the layer structure includes, according to the invention, a first plastic film. According to the invention, the layer structure moreover has at least one base layer consisting of a first thermoplastic material, which is disposed in a manner adjoining the first plastic film on one side. Preferably, the base layer and the first plastic film are connected by substance-to-substance connection. According to the invention, the first plastic layer forms on at least two opposite flanks of the layer structure at least one projection each, which protrudes over the base layer and serves for being fixed to another component, such as a lighting means mount. The layer structure includes, for example, two main surfaces as outer surfaces, which are respectively formed by one of its plastic films or the base layer, and which are disposed so as to be spaced apart in the stacking direction, one of which, if disposed as intended, faces towards the vehicle occupant and the other faces away from the vehicle occupant and faces towards the further component and preferably serves as a contact surface for it. For example, the outer boundary surfaces of the layer structure, which are opposite each other in a direction orthogonal to the stacking direction and are preferably parallel to each other, are understood to be opposite flanks. Preferably, the layer structure is formed to be elongated, and the opposite flanks on which the projections of the invention are formed are the longer ones of all flanks.

Not only is a durable and load-bearing connection between the plastic composite cover and the component achieved by the first plastic film protruding over the base layer of the layer structure while forming lateral projections serving for being fixed to other components, but an arrangement of the attachment means with little visual interference is found by placing the attachment means at the outermost parts of the plastic composite cover, particularly in the case of a largely translucent or transparent layer structure. Moreover, the plastic film serves for mechanical stabilization and avoidance of splintering.

It was found that the plastic composite cover according to the invention is particularly durable and comparatively light, but may still be extended without exhibiting strong internal tension in the process. In addition, it is capable of having visually attractive properties, e.g. imitate the visually attractive, in particular light-refractive, properties of a cut glass.

Moreover, the plastic film serves for mechanical stabilization and avoidance of splintering in the event of an impact and fracturing of the base layer.

According to a preferred embodiment of the plastic composite cover, a second plastic film is additionally provided, and the base layer is disposed between the first plastic film and the second plastic film.

In order to imitate the optical impression of a cut glass material, e.g. its multiple reflections, preferably at least one of the plastic films and the base layer are formed to be translucent or transparent.

Preferably, at least one of the plastic films of the first and second plastic films and the base layer have an optical refractive index, wherein these refractive indices do not deviate from each other by more than 0.2, preferably 0.1. Preferably, the first or second plastic film, or all plastic films, and the base layer have the same color according to DIN 5033, or are colorless or achromatic. An optical "depth" similar to that of a crystal may thus be obtained.

In a preferred embodiment of the method, at least the base layer and/or one of the plastic films of the plastic composite cover are metallized, preferably translucently metallized, and/or coated in an opaque manner, preferably coated in an opaque manner exclusively in some regions. In one embodiment, the surface of the plastic composite cover facing away from the observer is translucently metallized, e.g. coated by vapor deposition, such as chemical or physical vapor deposition, or sputtering, or so-called non-conductive vacuum metallizing (NCVM).

According to a preferred embodiment of the plastic composite cover according to the invention, it is provided that at least one outer surface of the plastic composite cover, preferably the surface of the plastic composite cover facing towards the vehicle occupant if disposed as intended, forms one or more three-dimensional contours, preferably in each case a contour formed from planar surfaces, most preferably a contour forming one or more straight edges. For example, rhombus-like, facet-like and/or prismatic structures are provided in the surface. Preferably, the respective surface is faceted multiple times in order to imitate the visual impression of a cut diamond. Visually attractive light-refractive effects may thus be produced, which make the cover appear more attractive.

It is preferably provided that a maximum extent of the first plastic film is greater by at least 10 times, preferably at least 20 times, more preferably at least 30 times, than a minimum dimension, also referred to as a minimum thickness, of the obtained plastic composite cover. The minimum dimension is determined, for example, by a section through the plastic composite cover carried out in a direction perpendicular to the maximum extent of the first plastic film, and is the minimum thickness of this section.

The invention further relates to the assembly of the plastic composite cover of one of the above-described embodiments and a lighting means mount carrying a lighting means for backlighting the plastic composite cover, wherein a positive and/or non-positive and/or substance-to-substance connection is provided between at least one of the projections and the lighting means mount in order to fix the plastic composite cover to the lighting means mount. For example, at least one latching connection consisting of a latching recess and a latching lug engaging the latching recess, which are latched together in pairs, is provided in each case in order to form a non-positive connection in each case. Alternatively or additionally, an alternative embodiment provides that a substance-to-substance connection is produced between the lighting means mount and the projection, e.g. by ultrasonic welding. Preferably, the projections are formed in a cranked manner for lateral contact with the lighting means mount.

It is preferably provided that, while being disposed, the outer surface of the plastic composite cover defined by the first plastic film is disposed in such a way that it is disposed facing away from the lighting means mount and forms an outer surface of the assembly, and that this surface is disposed so as to face towards the vehicle occupant if used as intended in a motor vehicle. For example, the film serves as a protective film for the thermoplastic base layer situated thereunder. An optional second plastic film which, for example, is disposed with its full surface against the base layer on the side facing towards the lighting means mount and has no projection over the base layer, is provided, for example, on the side of the base layer facing towards the lighting means mount and serves as a contact portion for the lighting means mount.

According to an alternative embodiment of the assembly, the outer surface of the plastic composite cover defined by the first plastic film is disposed in such a way that it is disposed facing towards the lighting means mount and forms a light-entry surface for the light of the lighting means to be coupled into the plastic composite cover. Preferably, the first plastic film, which protrudes over the base layer, forms a contact portion for the lighting means mount.

The invention further relates to the use of the assembly of the plastic composite cover and the lighting means mount in any one of the above-described embodiments in a motor vehicle.

Third Aspect of the Invention:

In the third aspect, the invention relates to a plastic composite cover. At present, the use of covers consisting of glass materials is preferred for a variety of reasons. On the one hand, the cool touch is perceived as haptically pleasing, and the high transparency of the glass material and the pleasing appearance of the surface produced thereby is usually perceived as highly valuable by an observer. The comparatively expensive production and the weight of such covers is disadvantageous, particularly if the cover needs to have a certain thickness so that the three-dimensional surface contours can be integrated into the cover. Moreover, the danger of breakage and the accompanying splintering results in a not inconsiderable risk of injury, so that the integration of covers that consist entirely or partially of glass materials into the region of the dashboard in motor vehicles is out of the question. The production of a plastic cover includes the risk that the cover, particularly in the case of comparatively thin covers with a large extent, may quickly exhibit tensions, which may result in the unattractive formation of cracks. In experiments by the inventors preceding the invention, these tensions arose particularly if, in order to form specific, e.g. sharp-edged, surface structures, a plastic film was back-molded on one side in a thermoforming method step for producing an additional thermoplastic base layer. The shrinkage occurring in the subsequent cooling-off process leads to tensions in the obtained plastic composite, which in part resulted in optically disadvantageous crack formation, but at least affected the dimensional stability of the plastic composite cover to be produced.

Against this background, there was a demand for a method for producing a generic plastic composite cover which is comparatively light, durable and which has a high-quality appearance which at least comes close to that of glass materials, and which is permanently dimensionally stable after production and in use.

The invention relates to a method for producing a plastic composite cover having a casting resin layer, in particular for a motor vehicle. According to the invention, a disposing step is provided, in which a plastic film is disposed in a first molding tool so that a first cavity is formed between the plastic film and the molding tool. The term plastic film is to be interpreted broadly, so that only a film-shaped substrate consisting of a plastic, such as a thermoplastic, preferably a polycarbonate or a polymethyl methacrylate, is mandatorily provided, which may also be coated, e.g. metallized by vapor deposition, provided with antireflective coating, scratch resistant coating or a coating increasing abrasion resistance.

According to the invention, a subsequent back-molding process of the plastic film takes place in a thermal molding method step while introducing a thermoplastic material, such as a polycarbonate, into the first cavity in order to produce a partial layer structure as a molded article, wherein the partial layer structure has the plastic film and a base layer formed by the thermoplastic material. In this case, the plastic film, with the side thereof facing away from the base layer, defines an outer surface of the partial layer structure, while the base layer, not mandatorily but, for example, also, defines another outer surface of the partial layer structure.

In a subsequent demolding step, which is carried out, for example, after the surface solidification of the first layer or later, the previously produced molded article, i.e. the partial layer structure, is at least partially demolded. Due to the shrinkage of the base layer and the tensile strain acting on the plastic film, a deformation of the plastic film in the direction of the base layer occurs. Which means the deformation of the plastic film with respect to its original orientation in the first molding tool prior to the introduction of the thermoplastic material of the base layer. This deformation is pronounced particularly at the outer ends of the plastic film.

According to the invention, the demolded partial layer structure is subsequently disposed in a second molding tool while forming a second cavity formed between the outer surface of the partial layer structure, particularly the outer surface defined by the plastic film, and the second molding tool. In a subsequent step, the second cavity is flooded with a casting resin. In a subsequent step, the casting resin is cured, also referred to as cross-linked, in order to form a casting resin layer adjacent to the outer surface of the partial layer structure and obtain a plastic composite cover consisting of the casting resin layer and at least the partial layer structure. According to the invention, the outer surface of the plastic composite cover formed by the casting resin layer is determined by the surface of the second molding tool delimiting the second cavity. Thus, the second cavity determines the shape of the outer surface of the casting resin layer facing away from the first plastic film.

In a subsequent step, the plastic composite cover produced in this way is demolded from the second molding tool.

While the plastic film substantially serves for mechanical stabilization and avoidance of splintering, the casting resin layer produced by cast molding counteracts the tension introduced into the plastic composite cover by the thermoforming production process of the base layer and has a restoring effect on the deformation of the plastic film caused by the shrinkage of the base layer. Thus, the tensile stress exerted by the casting resin layer on the plastic film compensates that exerted by the base layer on the plastic film, so that the deformation caused by the base layer can be reduced or even compensated. Shrinkages of the casting resin layer, which may amount to 0.2% to 2%, for example, thus have a positive mechanical effect on the molded article consisting of the plastic film and the base layer, so that the initial stress and the deformation of the plastic film caused by the thermoforming back-molding process recede.

Because the casting resin layer is produced by cast molding, its outer surface is determined by the shape of the tool, and thus, any contours can be introduced into the surface, which are visually attractive, for example, in that comparatively sharp-edged transitions are produced. After the demolding of the plastic composite cover, the surface of the casting resin layer preferably has several edges extending across the surface and having a maximum curvature radius each of less than 0.6 mm.

In this case, the casting resin layer may have a varying thickness, or an approximately uniform thickness, over its course along the plastic film. For example, the maximum thickness of the casting resin layer is no greater than ¹⁄₁₀ of the maximum total thickness of the plastic composite cover. For example, the mean thickness of the casting resin layer is 0.2 to 3 mm. Preferably, the maximum thickness of the casting resin layer is less than 1 mm, preferably less than 0.7 mm. Further steps for micro-coating or processing the surface of the casting resin layer may be provided. For example, additional micro-coatings for increasing force resistance may be applied to the surface of the casting resin layer. Micro-coatings are understood to be such coatings that have a layer thickness of a few to a few tens of micrometers.

It is preferably provided that the casting resin is a polyurethane-containing casting resin, the polyurethane preferably being an aliphatic polyurethane or a thermoplastic polyurethane. The casting resin may also contain further fillers or additives, e.g. additives for improving the resistance of the casting resin to UV irradiation.

According to a preferred embodiment of the method, a coating step is provided in which the plastic film is coated with an adhesion promoter while forming an adhesion promoter layer, so that the adhesion promoter layer forms the outer surface of the partial layer structure. This coating step is carried out, for example, prior to disposing the plastic film in the first molding tool, or prior to disposing the partial layer structure demolded from the first molding tool in the second molding tool. The adhesion promoter ensures that a connection between the casting resin layer and the plastic film on the one side of the plastic film is obtained which, with respect to the mechanical load-bearing capacity, corresponds to the connection between the base layer and the plastic film on the other side of the plastic film, wherein the latter is preferably a substance-to-substance connection resulting from the thermoforming back-molding process. For example, the adhesion promoter is a substance forming covalent bonds both with the plastic film and the casting resin layer. Preferably, the adhesion promoter is a 1K or 2K-polyurethane adhesion promoter, still more preferably it has a density in the range of 400 to 1200 g/l. For example, the adhesion promoter is formed by reacting polyisocyanates with compounds having two hydrogen atoms that are reactive with respect to isocyanates. Most preferably, the adhesion promoter is a 2K-PUR adhesion promoter adapted in such a way that it is still capable of reacting during the process of flooding with casting resin.

Then, in the method according to the invention, additional surface-processing or surface-finishing steps and/or steps for removing the sprue parts and burrs on the plastic composite cover may also be provided.

According to a preferred variant of the method, at least the plastic film and the casting resin layer, preferably also the base layer in addition to the plastic film and the casting resin layer, more preferably also the adhesion promoter layer, are in each case translucent or transparent.

Preferably, at least the casting resin layer, the plastic film and the base layer have an optical refractive index, wherein these refractive indices do not deviate from each other by more than 0.2, preferably 0.1. According to a preferred variant, the adhesion promoter layer also has a refractive index which deviates by no more than 0.2, preferably 0.1, from that of the plastic film, that of the casting resin layer and that of the base layer. Preferably, the casting resin layer, the plastic film and the base layer have the same color according to DIN 5033, or are colorless or achromatic. An optical "depth" similar to that of a crystal may thus be obtained.

In one embodiment of the method, at least one layer or one film of the plastic composite cover is metallized, preferably translucently metallized, and/or coated in an opaque manner, preferably coated in an opaque manner exclusively in some regions. In one embodiment, the surface of the plastic composite cover facing away from the observer is translucently metallized, e.g. coated by vapor deposition, such as chemical or physical vapor deposition, or sputtering, or so-called non-conductive vacuum metallizing (NCVM).

According to a preferred variant, at least the plastic film and the outer surface of the casting resin layer have one or more three-dimensional contours, preferably in each case a contour formed from planar surfaces, most preferably a contour forming one or more straight edges. For example, rhombus-like, facet-like and/or prismatic structures are provided in the surface of the casting resin layer and the plastic film. Preferably, the surface of the casting resin layer and the plastic film is faceted multiple times in order to imitate the visual impression of a cut diamond. In one embodiment, the plastic film in the demolded plastic composite cover is configured in a planar manner. Visually attractive light-refractive effects, which make the cover appear more attractive, may be produced by forming the surface of the casting resin layer by cast molding.

It is preferably provided that the plastic film and the outer surface of the casting resin layer form contours that follow each other. This means that the contours of the plastic film and the surface of the casting resin layer, without mandatorily having to take a strictly parallel course, are configured in such a way that they are formed so as to approximate to a parallel course, i.e. so that a uniform thickness of the casting resin layer is approximated.

It is preferably provided that a maximum extent of the plastic film is greater by at least 10 times, preferably at least 20 times, more preferably at least 30 times, than a minimum dimension, also referred to as a minimum thickness, of the obtained plastic composite cover. The minimum dimension is determined by a section through the plastic composite cover carried out in a direction perpendicular to the maximum extent of the plastic film, and is the minimum thickness of this section.

The invention also relates to a plastic composite cover for a motor vehicle having a layer structure. Here, the layer structure includes, according to the invention, a plastic film. According to the invention, the layer structure moreover has at least one base layer consisting of a first thermoplastic material, which is disposed in a manner adjoining the first plastic film on one side.

According to the invention, a casting resin layer is provided, which is disposed on the side of the plastic film facing away from the base layer and forms an outer surface of the plastic composite cover. For example, the casting resin layer is directly adjacent to the plastic film. Preferably, an adhesion promoter layer is provided between the casting resin layer and the plastic film.

It was found that the plastic composite cover according to the invention is particularly durable and comparatively light, but may still be extended without exhibiting strong internal tension in the process. In addition, it is capable of having visually attractive properties, e.g. imitate the visually attractive, in particular light-refractive, properties of a cut glass. In this case, forming the casting resin layer by cast molding permits a free and unlimited designability of its surface.

While the plastic film substantially serves for mechanical stabilization and avoidance of splintering, the adjacently disposed layers on the opposite sides of the plastic film, such as the casting resin layer produced by cast molding and the base layer formed by means of a thermoplastic material in a thermal molding process, stabilize the plastic film. Both minimize the tensions in the plastic composite cover, which were introduced into the plastic composite cover during use, for example by the impact of sunlight, but in particular during the production, e.g. by the thermoforming production process of the base layer. Thus, the casting resin layer has a restoring effect on the deformation of the plastic film caused by the shrinkage of the base layer during thermoforming and the subsequent cooling-off process. Thus, the deformations caused by the casting resin layer and the base layer compensate each other. Shrinkages of the casting resin layer, which may amount to 0.2% to 2%, for example, thus have a positive mechanical effect on the molded article consisting of the plastic film and the base layer, so that the initial stress and the deformation of the plastic film caused by the thermoforming back-molding process recede.

According to a preferred embodiment of the plastic composite cover, at least the plastic film and the casting resin layer, preferably also the base layer in addition to the plastic film and the casting resin layer, more preferably also the adhesion promoter layer, are in each case translucent or transparent.

Preferably, at least the casting resin layer, the plastic film and the base layer have an optical refractive index, wherein these refractive indices do not deviate from each other by more than 0.2, preferably 0.1. According to a preferred variant, the adhesion promoter layer also has a refractive index which deviates by no more than 0.2, preferably 0.1, from that of the plastic film, that of the casting resin layer and that of the base layer. Preferably, the casting resin layer, the plastic film and the base layer have the same color according to DIN 5033, or are colorless or achromatic. An optical "depth" similar to that of a crystal may thus be obtained.

In a preferred embodiment of the plastic composite cover, at least one layer or one film of the plastic composite cover is metallized, preferably translucently metallized, and/or coated in an opaque manner, preferably coated in an opaque manner exclusively in some regions. In one embodiment, the surface of the plastic composite cover facing away from the observer is translucently metallized, e.g. coated by vapor deposition, such as chemical or physical vapor deposition, or sputtering, or so-called non-conductive vacuum metallizing (NCVM).

According to a preferred variant of the plastic composite cover, at least the plastic film and the outer surface of the casting resin layer have one or more three-dimensional contours, preferably in each case a contour formed from planar surfaces, most preferably a contour forming one or more straight edges. For example, rhombus-like, facet-like and/or prismatic structures are provided in the surface of the casting resin layer and the plastic film. Preferably, the surface of the casting resin layer and the plastic film is faceted multiple times in order to imitate the visual impression of a cut diamond. In one embodiment, the plastic film in the demolded plastic composite cover is configured in a planar manner. Visually attractive light-refractive effects, which make the cover appear more attractive, may be produced by forming the surface of the casting resin layer by cast molding.

It is preferably provided that the plastic film and the outer surface of the casting resin layer form contours that follow each other. This means that the contours of the plastic film and the surface of the casting resin layer, without mandatorily having to take a strictly parallel course, are configured in such a way that they are formed so as to approximate to a parallel course, i.e. so that a uniform thickness of the casting resin layer is approximated.

It is preferably provided that a maximum extent of the plastic film is greater by at least 10 times, preferably at least 20 times, more preferably at least 30 times, than a minimum dimension, also referred to as a minimum thickness, of the obtained plastic composite cover. The minimum dimension is determined by a section through the plastic composite cover carried out in a direction perpendicular to the maximum extent of the plastic film, and is the minimum thickness of this section.

The invention further relates to the assembly of the plastic composite cover in any one of the above-described embodiments and a lighting means for backlighting the plastic composite cover, so that the outer surface thereof, which is formed by the casting resin layer, is backlighted by the light of the lighting means. Preferably, the lighting means is arranged in such a way that the plastic composite cover having a layer structure is penetrated by the light of the lighting means in a direction following the stacking direction of its layers.

The invention further relates to the use of the plastic composite cover in any one of the above-described embodiments in a motor vehicle.

Fourth Aspect of the Invention:

The invention according to the fourth aspect relates to a plastic composite cover. At present, the use of covers consisting of glass materials in the passenger compartment of motor vehicles is preferred for a variety of reasons. On the one hand, the cool touch is perceived as haptically pleasing, and the high transparency of the glass material and the pleasing appearance of the surface produced thereby is usually perceived as highly valuable by an observer. The comparatively expensive production and the weight of such covers is disadvantageous, particularly if the cover needs to have a certain thickness so that the three-dimensional surface contours can be integrated into the cover. Moreover, the danger of breakage and the accompanying splintering results in a not inconsiderable risk of injury, so that the integration of covers that consist entirely or partially of glass materials into the region of the dashboard in motor vehicles is out of the question. The production of a plastic cover, in particular by thermoforming, includes the risk that the cover, particularly in the case of comparatively thin covers with a large extent, may exhibit tensions, which may quickly result in the unattractive formation of cracks. Though the production of such covers as plastic composite parts by back-molding plastic films is also known, but if the plastic film in this case constitutes the outer visible surface, the contour formed by the plastic film is most frequently aesthetically disadvantageous and, in particular, rounded at the edges or similar transitions, so that the impression imitating a glass material is not produced.

Against this background, there was a demand for a method for producing a generic plastic composite cover which is comparatively light, durable and which has a high-quality appearance which at least comes close to that of glass materials.

The invention relates to a method for producing a plastic composite cover, in particular for a motor vehicle. According to the invention, a disposing step is provided, in which a first plastic film is disposed in a first molding tool so that a first cavity is formed between the first plastic film and the molding tool. The term plastic film is to be interpreted broadly, so that only a film-shaped substrate consisting of a plastic, such as a thermoplastic, preferably a polycarbonate or a polymethyl methacrylate, is mandatorily provided, which may also be coated, e.g. metallized by vapor deposition, provided with antireflective coating, scratch resistant coating or a coating increasing abrasion resistance.

According to the invention, a subsequent back-molding process of the first plastic film takes place in a first thermal molding method step while introducing a first thermoplastic material, such as a polycarbonate, into the first cavity in order to produce a partial layer structure as a molded article, wherein the partial layer structure has the first plastic film and a first base layer formed by the first thermoplastic material. In this case, the first plastic film defines an outer surface disposed on a side of the first plastic film facing away from the first layer, while the first layer defines an outer interface of the partial layer structure on the side facing away from the first plastic film, or is preferably adjacent to a second layer consisting of a thermoplastic material or to a second plastic film.

In a subsequent demolding step, which is carried out, for example, after the surface solidification of the first layer or later, the previously produced molded article is at least partially demolded.

According to the invention, the demolded partial layer structure is subsequently disposed in a second molding tool while forming a second cavity formed between the outer surface of the first plastic film and the second molding tool. In a subsequent step, the second cavity is flooded with a casting resin. In a subsequent step, the casting resin is cured, also referred to as cross-linked, in order to form a casting resin layer adjacent to the outer surface of the first plastic film and obtain a plastic composite cover consisting of the casting resin layer and at least the partial layer structure. According to the invention, the outer surface of the plastic composite cover formed by the casting resin layer is determined by the surface of the second molding tool delimiting the second cavity. Thus, the second cavity determines the shape of the outer surface of the casting resin layer facing away from the first plastic film.

In a subsequent step, the plastic composite cover produced in this way is demolded from the second molding tool.

Because the casting resin layer is produced by cast molding, its outer surface is determined by the shape of the tool, and thus, any contours can be introduced into the surface, which are visually attractive, for example, in that comparatively sharp-edged transitions are produced. For example, they have an edge radius of maximally 0.6 mm. For example, a casting resin layer whose maximum thickness is no greater than $1/10$ of the maximum thickness of the plastic composite cover is understood to be "thin". For example, the mean thickness of the casting resin layer is 0.2 to 3 mm. Preferably, the maximum thickness of the casting resin layer is less than 1 mm, preferably less than 0.7 mm. Because this layer is thin in comparison with the total thickness of the plastic cover, firstly, tensions in the plastic cover caused by the shrinking process during the cross-linking of the casting resin can be minimized, and secondly, adverse effects on colors due to yellowing can be minimized. Further steps for micro-coating or processing the surface of the casting resin layer may be provided. For example, additional micro-coatings for increasing force resistance may be applied to the surface of the casting resin layer. Micro-coatings are understood to be such coatings that have a layer thickness of a few to a few tens of micrometers.

It is preferably provided that the casting resin is a polyurethane-containing casting resin, the polyurethane preferably being an aliphatic polyurethane or a thermoplastic polyurethane. The casting resin may also contain further fillers or additives, e.g. additives for improving the resistance of the casting resin to UV irradiation.

According to a preferred embodiment of the method, a plastic composite cover with two plastic films is produced, which are spaced apart and connected, preferably by substance-to-substance connection, by one or several layers consisting in each case of one thermoplastic material. A stabilizing, dimensionally accurate and, in particular, tension-neutral base is created by this "sandwich structure" consisting of the two plastic films and the thermoplastic layer or layers. This "sandwich structure" is capable of withstanding possible tensions produced by the shrinking process of the casting resin and contributes to the dimensional stability of the plastic composite cover.

In the previously mentioned disposing step, in one embodiment of the method, a second plastic film, in addition to the first plastic film, is disposed spaced apart from the first plastic film in the first molding tool, so that the first cavity is formed between the films. During the above-mentioned back-molding of the first plastic film, the second plastic film is also laterally back-molded in the first thermal molding method step, wherein the first layer forms between the first and second plastic films. Then, a process of an at least partial demolding from the first molding tool is carried out. Also with respect to the second plastic film, the term plastic film is to be interpreted broadly, so that only a film-shaped substrate consisting of a plastic, such as a thermoplastic, preferably a polycarbonate or a polymethyl methacrylate, is mandatorily provided, which may also be coated, e.g. metallized by vapor deposition, provided with antireflective coating, scratch resistant coating or a coating increasing abrasion resistance.

According to an alternative and multi-stage variant of the method for producing a plastic composite cover including two plastic films, which was described directly above, in a step subsequent to the demolding from the first molding tool, the partial layer structure with a second plastic film is disposed in a third molding tool, wherein a third cavity is formed between the first layer and the second plastic film. The third molding tool may contain parts of the first molding tool.

According to this preferred embodiment, the second plastic film is subsequently back-molded in a second thermal molding method step while introducing a second thermoplastic material, such as a polycarbonate, into the third cavity in order to add to the partial layer structure a second layer of the second thermoplastic material and the second plastic film, in order to obtain a layer structure as a plastic composite cover, in which the first layer and the second layer are disposed, adjacent to each other at a common interface, between the first plastic film and the second plastic film.

In a subsequent step, which is carried out after the surface solidification of the second layer or later, for example, a step of demolding from the third tool takes place. Preferably, at least the first layer and the second layer are connected by substance-to-substance connection after demolding.

Then, in both above-described variants, additional surface-processing or surface-finishing steps and/or steps for removing the sprue parts and burrs on the plastic composite cover may also be provided.

Steps are also conceivable in which the first and second plastic films, which are located in the composite of the plastic composite cover, are coated for the first time or additionally after demolding.

It was found that, due to the use of two plastic films, durable, comparatively light and, nevertheless, extended and also tension-free covers can be produced, which also have visually attractive properties, and whose haptic and outer visual appearance can be adapted in almost any manner with acceptable costs by means of a corresponding coating.

In one embodiment, the step of flooding with casting resin can be carried out between the two thermal molding method steps, preferably, however, it is provided that the flooding step is carried out at a later time.

It is preferably provided that at least the first thermoplastic material of the first layer and the first plastic film and the casting resin layer are translucent, preferably transparent. In a preferred embodiment of the plastic composite cover, the first thermoplastic material and the second thermoplastic material and at least the first plastic film as well as the casting resin layer are formed in a translucent, preferably transparent manner. In one embodiment, the first plastic film facing towards the observer, such as the vehicle occupant, is formed to be transparent, while the plastic film facing away from the observer, by selecting a translucent material or by means of a translucent coating, may be coated translucently as a whole and/or, in some portions, in an opaque manner. Preferably, at least one film of the first plastic film and the second plastic film is translucently metallized, e.g. by vapor deposition, such as chemical or physical vapor deposition, or sputtering, or so-called non-conductive vacuum metallizing (NCVM). Preferably, the coating process takes place in a step preceding the respective disposing step in time.

According to a preferred embodiment, the optical refractive indices of the casting resin layer, the first plastic film and the first thermoplastic material of the first layer differ from each other by no more than 0.2, more preferably 0.1. Preferably, they have the same color according to DIN 5033, or are colorless or achromatic. An optical "depth" similar to that of a crystal may thus be obtained.

According to a preferred variant, at least the first plastic film and the outer surface of the casting resin layer have one or more three-dimensional contours, preferably in each case a contour formed from planar surfaces, most preferably a contour forming one or more straight edges. For example, rhombus-like, facet-like and/or prismatic structures are provided in the surface of the casting resin layer and the first plastic film. Preferably, the surface of the casting resin layer and the first plastic film is faceted multiple times in order to imitate the visual impression of a cut diamond. In one embodiment, the first and second plastic films in the demolded plastic composite cover are configured in a planar manner. For optical reasons, the first plastic film, the surface of the casting resin layer and the second plastic film preferably form one or more three-dimensional contours, preferably in each case a contour formed from planar surfaces. Visually attractive light-refractive effects, which make the cover appear more attractive, may be produced by forming the surface of the casting resin layer by cast molding.

It is preferably provided that the first plastic film and the outer surface of the casting resin layer form contours that follow each other. This means that the contours of the first plastic film and the surface of the casting resin layer, without mandatorily having to take a strictly parallel course, are configured in such a way that they are formed so as to approximate to a parallel course, i.e. so that a uniform thickness of the casting resin layer is approximated. It is preferably provided that both the first plastic film and the second plastic film are faceted multiple times.

It is preferably provided that a maximum extent of the first plastic film is greater by at least 10 times, preferably at least 20 times, more preferably at least 30 times, than a minimum dimension, also referred to as a minimum thickness, of the obtained plastic composite cover. The minimum dimension is determined by a section through the plastic composite cover carried out in a direction perpendicular to the maximum extent of the first plastic film, and is the minimum thickness of this section.

In order to obtain an improved seal of the second cavity, e.g. in the region between the second molding tool and the partial layer structure, the second molding tool is disposed adjacent to the first plastic film in such a manner that the first plastic film laterally protrudes over the casting resin layer.

Preferably, in the back-molding process during the first thermal molding method step and during the second thermal molding method step, the first thermoplastic material, or the second thermoplastic material, is injected in a direction parallel to the first plastic film.

The invention also relates to a plastic composite cover for a motor vehicle having a layer structure. Here, the layer structure includes, according to the invention, a first plastic film and optionally a second plastic film. According to the invention, the layer structure moreover has at least one first layer consisting of a thermoplastic material, which is disposed in a manner adjoining the first plastic film on one side and which optionally adjoins a second plastic film directly or via a second layer consisting of a second thermoplastic material. In the latter preferred embodiment, the first layer and the second layer are arranged adjacent to each other while forming a common interface, and the interface extends between the first plastic film and the second plastic film and is spaced apart from these two films. If a second plastic film is additionally provided, the first plastic film and the second plastic film are connected by substance-to-substance connection and disposed in a spaced-apart manner by the first layer or by the first layer and a second layer of a second thermoplastic material connected by substance-to-substance connection to the first layer.

According to the invention, a casting resin layer is provided, which is disposed adjacent to the first plastic film, on the side of the first plastic film facing away from the first layer, and forms an outer surface of the plastic composite cover.

It was found that the plastic composite cover according to the invention is particularly durable and comparatively light, but may still be extended without exhibiting strong internal tension in the process. In addition, it is capable of having visually attractive properties. In this case, the casting resin layer ensures a free and unlimited designability of its surface in a cast molding method step.

In a preferred embodiment of the plastic composite cover, at least the first thermoplastic material of the first layer, the first plastic film and the casting resin layer are formed in a translucent, preferably transparent manner. Still more preferably, the second thermoplastic material and at least one film of the first plastic film and the second plastic film are formed in a translucent, preferably transparent manner. In one embodiment, the first plastic film, which defines a visible surface facing towards the observer, such as the vehicle occupant, is formed to be transparent, while the plastic film facing away from the observer, by selecting a translucent material or by means of a translucent coating, may be coated translucently as a whole and/or, in some portions, in an opaque manner. Preferably, at least one film of the first plastic film and the second plastic film is translucently metallized, e.g. by vapor deposition, such as chemical or physical vapor deposition, or sputtering, or so-called non-conductive vacuum metallizing (NCVM).

According to a preferred embodiment, the optical refractive indices of the casting resin layer, the first plastic film and the first thermoplastic material of the first layer differ from each other by no more than 0.2, more preferably 0.1. Preferably, they have the same color according to DIN 5033, or are colorless or achromatic. An optical "depth" similar to that of a crystal may thus be obtained.

According to a preferred variant of the plastic composite cover, at least the first plastic film and the outer surface of the casting resin layer have one or more three-dimensional contours, preferably in each case a contour formed from planar surfaces, most preferably a contour forming one or more straight edges. In one embodiment, the first and second plastic films in the demolded plastic composite cover are configured in a planar manner. For optical reasons, the first plastic film, the surface of the casting resin layer and the second plastic film preferably form one or more three-dimensional contours, preferably in each case a contour formed from planar surfaces. Visually attractive light-refractive effects may thus be produced, which make the cover appear more attractive. For example, one or more prismatic contours are provided. Visually attractive light-refractive effects may thus be produced, which make the cover appear more attractive.

It is preferably provided that the first plastic film and the outer surface of the casting resin layer form contours that follow each other. This means that the contours of the first plastic film and the surface of the casting resin layer, without mandatorily having to take a strictly parallel course, are configured in such a way that they are formed so as to approximate to a parallel course, i.e. so that a uniform thickness of the casting resin layer is approximated. It is preferably provided that, furthermore, the respective contour of the second plastic film follows that of the first plastic film. For example, the first plastic film has a convex configuration, while the second plastic film, with respect to the respectively adjacent layer, has a concave configuration at the corresponding location.

It is preferably provided that a maximum extent of the first plastic film is greater by at least 10 times, preferably at least 20 times, more preferably at least 30 times, than a minimum dimension of the obtained plastic composite cover.

Preferably, at least the first layer and the second layer are connected by substance-to-substance connection. Still more preferably, the first plastic film is connected to the first layer by substance-to-substance connection and the first layer is connected to the second layer by substance-to-substance connection, while the second layer is moreover connected to the second plastic film by substance-to-substance connection.

The invention further relates to the assembly of the plastic composite cover in any one of the above-described embodiments and a lighting means for backlighting the plastic composite cover, so that the outer surface thereof, which is formed by the casting resin layer, is backlighted by the light of the lighting means. Preferably, the lighting means is arranged in such a way that the plastic composite cover having a layer structure is penetrated by the light of the lighting means in a direction following the stacking direction of its layers.

The invention further relates to the use of the plastic composite cover in any one of the above-described embodiments in a motor vehicle.

Fifth Aspect of the Invention:

The invention according to the fifth aspect relates to a plastic composite cover. At present, the use of covers consisting of glass materials is preferred for a variety of reasons. On the one hand, the cool touch is perceived as haptically pleasing, and the high transparency of the glass material and the pleasing appearance of the surface produced thereby is usually perceived as highly valuable by an observer. The comparatively expensive production and the weight of such covers is disadvantageous, particularly if the cover needs to have a certain thickness so that the three-dimensional surface contours can be integrated into the cover. Moreover, the danger of breakage and the accompanying splintering results in a not inconsiderable risk of injury, so that the integration of covers that consist entirely or partially of glass materials into the region of the dashboard in motor vehicles is out of the question. The production of a plastic cover includes the risk that the cover, particularly in the case of comparatively thin covers with a large extent, exhibits tensions, which quickly results in the unattractive formation of cracks.

Against this background, there was a demand for a method for producing a generic plastic composite cover which is comparatively light, durable and which has a high-quality appearance which at least comes close to that of glass materials.

The invention relates to a method for producing a plastic composite cover, in particular for a motor vehicle. According to the invention, a disposing step is provided, in which a first plastic film is disposed in a first molding tool so that a first cavity is formed between the first plastic film and the molding tool. The term plastic film is to be interpreted broadly, so that only a film-shaped substrate consisting of a plastic, such as a thermoplastic, preferably a polycarbonate, is mandatorily provided, which may also be coated, e.g. metallized by vapor deposition, provided with antireflective coating, scratch resistant coating or a coating increasing abrasion resistance.

According to the invention, the first plastic film is subsequently back-molded in a first thermal molding method step while introducing a first thermoplastic material, such as polycarbonate, into the first cavity in order to produce a partial layer structure as a molded article, wherein the partial layer structure has the first plastic film and a first layer formed by the first thermoplastic material, and the first layer defines, on the side facing away from the first plastic film, an outer interface of the partial layer structure.

In a subsequent demolding step, which is carried out, for example, after the surface solidification of the first layer or later, the previously produced molded article is at least partially demolded.

In a subsequent step, the molded article and a second plastic film are disposed in a second molding tool while forming a second cavity formed between the interface and the second plastic film. The second molding tool preferably contains parts of the first molding tool. Also with respect to the second plastic film, the term plastic film is to be interpreted broadly, so that only a film-shaped substrate consisting of a plastic, such as a thermoplastic, preferably a polycarbonate, is mandatorily provided, which may also be coated, e.g. metallized by vapor deposition, provided with antireflective coating, scratch resistant coating or a coating increasing abrasion resistance.

According to the invention, the second plastic film is subsequently back-molded in a second thermal molding method step while introducing a second thermoplastic material, such as a polycarbonate, into the second cavity in order to add to the partial layer structure a second layer of the second thermoplastic material and the second plastic film, in order to obtain a layer structure as a plastic composite cover, in which the first layer and the second layer are disposed, adjacent to each other at the common interface, between the first plastic film and the second plastic film.

In a subsequent step, which is carried out after the surface solidification of the second layer or later, for example, the plastic composite cover is demolded. Then, additional surface-processing or surface-finishing steps and/or steps for removing the sprue parts and burrs on the plastic composite cover, for example, may also be provided. Steps are also conceivable in which the first and second plastic films, which are located in the composite of the plastic composite cover, are coated for the first time or additionally after demolding. It was found that, due to method according to the invention, durable, comparatively light and, nevertheless, extended and also tension-free covers can be produced, which also have visually attractive properties, and whose haptic and outer visual appearance can be adapted in almost any manner with acceptable costs by means of a corresponding coating.

In a preferred embodiment, the first thermoplastic material and the second thermoplastic material and at least one film of the first plastic film and the second plastic film are formed in a translucent, preferably transparent manner. In one embodiment, the first plastic film, which defines a visible surface facing towards the observer, such as the vehicle occupant, is formed to be transparent, while the plastic film facing away from the observer, by selecting a translucent material or by means of a translucent coating, may be coated translucently as a whole and/or, in some portions, in an opaque manner. Preferably, at least one film of the first plastic film and the second plastic film is translucently metallized, e.g. by vapor deposition, such as chemical or physical vapor deposition, or sputtering, or so-called non-conductive vacuum metallizing (NCVM). Preferably, the coating process takes place in a step preceding the respective disposing step in time.

One embodiment provides, for example, that an optically visible transition remains at the interface between the first and second layers, and that the first and second thermoplastic materials differ from each other with regard to their composition or the optical properties, such as the color or optical transmittance. However, a match in the composition or the optical properties of the first and second layers is preferred. A match in both, i.e. composition and optical properties, is most preferred.

In one embodiment, the first and second plastic films in the demolded plastic composite cover are configured in a planar manner. For optical reasons, the first plastic film and/or the second plastic film and/or the interface preferably form one or more three-dimensional contours, preferably in each case a contour formed from planar surfaces. Visually attractive light-refractive effects may thus be produced, which make the cover appear more attractive.

According to a preferred embodiment, the contours of the first plastic film and the second plastic film, preferably of the first plastic film and the second plastic film and the interface, are formed so as to follow each other. This means that the contours, without mandatorily having to take a strictly parallel course, are configured in such a way that they are formed so as to approximate to a parallel course, i.e. so that a uniform thickness of the plastic composite cover is approximated. For example, the first plastic film has a convex configuration, while the second plastic film, with respect to the respectively adjacent layer, has a concave configuration at the corresponding location.

Preferably, the method is configured in such a way that at least the first layer and the second layer are connected by substance-to-substance connection after demolding. Still more preferably, the first plastic film is connected to the first layer by substance-to-substance connection during back-molding, and the first layer is connected to the second layer by substance-to-substance connection when the second plastic film is back-molded, while the second layer is moreover connected to the second plastic film by substance-to-substance connection.

It is preferably provided that a maximum distance, which is determined by means of a perpendicular on the interface, between the first plastic film and the second plastic film is smaller by at least 10 times, preferably at least 20 times, more preferably at least 30 times, than a maximum extent of the interface.

Preferably, in the back-molding process during the first thermal molding method step and during the second thermal molding method step, the first thermoplastic material, or the second thermoplastic material, is injected in a direction parallel to the interface.

The invention also relates to a plastic composite cover for a motor vehicle having a layer structure. Here, the layer structure includes, according to the invention, a first plastic film and a second plastic film. According to the invention, the layer structure moreover has a first layer consisting of a thermoplastic material, which is disposed in a manner adjoining the first plastic film, and a second layer consisting of a second thermoplastic material disposed adjacent to the second plastic film. In this case, the first layer and the second layer are arranged adjacent to each other while forming a common interface, and the interface extends between the first plastic film and the second plastic film and is spaced apart from these two films.

It was found that the plastic composite cover according to the invention is particularly durable and comparatively light, but may still be extended without exhibiting strong internal tension in the process. In addition, it is capable of having visually attractive properties. In this case, its haptic and outer visual appearance can easily be adapted by means of a corresponding coating and in almost any manner with acceptable costs.

In a preferred embodiment of the plastic composite cover, the first thermoplastic material and the second thermoplastic material and at least one film of the first plastic film and the second plastic film are formed in a translucent, preferably transparent manner. In one embodiment, the first plastic film, which defines a visible surface facing towards the observer, such as the vehicle occupant, is formed to be transparent, while the plastic film facing away from the observer, by selecting a translucent material or by means of a translucent coating, may be coated translucently as a whole and/or, in some portions, in an opaque manner. Preferably, at least one film of the first plastic film and the second plastic film is translucently metallized, e.g. by vapor deposition, such as chemical or physical vapor deposition, or sputtering, or so-called non-conductive vacuum metallizing (NCVM).

One embodiment provides, for example, that an optically visible transition is visible at the interface between the first and second layers, and that the first and second thermoplastic materials differ from each other with regard to their composition or the optical properties, such as the color. However, a match in the composition or the optical properties of the first and second layers is preferred. A match in both, i.e. composition and optical properties, is most preferred.

In one embodiment of the plastic composite cover, the first and second plastic films are configured in a planar manner. For optical reasons, the first plastic film and/or the second plastic film and/or the interface preferably form one or more three-dimensional contours, preferably in each case a contour formed from planar surfaces, such as a prismatic contour. Visually attractive light-refractive effects may thus be produced, which make the cover appear more attractive.

According to a preferred embodiment, the contours of the first plastic film and the second plastic film, preferably of the first plastic film and the second plastic film and the interface, are formed so as to follow each other. This means that the contours, without mandatorily having to take a strictly parallel course, are configured in such a way that they are formed so as to approximate to a parallel course, i.e. so that a uniform thickness of the plastic composite cover is approximated. For example, the first plastic film has a convex configuration, while the second plastic film, with respect to the respectively adjacent layer, has a concave configuration at the corresponding location.

Preferably, at least the first layer and the second layer are connected by substance-to-substance connection. Still more preferably, the first plastic film is connected to the first layer by substance-to-substance connection and the first layer is connected to the second layer by substance-to-substance connection, while the second layer is moreover connected to the second plastic film by substance-to-substance connection.

It is preferably provided that a maximum distance, which is determined by means of a perpendicular on the interface, between the first plastic film and the second plastic film is smaller by at least 10 times, preferably at least 20 times, more preferably at least 30 times, than a maximum extent of the interface.

The invention further relates to the assembly of the plastic composite cover in any one of the above-described embodiments and a lighting means for backlighting the plastic composite cover. Preferably, the lighting means is arranged in such a way that the plastic composite cover having a layer structure is penetrated by the light of the lighting means in a direction following the stacking direction of its layers.

The invention further relates to the use of the plastic composite cover in any one of the above-described embodiments in a motor vehicle.

The present invention according to the aspects one to five is explained in greater detail below under reference to the drawings. The drawings are thereby to be understood only as examples, and each merely represent an embodiment.

First Aspect of the Invention According to the FIGS. 1 to 9:

FIG. 1a shows the disposing step of a first embodiment of the method of the invention according to the first aspect of the invention, in which a pre-molded film layer structure 2 consisting of two plastic films 2a, 2c is disposed in a molding tool 20a, 20b consisting of two tool halves. The step of pre-molding the film layer structure 2 provided according to the invention is not shown in detail, but results from the shape of the pre-molded film layer structure 2.

FIG. 1a shows only a section of the tool 20a, 20b. A transparent adhesive layer 2b is provided between the two adjacent, transparent plastic films 2a, 2c of the film layer structure 2, in order to connect the two plastic films 2a, 2c by substance-to-substance connection, as is shown in detail in the enlarged illustration in FIG. 1b. The film layer structure 2 has two main surfaces, a first main surface 11 and a second main surface 12, which are spaced apart in the stacking direction of its layers, and which are formed by plastic films 2a, 2c and an adhesive layer 2b. The film layer structure 2 defines the largest extent, the maximum extent, of the entire plastic composite panel 1, as is shown later in FIG. 5. One of the two transparent plastic films 2a or 2c is coated with a metallic, translucent coating (layer thickness <20 μm) in order to produce a light effect layer with a metallic gloss, with a semi-transparent (transmission approx. 5% to 25% in the more visible range) mirror effect being produced. The transparent plastic films 2a and 2c have additional transparent or translucent coatings, such as a protective paint coating. For reasons of scale and simplification, the coatings are not shown in FIG. 1b. The adhesive of the adhesive layer 2b is thermosetting, and is also transparent. The total thickness of the film layer structure 2 in the stacking direction of its layers is, for instance, between 0.125 mm to 0.50 mm. When disposing the pre-molded film layer structure 2 in the molding tool 20a, 20b, it is placed such that one of its two main surfaces, in this case the first main surface 11, faces towards a specific molding surface 21 of the molding tool 20a, 20b, and thus, the second main surface 12 faces away from the molding surface 21. The specific molding surface 21 is supposed to define the final shape of the film layer structure 2 and is characterized in that it forms one or several three-dimensional contours 4 as raised portions and/or depressions formed from planar surfaces that are placed at an angle to each other and adjoin each other in straight edges 5, i.e. imitates the surface contour of a cut diamond. The roughness of the molding surface 21 is VDI 3400 Ref 12 or better.

When the film layer structure 2 is disposed in the molding tool 20a, 20b, a cavity 8 is formed between the second main surface 12 facing away from the first main surface 11 and the surface 22 of the molding tool 20a, 20b, whereas a remaining cavity 9 between the first main surface 11 of the film layer structure 2 and the molding surface 21 is supposed to be reduced in the subsequent step. The remaining cavity 9 is the result of the fact that the film layer structure 2, in the pre-molding step, was merely pre-molded to approximate the final shape. On the other hand, the pre-molding step is necessary in order to obtain, during the subsequent back-molding process, as complete a contact of the film layer structure 2 with the molding surface 21 as possible, so that it can obtain its final shape, which replicates the contour 4 or contours. This is a hot forming and/or isostatic high-pressure forming step in a pre-molding tool, which has a pre-molding surface. The pre-molding step precedes the step shown in FIG. 1a. Here, the purpose is to pre-mold the film layer structure 2 into a shape which is not congruent with the final shape determined by the molding tool 20a, 20b, particularly the molding surface 21 thereof, but which permits an easier disposal of the film layer structure 2 in the molding tool 20a, 20b and ensures that the final shape is obtained.

Figure 2B:
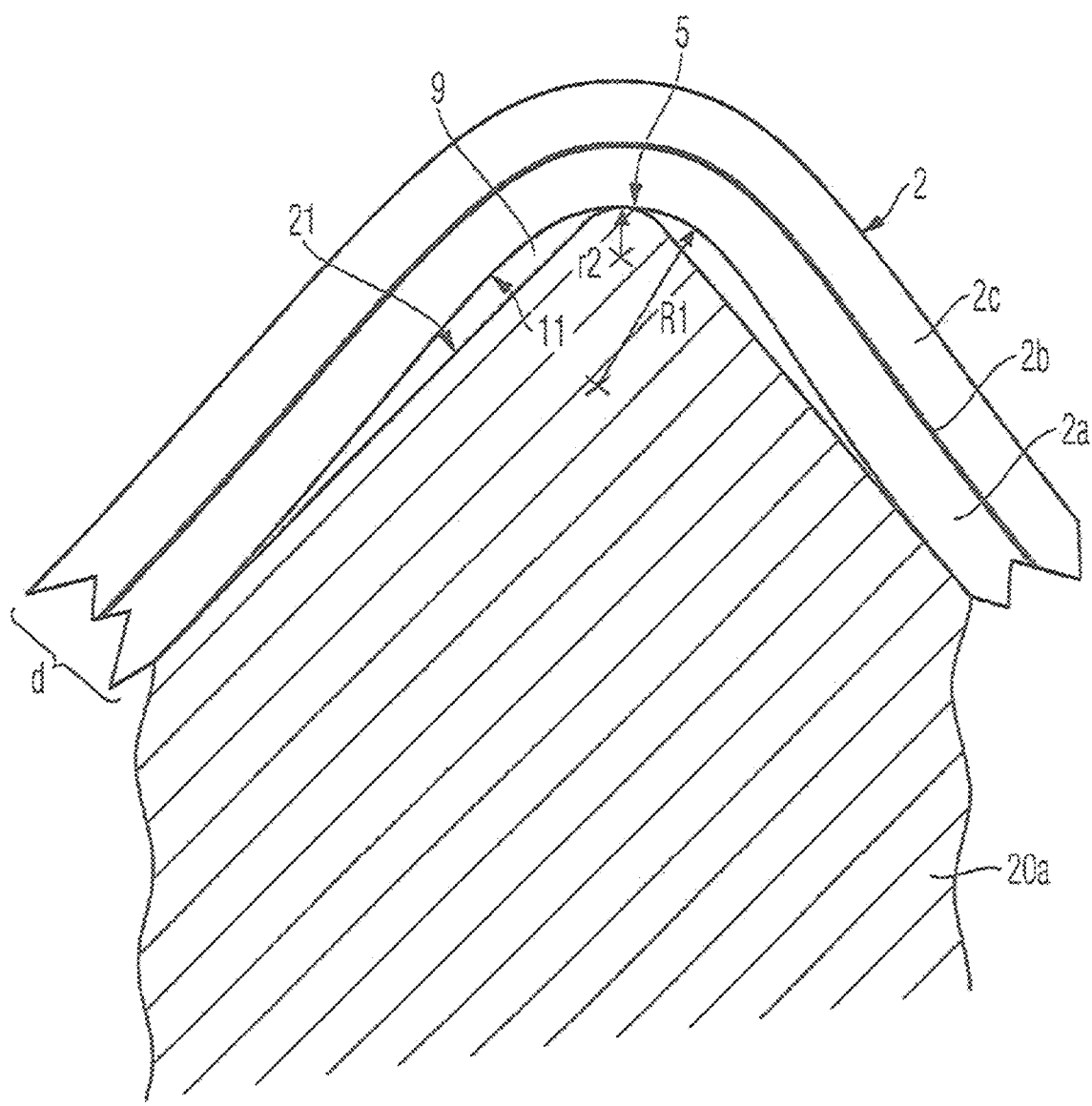
FIG. 2b shows another schematic cross-sectional view of a detail of the pre-molded film layer structure 2 disposed in the molding tool.

An exact match of the pre-molded shape with the final shape is not desired for several reasons; thus, not only is the positionally exact arrangement in the molding tool 20a, 20b made more difficult, but there is the risk that the edges that were possibly otherwise already incorporated into the film layer structure during pre-molding are not exactly congruent with the edges in the molding tool 20a, 20b, which results in adverse effects on the visual appearance of the entire layer structure. For this reason, at least a formation of sharp edges in the film layer structure 2 is omitted, compared to those of the final shape. In other words, the pre-edges of the pre-molding surface are rounded compared with the edges 5 of the molding surface 21. As the FIGS. 2a and 2b show at a trough or peak of the molding surface 21, the pre-molded film layer structure 2 has a curvature radius R1 of the first main surface 11 of the film layer structure 2, which is caused by pre-molding by means of the pre-edge of the pre-molding surface and which is incorporated at a location which corresponds to an edge 5 of the molding surface 21 of the molding tool 20a. 20b and is in each case greater than the thickness d of the film layer structure 2. This also implies that the pre-edges of the pre-molding tool used for pre-molding the film layer structure 2 have a larger radius than the edge 5 in the molding surface 21 of the molding tool 20a, 20b, which corresponds thereto due to its placement in space and which has a radius r2.

In a simple variant, for example, the three-dimensional pre-molding caused by pre-molding is characterized in that only the maximum heights and maximum depths of the pre-molded shape are formed at the locations corresponding to the final shape. Preferably, however, the pre-molding surface also has edges, which are referred here to as pre-edges and which pre-mold the film layer structure 2 in such a way that the latter, at the locations of the pre-edges, has a curvature with a radius corresponding to at least twice the thickness of the film layer structure 2. The pre-molding surface is configured in such a way that the pre-edges placed at the corresponding location of the edges 5 of the molding surface 21 have a radius which is greater, preferably several times greater, than the radius of the corresponding edge 5 of the molding surface 21.

Figure 3:
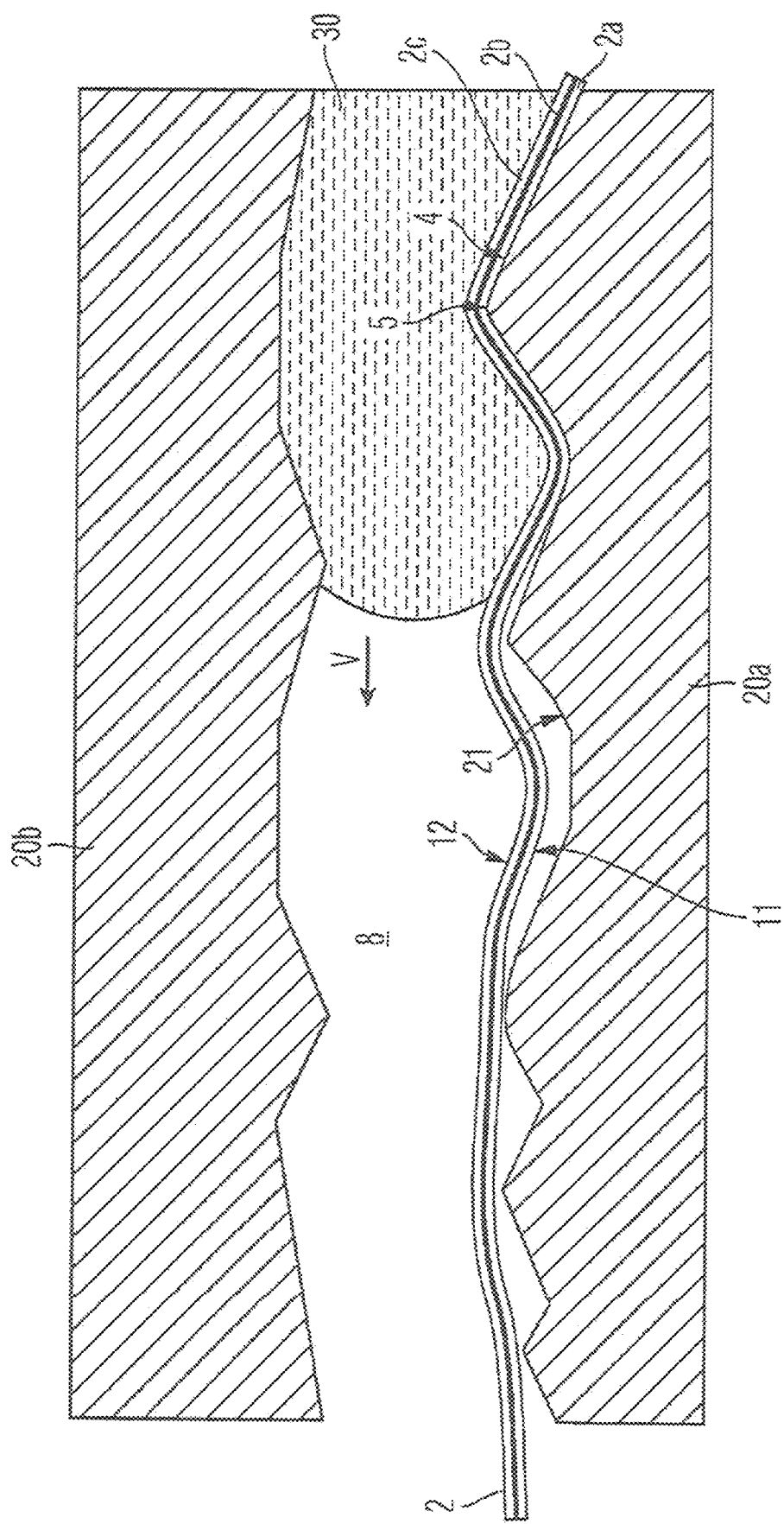
Figure 5:
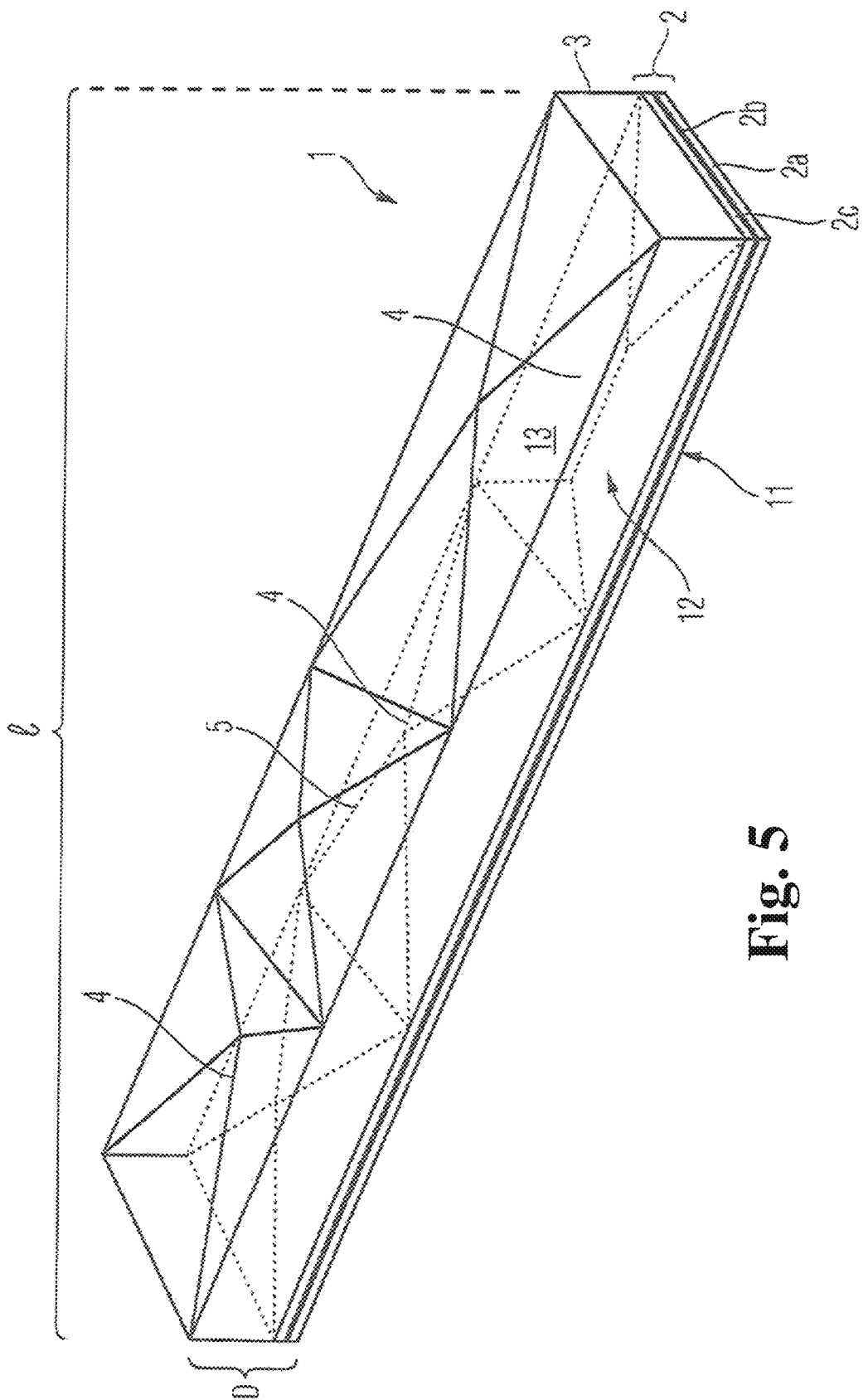

In the subsequent back-molding step of FIG. 3, the tool 20a, 20b is closed and a thermoplastic material 30 is laterally injected under pressure into the cavity 8, in accordance with the direction arrow V. This ensures that the film layer structure 2 nestles up against the molding surface 21, and its profile thus takes on the three-dimensional contours 4 as a negative imprint. The pressure of the thermoplastic material ensures that the film layer structure 2 is adapted and embossed so as to correspond to the profile of the molding surface, while the temperature of the thermoplastic material of, for example, approx. 300° C. and the temperature of the molding tool of approx. 60° C. causes the adhesive of the adhesive layer 2b to cure and thus the completely formed film layer structure 2 to be stabilized. When the cavity 8 is completely filled up, the state shown in FIG. 4a has been reached. When the thermoplastic material 30 has solidified, the thermoplastic layer 3 is formed, which is adjacent to the second main surface 12 of the film layer structure 2. When the thermoplastic layer 3 has solidified, it is connected by substance-to-substance connection to the film layer structure 2.

As FIG. 4b shows, the film layer structure has nestled up the edges 5 of the contours 4 of the molding surface 21. After the thermoplastic material has solidified and after the curing, i.e. the complete solidification, of the adhesive of the adhesive layer 2b, the obtained layer structure consisting of the film layer structure 2 and the thermoplastic layer 3 is removed from the tool 20a, 20b in order to obtain the plastic composite panel 1 according to the invention, which is shown in a perspective top view in FIG. 5.

The plastic composite panel 1 according to the invention is intended for use in a motor vehicle that is not shown, and is disposed, for example, in a dashboard or a center console that is part of the vehicle, and serves as a visually attractive, backlighted display surface of a function display. The plastic composite panel 1 has an elongated configuration; thus, the film layer structure 2, or its plastic films 2a, 2b associated with the plastic composite panel 1 has a maximum dimension 1 which exceeds the minimum dimension D of the plastic composite panel 1 several times. The minimum dimension D is defined by the minimum thickness of the plastic composite panel 1, which is not depicted exactly to scale in FIG. 4. Its maximum extent, which refers to the film layer structure 2, is marked with 1 and is greater than 50 cm, such as 1 m, for example. The minimum thickness D of the plastic composite panel 1 in the approximate stacking direction of its layers is in the range of 1 to 3 cm. The layer structure has a thermoplastic layer 3 which, if installed as intended, defines an outer surface 13 facing towards the vehicle occupant. Seen from the vehicle occupant, the film layer structure 2 which, by means of a thermal back-molding process, is connected to the film layer structure 2 by substance-to-substance connection, is located underneath the thermoplastic layer 3. The film layer structure 2 includes at least two transparent plastic films 2a, 2c and at least one adhesive layer 2b disposed between, in each case, two plastic films 2a, 2c and connecting the two plastic films 2a, 2b by substance-to-substance connection, wherein the film layer structure 2 defines two outer main surfaces 11, 12 that are opposite each other in the stacking direction of its layers, of which a first one is an outer main surface, i.e. a main surface 11 defining an exposed surface, which is defined by the outer plastic film 2a of the film layer structure 2 or, if provided, its coating, wherein the aforementioned thermoplastic layer 3 is adjacent to the second main surface 12. In this case, the film layer structure 2 is formed in such a way, according to the invention, that all surfaces and interfaces of the film layer structure 2, i.e. all surfaces or interfaces between the plastic films 2a, 2c, their optional coatings and the adhesive layer 2b, form, almost congruently, one or several three-dimensional contours 4 formed from planar surfaces that are placed at an angle to each other and adjoin each other in straight edges 5. For example, the contour 4 has a tip pointing in the direction of the thermoplastic layer 3 or in the opposite direction. Thus, the plastic composite panel according to the invention imitates in an optically ideal manner a surface structure of a polished diamond. This is ascribed to the use of a film layer structure 2 containing several plastic films and at least one adhesive layer, which takes on the surface shape containing the contour 4 perfectly and retains it permanently. In particular, the straight and sharp-edged course of the edges typical for a polished diamond can thus be ideally replicated; this is advantageous particularly if the contour 4 becomes discernible when viewed through the thermoplastic layer 3.

FIG. 6a shows the disposing step of a second embodiment of the method of the invention, in which, in addition to a film layer structure 2 consisting of two plastic films 2a, 2c, an additional plastic film 6 consisting of a transparent thermoplastic material is disposed in a molding tool 20a, 20b consisting of two tool halves. FIG. 6a shows only a section of the tool 20a, 20b. An adhesive layer 2b is provided between the two adjacent plastic films 2a, 2c of the film layer structure 2, in order to connect the two plastic films 2a, 2c by substance-to-substance connection, as is shown in detail in the enlarged illustration in FIG. 5b. The film layer structure 2 has two main surfaces, a first main surface 11 and a second main surface 12, which are spaced apart in the stacking direction of its layers, and which are formed by plastic films 2a, 2c and an adhesive layer 2b. The film layer structure 2 defines the largest extent, the maximum extent, of the film layer structure 2, as is shown later in FIG. 9. The transparent plastic films 2a and 2c have additional transparent or translucent coatings, such as a protective paint coating or a metallic, non-conductive coating. The latter is provided for influencing the optical reflective behavior of the film. For reasons of scale and simplification, the coatings are not shown in FIG. 5b. The adhesive of the adhesive layer 2b is thermosetting, and is also transparent. For example, the total thickness of the film layer structure 2 in the stacking direction of its layers is between 0.125 mm to 0.50 mm.

When the film layer structure 2 is disposed in the molding tool 20a, 20b, a cavity 8 is formed between the second main surface 12 facing away from the first main surface 11 and the surface 22 of the molding tool 20a, 20b, whereas a remaining cavity 9 between the first main surface 11 of the film layer structure 2 and the molding surface 21 is supposed to be reduced in the subsequent step. The remaining cavity 9 is the result of the fact that the film layer structure 2, in the pre-molding step, was merely pre-molded to approximate the final shape. On the other hand, the pre-molding step is necessary in order to obtain, during the subsequent back-molding process, as complete a contact of the film layer structure 2 with the molding surface 21 as possible, so that it can obtain its final shape, which replicates the contour 4 or contours. This is a hot forming and/or isostatic high-pressure forming step in a pre-molding tool, which has a pre-molding surface. The pre-molding step precedes the step shown in FIG. 6a. Here, the purpose is to pre-mold the film layer structure 2 into a shape which is not congruent with the final shape determined by the molding tool 20a, 20b, particularly the molding surface 21 thereof, but which permits an easier disposal of the film layer structure 2 in the molding tool 20a, 20b and ensures that the final shape is obtained.

An exact match of the pre-molded shape with the final shape is not desired for several reasons; thus, not only is the positionally exact arrangement in the molding tool 20a, 20b made more difficult, but there is the risk that the edges that were possibly otherwise already incorporated into the film layer structure during pre-molding are not exactly congruent with the edges in the molding tool 20a, 20b, which results in adverse effects on the visual appearance of the entire layer structure. For this reason, at least a formation of sharp edges in the film layer structure 2 is omitted, compared to those of the final shape. In other words, the pre-edges of the pre-molding surface are rounded compared with the edges 5 of the molding surface 21.

In a simple variant, for example, the three-dimensional pre-molding caused by pre-molding is characterized in that only the maximum heights and maximum depths of the pre-molded shape are formed at the locations corresponding to the final shape. Preferably, however, the pre-molding surface also has edges, which are referred here to as pre-edges and which pre-mold the film layer structure 2 in such a way that the latter, at the locations of the pre-edges, has a curvature with a radius corresponding to at least twice the thickness of the film layer structure 2. The pre-molding surface is configured in such a way that the pre-edges placed at the corresponding location of the edges 5 of the molding surface 21 have a radius which is greater, preferably several times greater, than the radius of the corresponding edge 5 of the molding surface 21.

Figure 7:
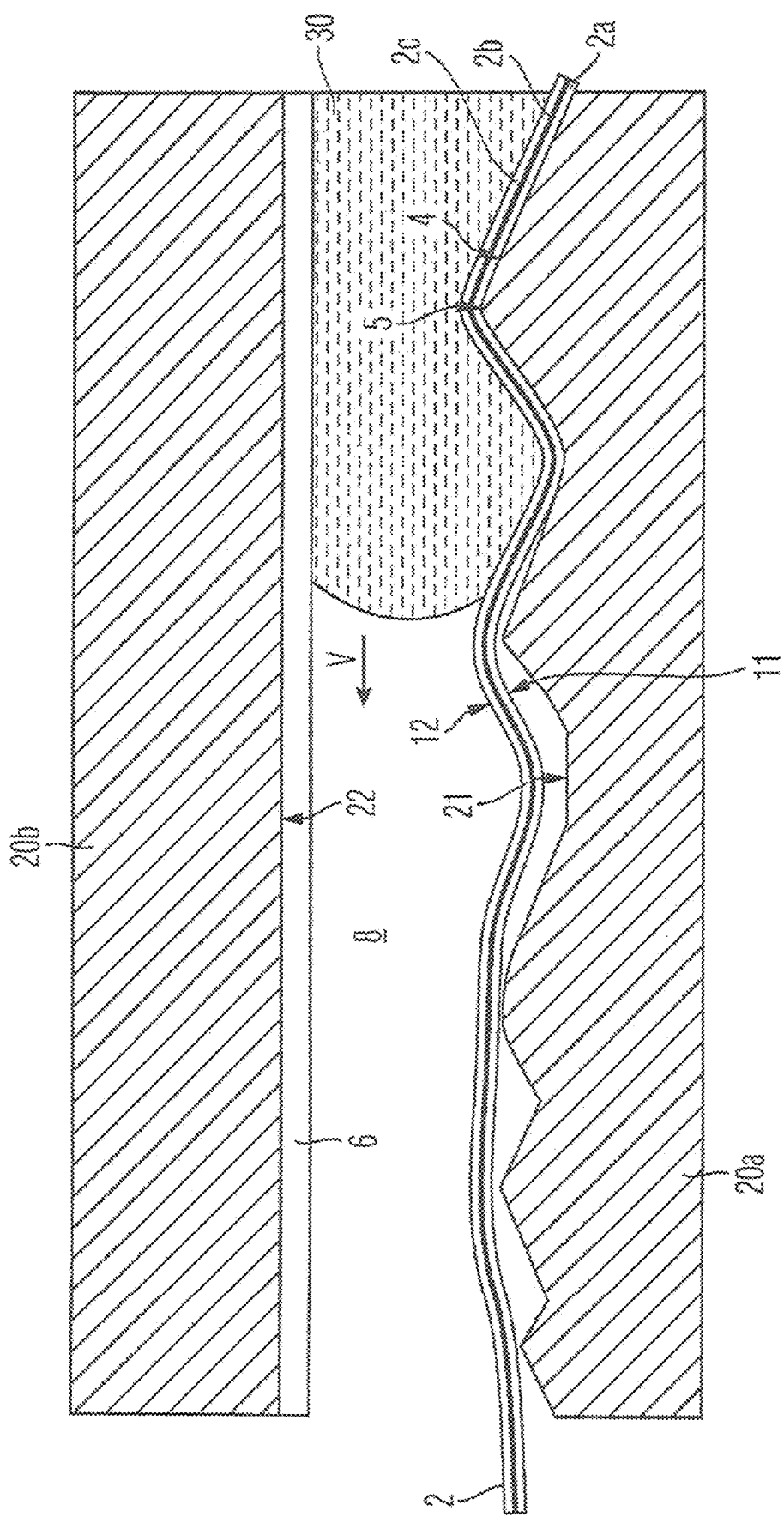
Figure 9:
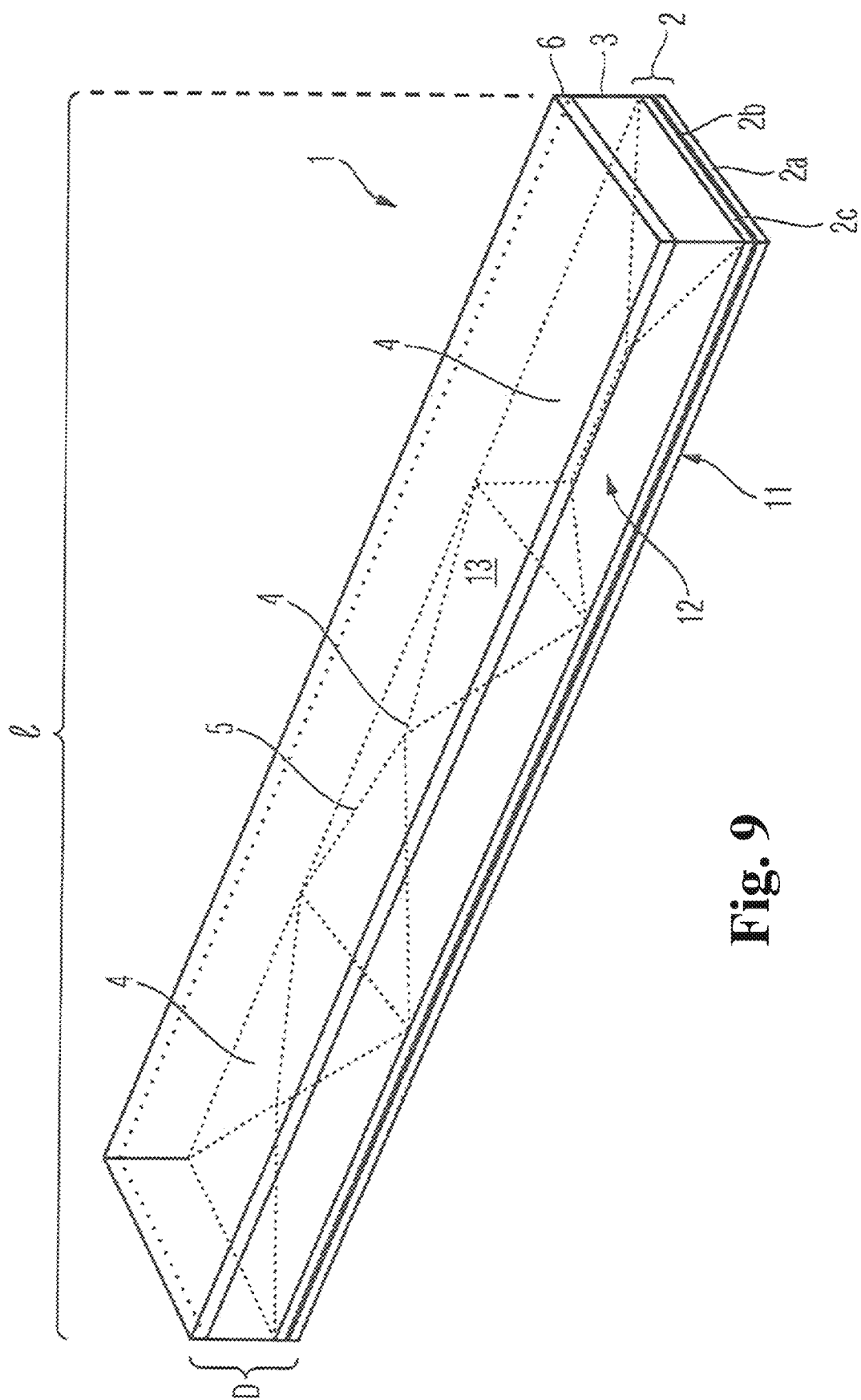

In the subsequent back-molding step of FIG. 7, the tool 20a, 20b is closed and a transparent thermoplastic material 30 is laterally injected under pressure into the cavity 8, in accordance with the direction arrow V. This ensures that the film layer structure 2 nestles up against the molding surface 21, and its profile thus takes on the three-dimensional contours 4 as a negative imprint. The pressure of the thermoplastic material ensures that the film layer structure 2 is adapted and embossed so as to correspond to the profile of the molding surface, while the temperature of the thermoplastic material of, for example, approx. 300° C. and the temperature of the molding tool of approx. 60° C. causes the adhesive of the adhesive layer 2b to cure and thus the completely formed film layer structure 2 to be stabilized. When the cavity 8 is completely filled up, the state shown in FIG. 8a has been reached. When the thermoplastic material 30 has solidified, the thermoplastic layer 3 is formed, which is adjacent to the second main surface 12 of the film layer structure 2. When the thermoplastic layer 3 has solidified, it is connected by substance-to-substance connection to the film layer structure 2 and to the additional plastic film 6.

As FIG. 8b shows, the film layer structure 2 has nestled up the edges 5 of the contours 4 of the molding surface 21. After the thermoplastic material has solidified and after the curing, i.e. the complete solidification, of the adhesive of the adhesive layer 2b, the obtained layer structure consisting of the film layer structure 2 and the thermoplastic layer 3 is removed from the tool 20a, 20b in order to obtain the plastic composite panel 1 according to the invention, which is shown in a perspective top view in FIG. 9.

The plastic composite panel 1 according to the invention is intended for use in a motor vehicle that is not shown, and is disposed, for example, in a dashboard or a center console that is part of the vehicle, and serves as a visually attractive, backlighted display surface of a function display. The plastic composite panel 1 has an elongated configuration; thus, the film layer structure 2, or its plastic films 2a, 2b associated with the plastic composite panel 1 has a maximum dimension 1 which exceeds the minimum dimension D of the plastic composite panel 1 several times. The minimum dimension D is defined by the minimum thickness of the plastic composite panel 1 in the stacking direction of the layers or films of the plastic composite panel 1, which is not depicted exactly to scale in FIG. 4. Its maximum extent, which refers to the film layer structure 2, is marked with 1 and is greater than 50 cm, such as 1 m, for example. The minimum thickness D of the plastic composite panel 1 in the stacking direction of its layers is in the range of 1 to 3 cm. The layer structure includes an additional transparent plastic film 6 and a thermoplastic layer 3 which is disposed thereunder and connected to the plastic film 6 by substance-to-substance connection. If installed as intended, the additional plastic film defines an outer surface 13 facing towards the vehicle occupant. Seen from the vehicle occupant, the film layer structure 2 which, by means of a thermal back-molding process, is connected to the film layer structure 2 by substance-to-substance connection, is located underneath the thermoplastic layer 3. The film layer structure 2 includes at least two transparent plastic films 2a. 2c and at least one adhesive layer 2b disposed between, in each case, two plastic films 2a, 2c and connecting the two plastic films 2a, 2b by substance-to-substance connection, wherein the film layer structure 2 defines two outer main surfaces 11, 12 that are opposite each other in the stacking direction of its layers, of which a first one is an outer main surface, i.e. a main surface 11 defining an exposed surface, which is defined by the outer plastic film 2a of the film layer structure 2 or, if provided, its coating, wherein the aforementioned thermoplastic layer 3 is adjacent to the second main surface 12. In this case, the film layer structure 2 is formed in such a way, according to the invention, that all surfaces and interfaces of the film layer structure 2, i.e. all surfaces or interfaces between the plastic films 2a, 2c, their optional coatings and the adhesive layer 2b, form, almost congruently, one or several three-dimensional contours 4 formed from planar surfaces that are placed at an angle to each other and adjoin each other in straight edges 5. For example, the contour 4 has a tip pointing in the direction of the thermoplastic layer 3 or in the opposite direction. Thus, the plastic composite panel according to the invention imitates in an optically ideal manner a surface structure of a polished diamond. This is ascribed to the use of a film layer structure 2 containing several plastic films and at least one adhesive layer, which takes on the surface shape containing the contour 4 perfectly and retains it permanently. In particular, the straight and sharp-edged course of the edges typical for a polished diamond can thus be ideally replicated; this is advantageous particularly if the contour 4 becomes discernible when viewed through the additional plastic film 6 and the thermoplastic layer 3.

Figure 10:
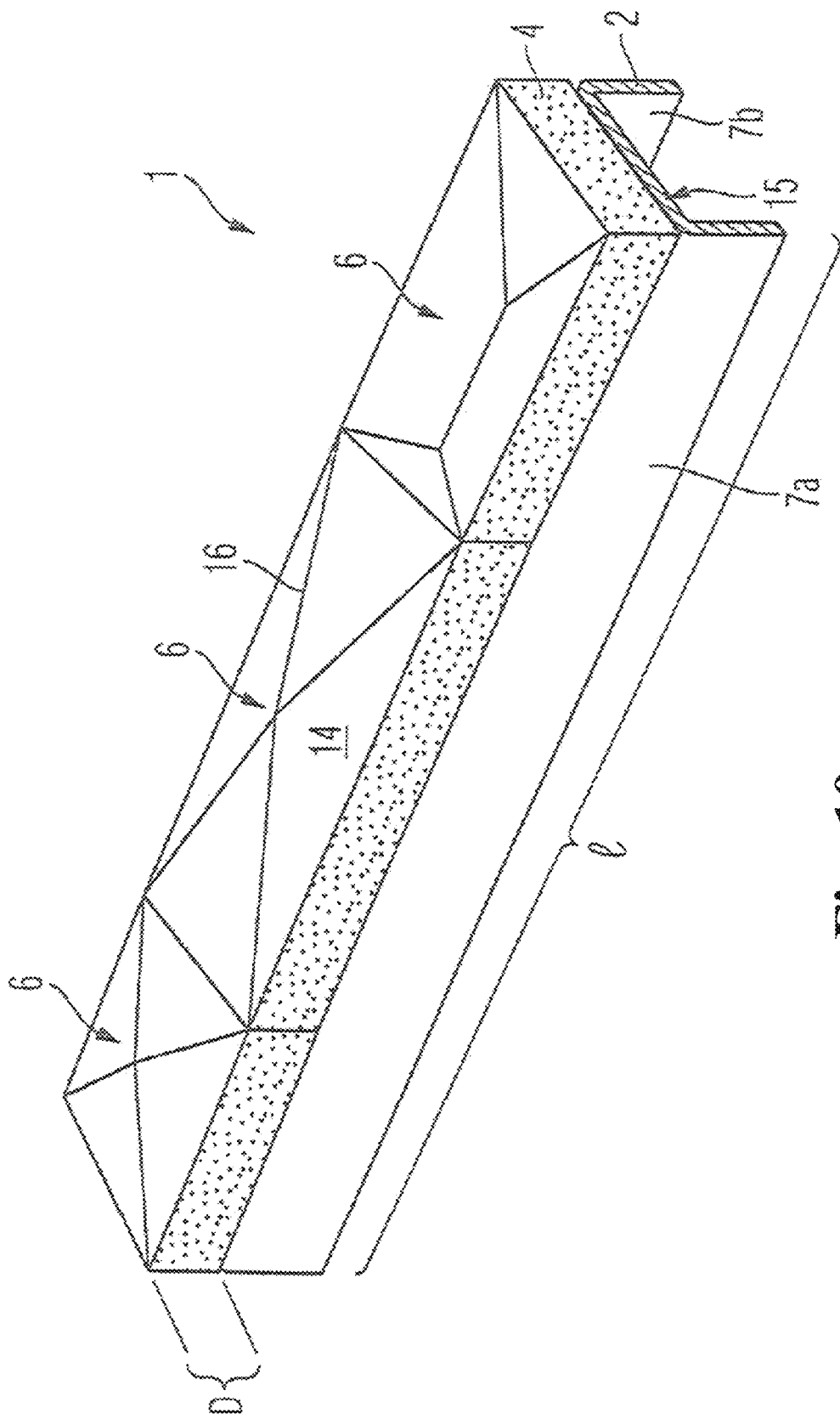
FIGS. 10 to 14 relate to the second aspect of the present invention.

Second Aspect of the Invention According to the FIGS. 10 to 14:

The plastic composite cover 1 of the invention according to FIG. 10 and according to the second aspect is intended for use in a motor vehicle that is not shown, and is disposed, for example, in a dashboard or a center console that is part of the vehicle, and serves for covering a backlighted function display in a visually attractive manner. The plastic composite cover 1 has an elongated configuration; thus, the first plastic film 2 associated with the plastic composite cover 1 has a maximum dimension 1 which exceeds the minimum dimension D of the plastic composite panel 1 several times. The minimum dimension D is defined by the minimum thickness of the plastic composite cover 1 in the stacking direction of the layers or films of the plastic composite cover 1. Its maximum extent, which refers to the plastic film 2, is marked with 1 and is greater than 50 cm, such as 1 m, for example. The minimum thickness D of the plastic composite cover 1 in the stacking direction of its layers and the plastic film 2 is in the range of 1 to 3 cm. The layer structure 2, 4 has a base layer 4 consisting of a transparent thermoplastic material, such as polycarbonate or polymethyl methacrylate which, if installed as intended, defines an outer surface 14 facing towards the vehicle occupant. Seen from the vehicle occupant, the first plastic film 2, which is also formed from a transparent plastic, preferably from a polycarbonate-containing, polymethyl methacrylate-containing and/or polyurethane-containing thermoplastic material, is located underneath the base layer 5 and adjacent thereto. On its side facing away from the vehicle occupant, the first plastic film 2 forms an outer surface 15, here the rear surface of the plastic composite cover 1, facing away from the vehicle occupant. The rear surface may be metallized, and in this case be translucent in some areas; moreover, an opaque printing that depicts a symbol or pictogram may be partially provided in order to realize a function display.

Because of the thermal injection molding during the manufacturing process, the first plastic film 2 and the base layer 4 are connected to each other by substance-to-substance connection. The outer surface 14 of the base layer 4, which faces away from the first plastic film 2 and towards the vehicle occupant, is substantially determined by the molding tool used for the production of the base layer 4 while back-molding the first plastic film 2. In this context, it must be noted that the illustration in the Figures is not to be understood as being to scale. This surface 14 of the base layer 4 is faceted multiple times and thus has pronounced edges 16 that imitate the visual impression of a supposed glass surface. Due to being faceted multiple times, this surface of the base layer 4 has contours 6 that are configured three-dimensionally, particularly due to planar surfaces converging at an angle, and thus form contours 6 that form straight edges 16 at the converging surfaces, and thus imitate the visual impression of a cut crystal because of the possible multiple reflections. At the long lateral flanks of the layer structure 2, 4, the first plastic film 2 protrudes over the base layer 4 to form cranked projections 7a, 7b that are angled away from the vehicle occupant so as to laterally nestle up to another component, such as a lighting means mount that is not shown, and to form therewith a positive and/or non-positive and/or substance-to-substance connection in each case, which serves for fixing the plastic composite cover 1 to the further component and for forming an assembly 10 according to the invention, as it is shown in FIG. 11 in a first embodiment, and in FIG. 12 in a second embodiment.

Figure 11:
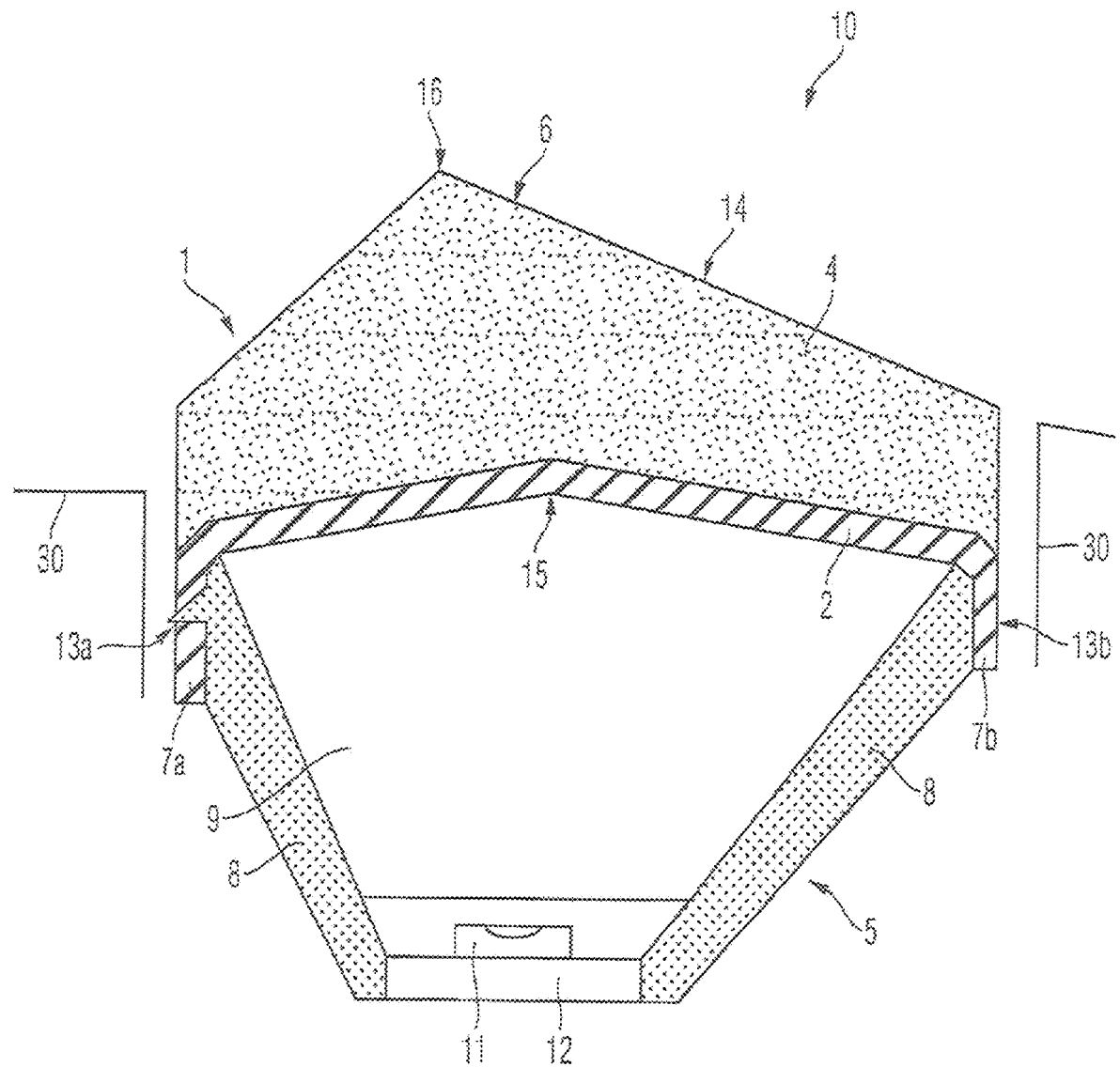

FIG. 11 shows an assembly 10 according to the invention consisting of the plastic composite cover 1 shown in FIG. 10 and a lighting means mount 5 carrying a lighting means 11. The assembly 10 is embedded into a recess of a trim or panel 30 of the motor vehicle. The lighting means 11 is an LED with an SMD design mounted on a circuit board 12 and disposed on the side of the plastic composite cover 1 facing away from the vehicle occupant, in order to backlight the rear surface 15 of the plastic composite cover 1 and to couple light into the base layer 4 and thus into the plastic composite cover 1 via the first plastic film 2, wherein the side of the first plastic film 2 facing away from the vehicle occupant defines the light-entry surface. The light penetrates the plastic composite cover 1 in the stacking direction of the layers or films and thus penetrates the first plastic film 2, which is transparent at least in some areas, and the transparent base layer 4. The first plastic film 2 can be masked by means of an opaque paint or a metallic coating. In order to avoid interface reflections at the interface between the first plastic film 2 and the base layer 4 and thus imitate the optical "depth effect" of a glass material, the transparent base layer 4 and the transparent plastic film 2 have approximately the same refractive index. This is understood to mean that the refractive indices differ by no more than 0.2, preferably 0.1. The light penetrates the plastic composite cover 1, and the outer surface 14 of the plastic composite cover 1 formed by the base layer 4 is backlighted. In order to avoid unwanted scattered light and/or the entry of extraneous light, the lighting means 11 is disposed in a light channel 9 sealed laterally by the walls 8 of the lighting means mount 5. The lighting means mount 5 is fixed to the projections 7a, 7b of the plastic composite cover 1; thus, the projection 13a is fixed to the lighting means mount 5 by means of a latching connection 13a, while the projection 13b is connected in a substance-to-substance connection to the lighting means mount 5 by means of ultrasonic welding.

Figure 12:
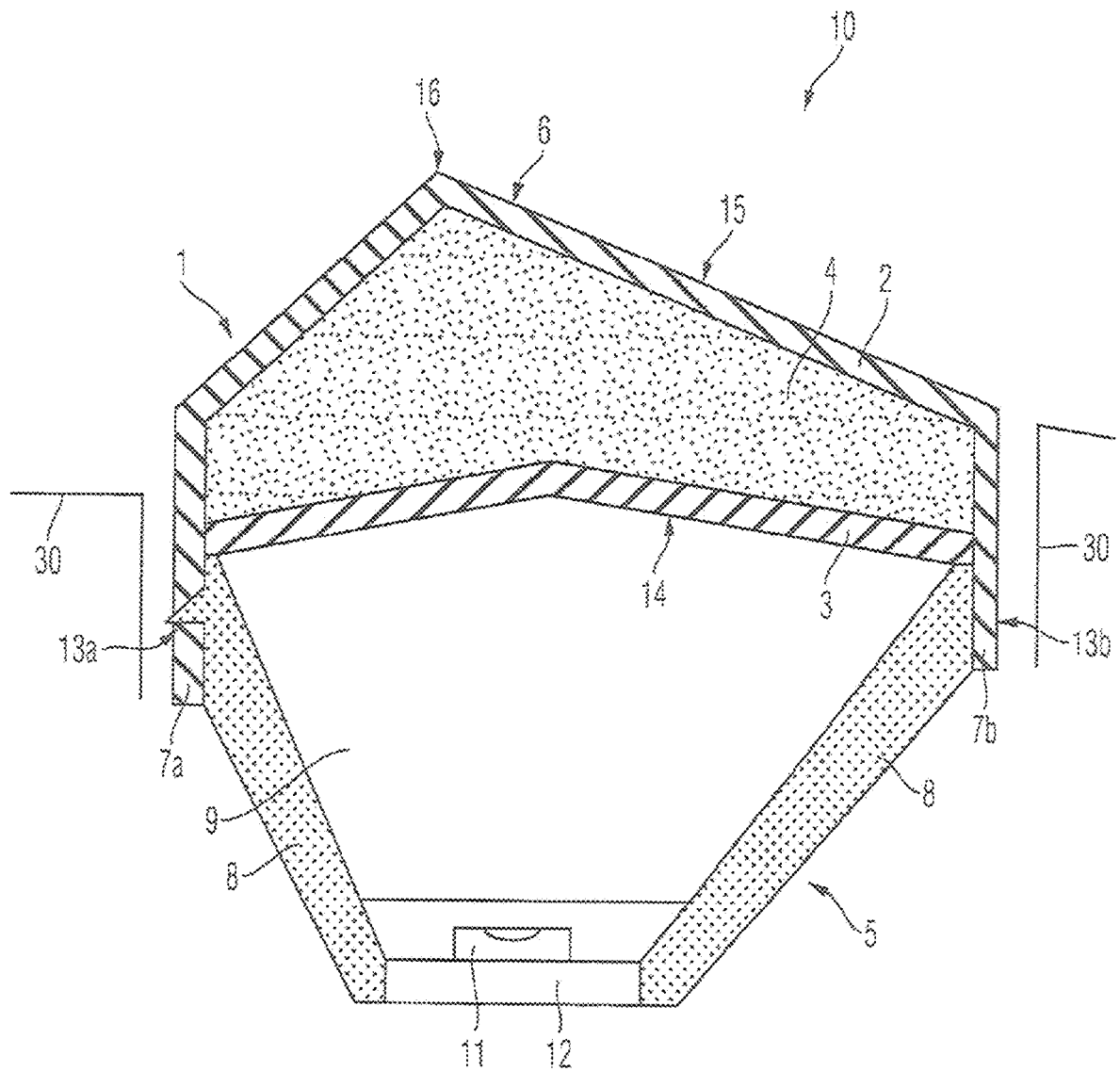

FIG. 12 shows an assembly of the invention of a lighting means mount 5 and an alternatively configured plastic composite cover 1. It differs from the embodiment shown in FIG. 10 in that a second plastic film 3 is provided, which defines the outer surface 14 of the plastic composite cover 1 facing towards the lighting means mount 5, and in that the first plastic film 2 in this case not only defines an outer surface 15 of the plastic composite cover 1, but that this surface 15 is also a surface of the assembly 10 that faces towards the vehicle occupant and away from the lighting means mount 5. The assembly 10 is also embedded into a recess of a trim or panel 30 of the motor vehicle. The lighting means 11 is an LED with an SMD design mounted on a circuit board 12 and disposed on the side of the plastic composite cover 1 facing away from the vehicle occupant, in order to backlight the rear surface 15 of the plastic composite cover 1 and to couple light into the base layer 4 and thus into the plastic composite cover 1 via the second plastic film 3, wherein the side of the second plastic film 3 facing away from the vehicle occupant defines the light-entry surface. The light penetrates the plastic composite cover 1 in the stacking direction of the layers or films and thus penetrates the second plastic film 3, which is transparent at least in some areas, the transparent base layer 4 as well as the first plastic film 2. The second plastic film 3 can be masked by means of an opaque paint or a metallic coating. In order to avoid interface reflections at the interface between the first plastic film 2 and the base layer 4, or at the interface between the second plastic film 3 and the base layer 4, and thus imitate the optical "depth effect" of a glass material, the transparent base layer 4 and the transparent plastic films 2, 3 have approximately the same refractive index. This is understood to mean that the refractive indices differ by no more than 0.2, preferably 0.1. The light penetrates the plastic composite cover 1, and the outer surface 14 of the plastic composite cover 1 formed by the first plastic film 2 is backlighted. In order to avoid unwanted scattered light and/or the entry of extraneous light, the lighting means 11 is disposed in a light channel 9 sealed laterally by the walls 8 of the lighting means mount 5. The lighting means mount 5 is fixed to the projections 7a, 7b of the plastic composite cover 1; thus, the projection 13a is fixed to the lighting means mount 5 by means of a latching connection 13a, while the projection 13b is connected in a substance-to-substance connection to the lighting means mount 5 by means of ultrasonic welding.

Figure 13:
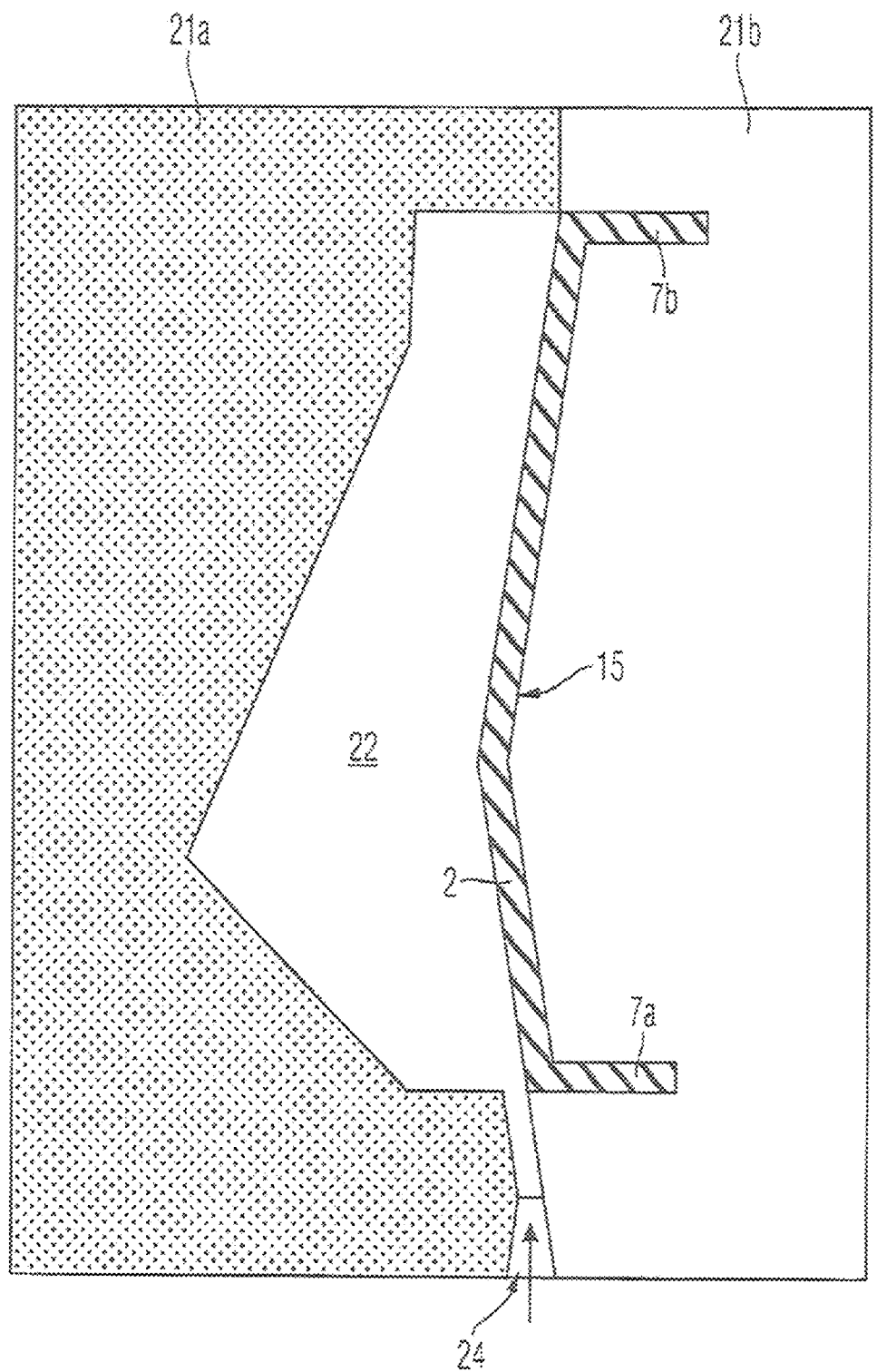

FIG. 13 explains an embodiment of the method of the invention for producing a plastic composite cover 1 with a layer structure 2, 4, in particular for a motor vehicle, as it is shown in FIGS. 10 and 11. FIG. 13 shows a first transparent plastic film 2 being disposed in a part 21b of a molding tool 21a, 21b, with the completion of the molding tool 21, 21b with another part 21b of the molding tool 21a, 21b already being shown here, wherein a cavity 22 is formed only on one side of the first plastic film 2. As already indicated in FIG. 13, the plastic film 2 is subsequently laterally back-molded, via the feed portion 24, in a thermal molding method step while introducing a thermoplastic material into the cavity 22, so that a layer structure 2, 4 is produced as a molded article. The layer structure 2, 4 is formed by the first plastic film 2 and a base layer 4 formed by the thermoplastic material. The first plastic film 2 defines an outer surface 15 of the layer structure 2, 4 produced by back-molding. The base layer 4 produced in this manner adjoins the plastic film 2 on one side, wherein the outer surface of the base layer 4, and thus that of the plastic composite cover, is determined by the molding tool 21a, 21b, here the tool part 21a. In a subsequent step, which is not shown, the layer structure 2, 4 is demolded.

Figure 14:
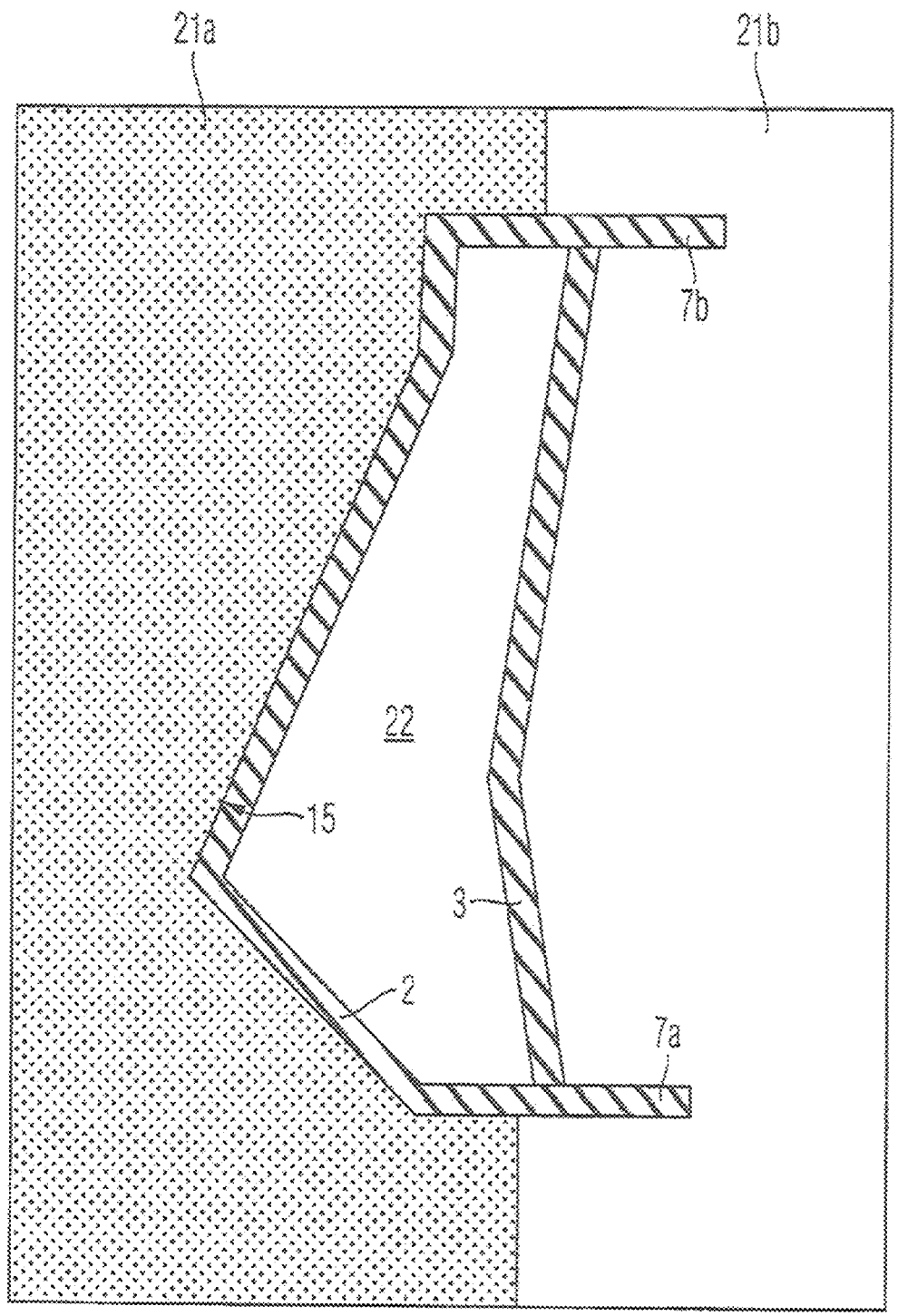

FIG. 14 explains another embodiment of the method of the invention for producing a plastic composite cover 1 with a layer structure 2, 3, 4, in particular for a motor vehicle, as it is a part of the assembly 10 shown in FIG. 12. FIG. 13 shows the disposing of a first transparent plastic film 2 in a first part 21a of a molding tool 21a, 21b, and of a second plastic film 3, which is transparent at least in some areas, in the second part 21b of the molding tool 21a, 21b, with the completion of the molding tool 21, 21b already being shown here. Here, a cavity 22 is formed between the first plastic film 2 and the second plastic film 3. The two plastic films 2, 3 are subsequently laterally back-molded, via a feed portion not shown, in a thermal molding method step while introducing a thermoplastic material into the cavity 22, so that a layer structure 2, 3, 4 is produced as a molded article. The layer structure 2, 3, 4 is formed by the first plastic film 2, a base layer 4 formed by the thermoplastic material, and the second plastic film 3, wherein the first plastic film 2 is connected to the base layer 4 and the latter to the second plastic film 3, by substance-to-substance connection. The first plastic film 2 defines an outer surface 15 of the layer structure 2, 3, 4 produced by back-molding, wherein this surface 15 is, at the same time, also the outer surface, which faces towards the vehicle occupant, of the assembly shown in FIG. 12. The second plastic film 3 defines the outer surface of the layer structure 2, 3, 4 or of the plastic composite cover 1 facing towards the lighting means mount from FIG. 12, and serves as a contact portion for the lighting means mount. In a subsequent step, which is not shown, the layer structure 2, 4 is demolded.

Not only is a durable and load-bearing connection between the plastic composite cover 1 and the component achieved by the first plastic film 2 protruding over the base layer 4 of the layer structure 2, 3, or 2, 3, 4, while forming lateral projections 7a, 7b serving for being fixed to other components, such as the lighting means mount 5, but an arrangement of the attachment means with little visual interference is found by placing the attachment means at the outermost parts of the plastic composite cover 1, particularly in the case of a largely translucent or transparent layer structure 2, 3, or 2, 3, 4. Moreover, the at least one plastic film 2 serves for mechanical stabilization and avoidance of splintering.

Figure 15:
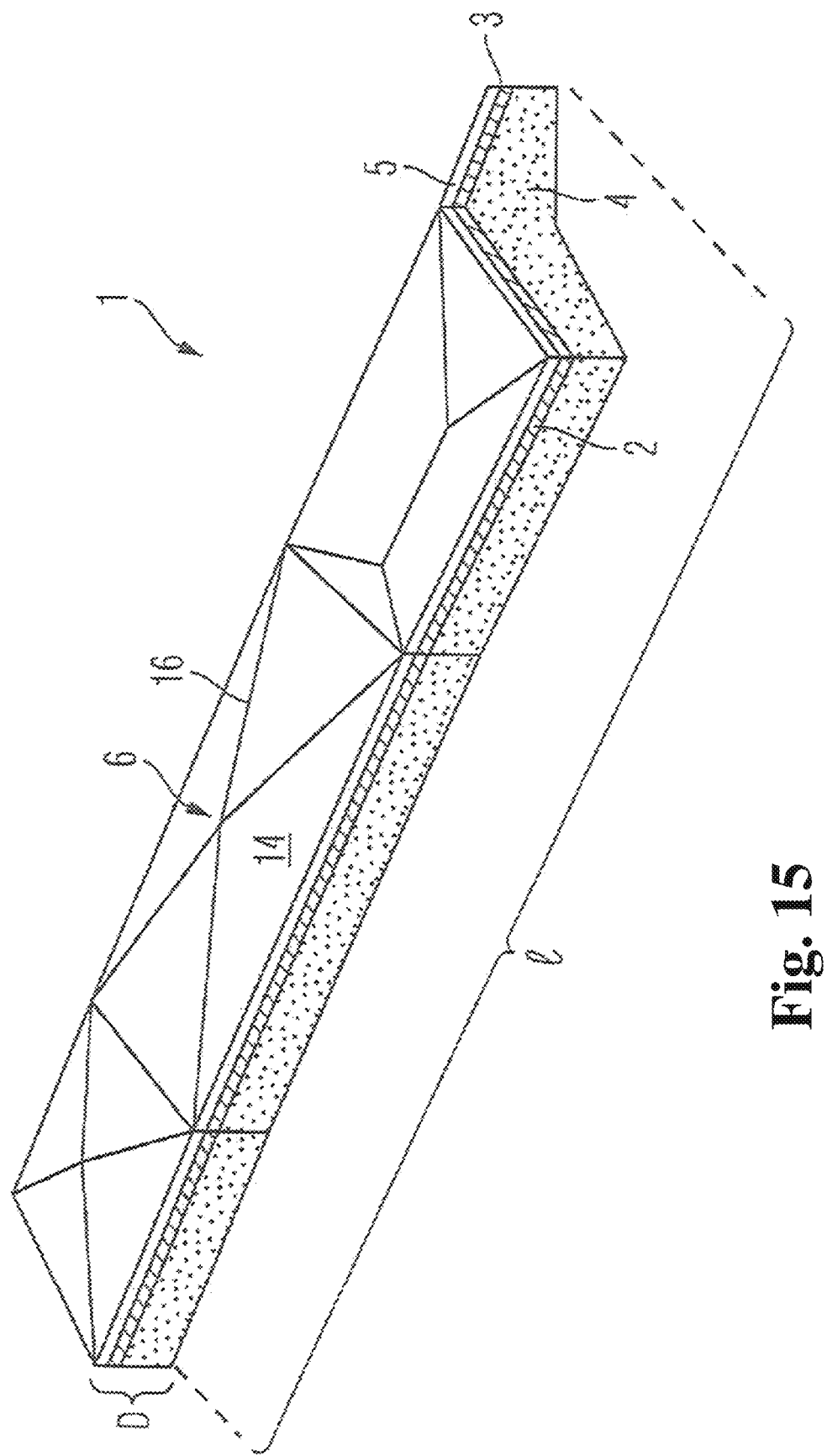

Third Aspect of the Invention According to the FIGS. 15 to 18C:

The plastic composite cover 1 of FIG. 15 according to the invention and according to the third aspect is intended for use in a motor vehicle that is not shown, and is disposed, for example, in a dashboard or a center console that is part of the vehicle, and serves for covering a backlighted function display in a visually attractive manner. The plastic composite cover 1 has an elongated configuration; thus, the plastic film 2 associated with the plastic composite cover 1 has a maximum dimension l which exceeds the minimum dimension D of the plastic composite panel 1 several times. The minimum dimension D is defined by the minimum thickness of the plastic composite cover 1 in the stacking direction of the layers or films of the plastic composite cover 1. Its maximum extent, which refers to the plastic film 2, is marked with l and is greater than 50 cm, such as 1 m, for example. The minimum thickness D of the plastic composite cover 1 in the stacking direction of its layers and the plastic film 2 is in the range of 1 to 3 cm. The layer structure has a casting resin layer 5 which, if installed as intended, defines an outer surface 14 facing towards the vehicle occupant. Seen from the vehicle occupant, the plastic film 2 is located underneath the casting resin layer 5. A base layer 4 consisting of a transparent thermoplastic material is located thereunder, adjacent to the first plastic film 2 and connected thereto by substance-to-substance connection. On its side facing away from the vehicle occupant, the base layer 4 forms an outer surface or rear surface of the plastic composite cover 1 which faces away from the vehicle occupant. The rear surface may be metallized, and in this case be translucent in some areas; moreover, an opaque printing that depicts a symbol or pictogram may be partially provided in order to realize a function display.

A comparatively thin and, in this embodiment, approximately constantly thin casting resin layer 5, whose outer surface 14 facing towards the vehicle occupant is substantially determined by the molding tool used for producing the casting resin layer 5 in the cast molding step, is applied by cast molding to the surface of the plastic film 2 facing away from the base layer 4. In this context, it must be noted that the illustration in the Figures is not to be understood as being to scale. This casting resin layer 5 is faceted multiple times and thus has pronounced edges 16 that imitate the visual impression of a supposed glass surface. Due to being faceted multiple times, this surface of the casting resin layer 5, but also the plastic film 2, have contours 6 that are configured three-dimensionally, particularly due to planar surfaces converging at an angle, and thus form contours 6 that form straight edges 16 at the converging surfaces, and thus imitate the visual impression of a cut crystal because of the possible multiple reflections.

Because of the thermal injection molding during the manufacturing process, the plastic film 2 is connected to the base layer 4 by substance-to-substance connection. A adhesion promoter layer 3 is applied to the surface of the plastic film 2 facing away from the base layer 4; adjacent to this adhesion promoter layer 3, a comparatively thin casting resin layer 5 is applied, whose outer surface 14 facing towards the vehicle occupant is substantially predefined by the molding tool used for producing the casting resin layer 5 in the cast molding step. The surface 14 is not shown to scale in the Figures. It is faceted multiple times and thus has pronounced edges 16 that imitate the visual impression of a supposed glass surface. Due to being faceted multiple times, this surface 14 of the casting resin layer 5, but also the plastic film 2, have contours 6 that are configured three-dimensionally, due to planar surfaces converging at an angle. Thus, contours 6 are provided that form straight edges 16 at the converging surfaces, and thus imitate the visual impression of a cut crystal because of the multiple reflections. While the plastic film 2 substantially serves for mechanical stabilization and avoidance of splintering, the adjacently disposed layers on the opposite sides of the plastic film 2, such as the casting resin layer 5 produced by cast molding and the base layer 4 formed by means of a thermoplastic material in a thermal molding process, stabilize the plastic film 2. Both minimize the tensions in the plastic composite cover 2, which were introduced into the plastic composite cover 1 during use, for example by the impact of sunlight, but in particular during the production, e.g. by the thermoforming production process of the base layer 4. Thus, the casting resin layer 5 has a restoring effect on the deformation of the plastic film 2 caused by the shrinkage of the base layer 4 during thermoforming and the subsequent cooling-off process. Thus, the deformations of the plastic film 2 caused by the casting resin layer 5 and the base layer 4 compensate each other. Shrinkages of the casting resin layer 5, which may amount to 0.2% to 2%, for example, thus have a positive mechanical effect on the molded article consisting of the plastic film 2 and the base layer 4, so that the initial stress and the deformation of the plastic film 2 caused by the thermoforming back-molding process recede.

Figure 16:
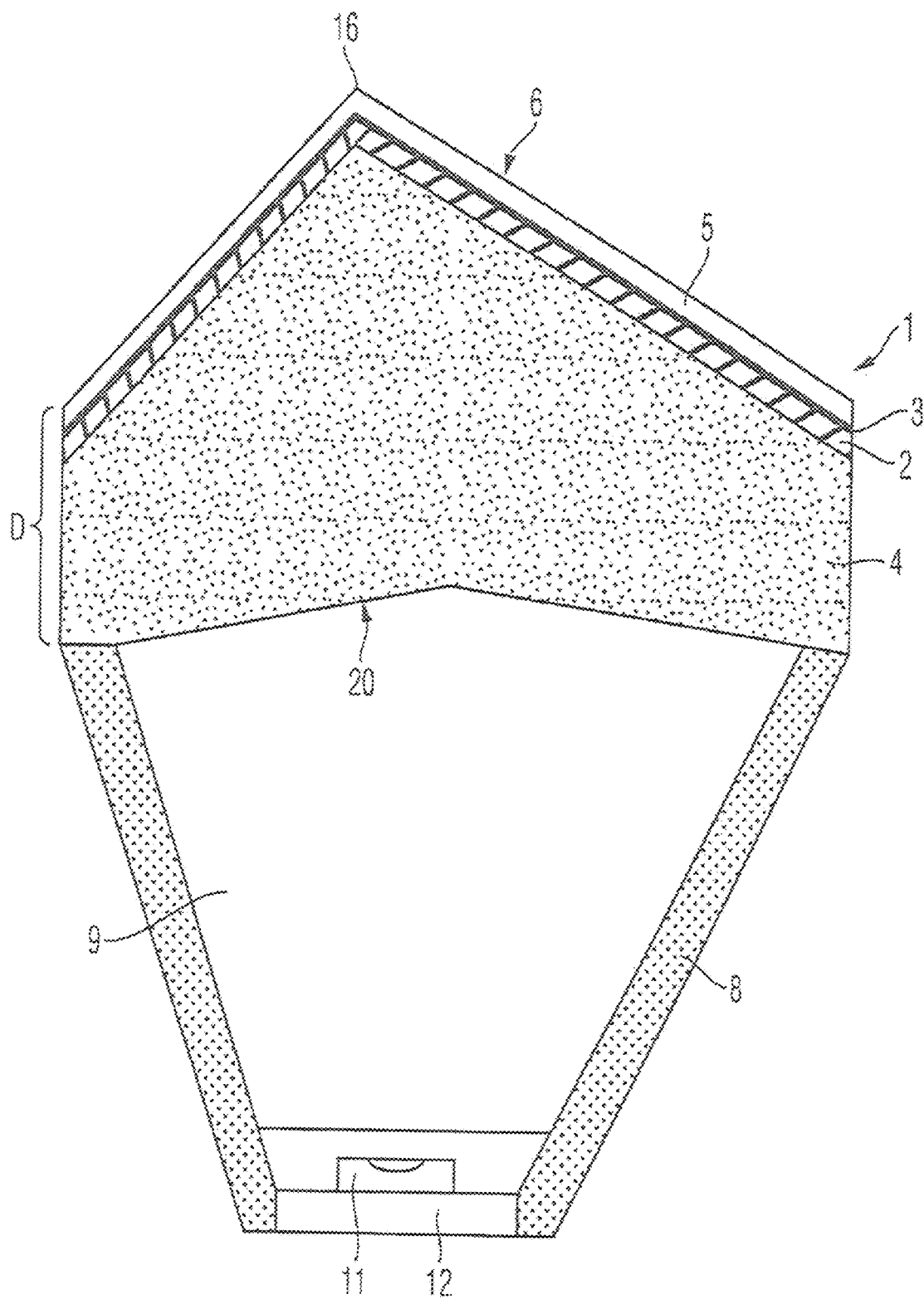

FIG. 16 shows an assembly 10 according to the invention consisting of the plastic composite cover 1 shown in FIG. 15 and a lighting means 11. The lighting means 11 is an LED with an SMD design mounted on a circuit board 12 and disposed on the side of the plastic composite cover 1 facing away from the vehicle occupant, in order to backlight the rear surface 20 of the plastic composite cover 1 and to couple light into the base layer 4 and thus into the plastic composite cover 1, wherein the side of the base layer 4 facing away from the vehicle occupant defines the light-entry surface. The light penetrates the plastic composite cover 1 in the stacking direction of the layers or films and thus penetrates the transparent base layer 4, the transparent plastic film 2, the transparent adhesion promoter layer 3 and the casting resin layer 5, which is transparent at least in the cured state. In order to avoid interface reflections and thus imitate the optical effect of a glass material, the transparent base layer 4, the transparent plastic film 2, the transparent adhesion promoter layer 3 and the casting resin layer 5, which is transparent at least in the cured state, each have approximately the same refractive index. This is understood to mean that the refractive indices differ by no more than 0.2, preferably 0.1. The light penetrates the plastic composite cover 1, and the outer surface 14 of the plastic composite cover 1 formed by the plastic composite cover is backlighted. In order to avoid unwanted scattered light and/or the entry of extraneous light, the lighting means 11 is disposed in a light channel 9 sealed laterally by the walls 8.

Figure 17A:
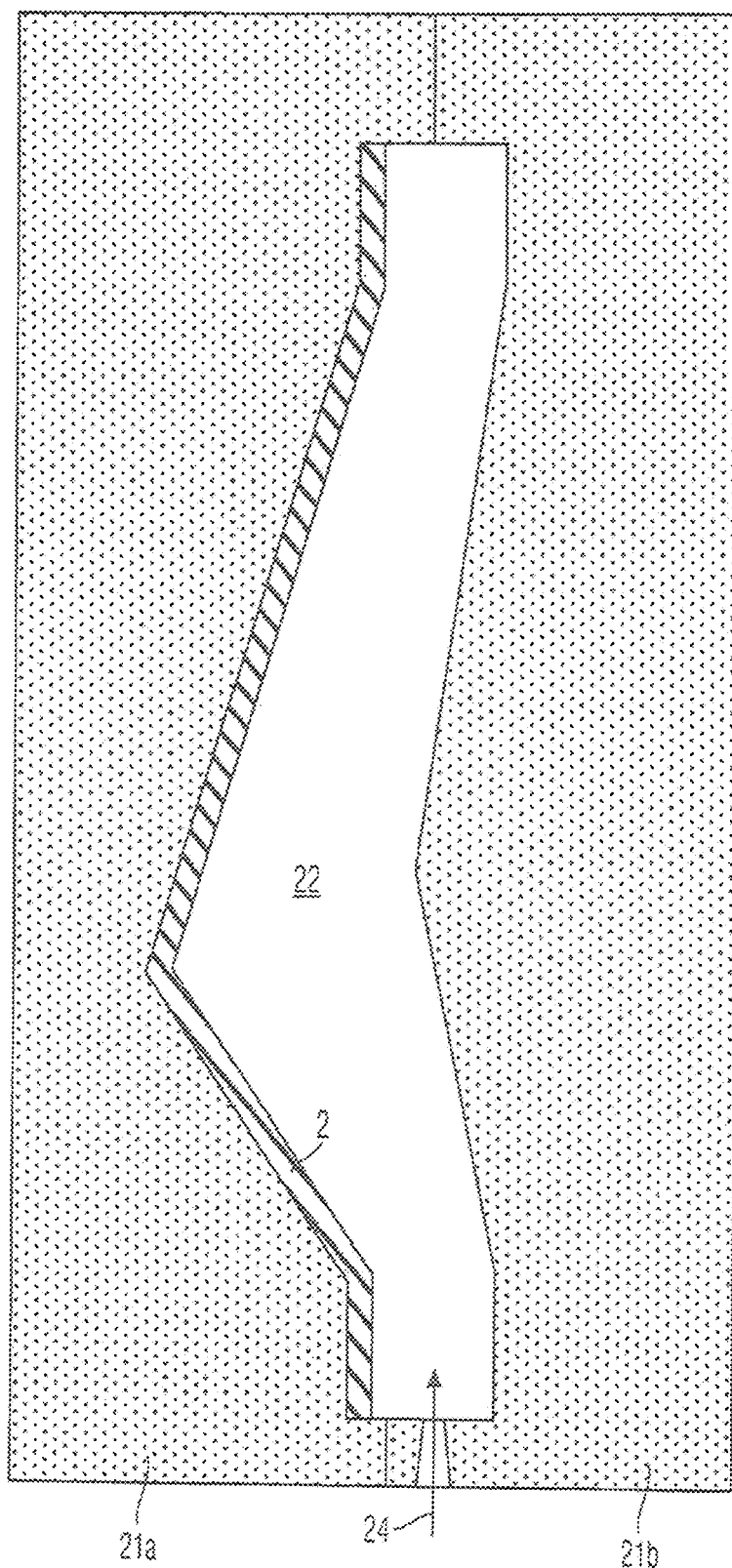
FIGS. 17a-c show the initial, final and intermediate states, respectively, of the method of the present invention for producing the plastic composite cover from FIG. 15.
Figure 17B:
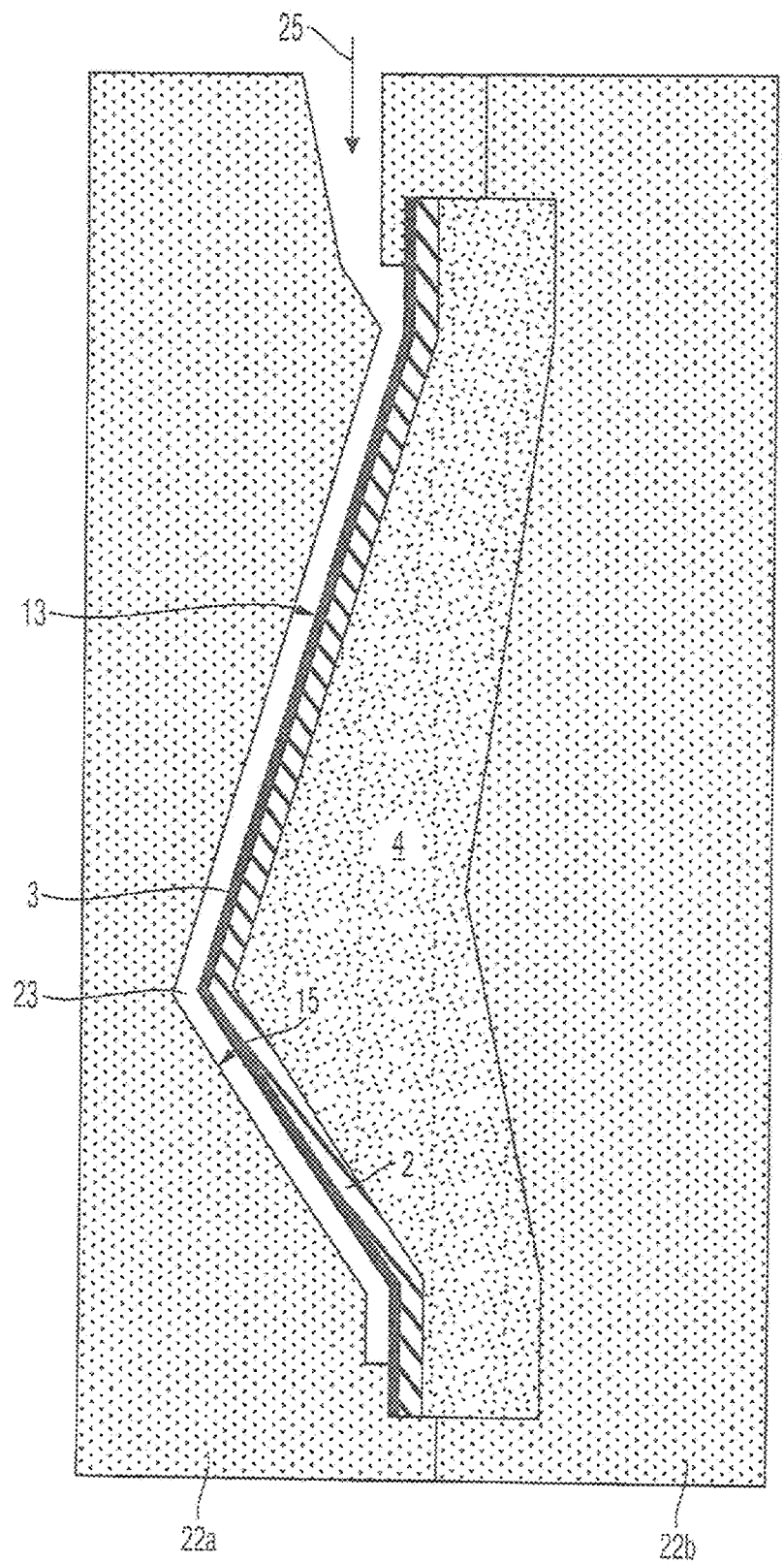
Figure 17C:
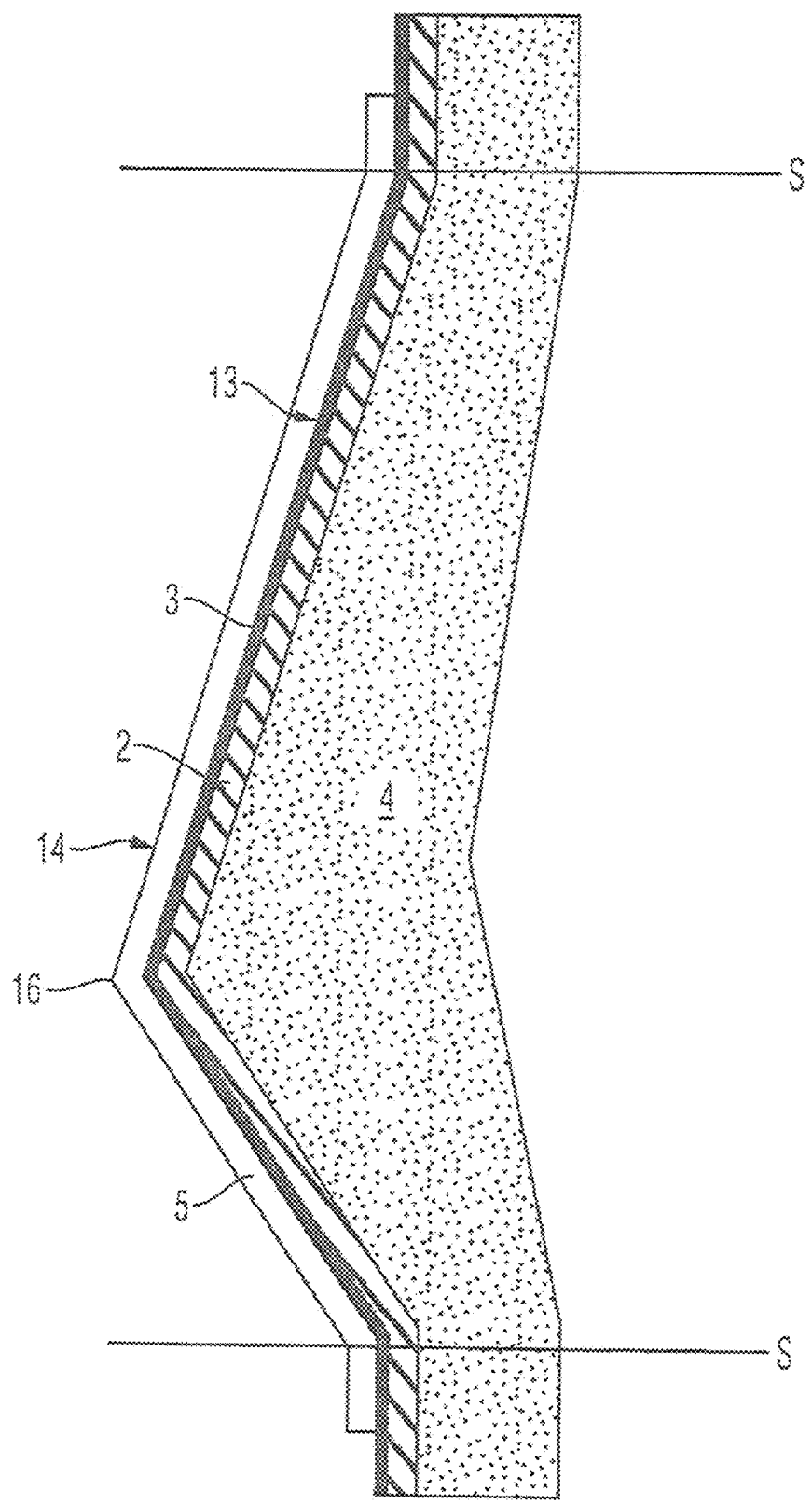

FIGS. 17a to 17c explain an embodiment of the method of the invention for producing a plastic composite cover 1 with a layer structure, in particular for a motor vehicle. FIG. 17a shows a transparent plastic film 2 being disposed in a part 21a of a first molding tool 21a, 21b. FIG. 17a shows the completion of the first molding tool 21, 21b with another part 21b of the first molding tool 21a. 21b, in such a way that a first cavity 22 is formed only on one side of the first plastic film 2. As already indicated in FIG. 17a, the plastic film 2 is subsequently laterally back-molded, via the feed portion 24, in a thermal molding method step while introducing a thermoplastic material into the first cavity 22, so that a partial layer structure 2, 4 is produced as a molded article. The partial layer structure 2, 4 is formed by the plastic film 2 and a base layer 4 formed by the thermoplastic material, wherein the latter adjoins the plastic film 2 only on one side.

In a demolding step, the partial layer structure 2,4 is at least partially demolded. Due to the shrinkage of the base layer 4 during solidification and the tensile strain acting on the plastic film 2, a deformation of the plastic film 2 in the direction of the base layer 4 occurs. Which means the deformation of the plastic film 2 with respect to its original orientation in the first molding tool 21a, 21b prior to the introduction of the thermoplastic material of the base layer 4. This deformation is pronounced particularly at the outer ends of the plastic film 2.

A adhesion promoter layer 3 is applied to the plastic film 2 in a subsequent step, which is not shown. In a subsequent step shown in FIG. 17b, the coated partial layer structure 2, 3, 4 is subsequently disposed in a second molding tool 22a, 22b while forming a second cavity 23 formed between the second tool and the plastic film 2. Specifically, the cavity is formed between the surface 13 of the adhesion promoter layer 3 applied to the plastic film 2 and the second tool 22a, 22b, in this case the part 22a. In order to obtain an improved seal of the second cavity 23, e.g. in the region between the second molding tool 22a, 22b and the partial layer structure 2, 3, 4, the second molding tool 22a, 22b is disposed adjacent to the plastic film 2 or the adhesion promoter layer 3 in such a manner that the plastic film 2 and the adhesion promoter layer 3 will laterally protrude over the casting resin layer produced later on.

Then, the second cavity 23 is flooded with a casting resin via the feed 25. The feed direction is substantially parallel to the plastic film 2 also in this case. In a subsequent step, the plastic composite cover 1 is demolded. In a subsequent step, the casting resin is cured, also referred to as cross-linked, in order to form a casting resin layer 5 adjacent to the outer surface 13 of the adhesion promoter layer 3 and obtain the plastic composite cover 1 from FIG. 15. In the process, the outer surface 14 of the plastic composite cover 1 formed by the casting resin layer 5 is defined by the surface 15 of the second molding tool 22a, 22b delimiting the second cavity 23. Thus, the second cavity 23 determines the shape of the outer surface 14 of the casting resin layer 5 facing away from the plastic film 2. In a subsequent step, the plastic composite cover 1 produced in this way is demolded from the second molding tool 22a, 22b, as FIG. 17c shows. It may then be provided that the plastic composite cover 1 is cut or milled to size, as is indicated by the cut lines S, for example. Because the casting resin layer 5 is produced by cast molding, its outer surface 14 is determined by the shape of the second tool, and thus, any contours can be introduced into the surface, which are visually attractive, for example, in that comparatively sharp-edged transitions, i.e. edges 16, are produced. For example, they have an edge radius of maximally 0.6 mm. For example, the mean thickness of the casting resin layer 5 is 0.2 to 3 mm.

While the plastic film 2 substantially serves for mechanical stabilization and avoidance of splintering, the casting resin layer 5 produced by cast molding counteracts the tension introduced into the plastic composite cover 1 by the thermoforming production process of the base layer 4 and has a restoring effect on the deformation of the plastic film 2 caused by the shrinkage of the base layer 4.

Thus, the tensile stress exerted by the casting resin layer 5 on the plastic film 2, which is caused by the shrinkage during curing, compensates that exerted by the base layer 4 on the plastic film 2, so that the deformation caused by the base layer 4 can be reduced or even compensated. Shrinkages of the casting resin layer 5, which may amount to 0.2% to 2%, for example, thus have a positive mechanical effect on the molded article consisting of the plastic film 2 and the base layer 4, so that the initial stress and the deformation of the plastic film 2 caused by the thermoforming back-molding process recede.

Figure 18A:
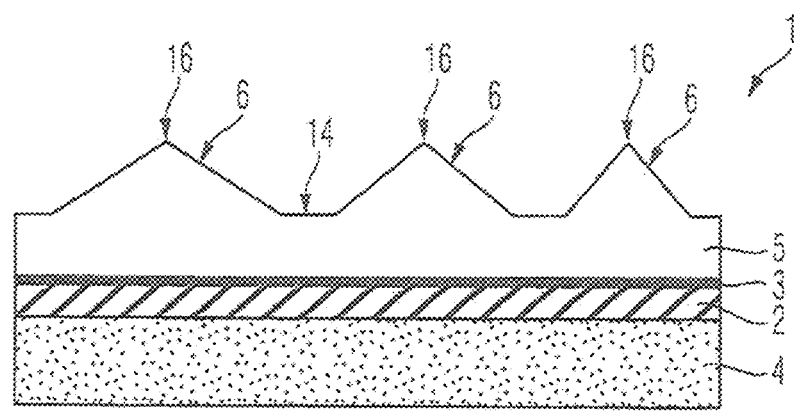
Figure 18B:
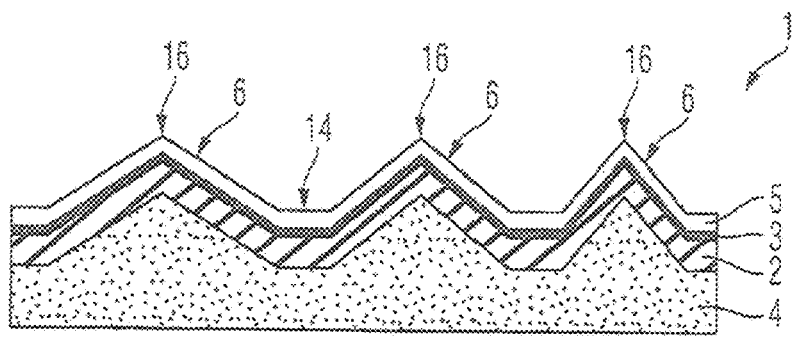
Figure 18C:
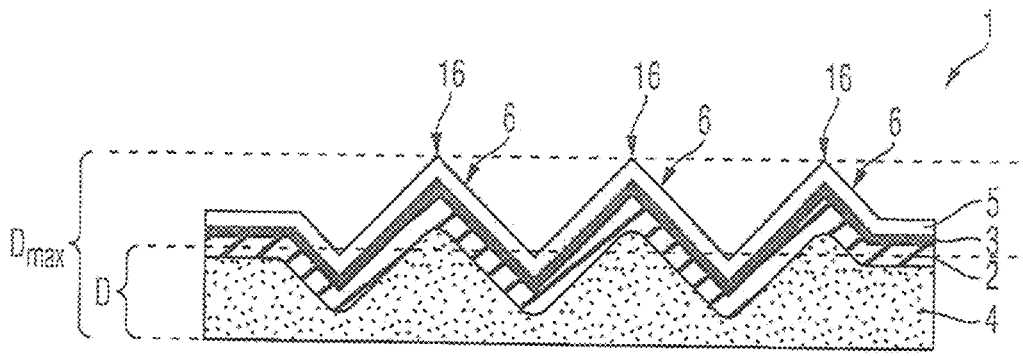

FIGS. 18a to 18c show different embodiments of plastic composite covers 1 according to the invention. The embodiment of FIG. 18a is characterized in that only the outer surface of the casting resin layer 5 has three-dimensional contours 6 that are each formed from planar surfaces and converge in straight edges 16. In contrast, the plastic film 2, and thus the adhesion promoter layer 3, define planar interfaces. Thus, the thickness of the casting resin layer 5 varies to a greater extent than in the embodiment shown in FIGS. 15 and 16. The embodiment shown in FIG. 18b is similar to that from FIG. 15 or 16. Here, the plastic film 2 and the outer surface 14 of the casting resin layer 5, as well as the adhesion promoter layer 3, have several three-dimensional contours 6, which are formed from adjacent surfaces and which form straight edges 16. In this case, the contours of the plastic film 2 follow those of the outer surface 14 of the plastic composite cover 1 formed by the casting resin layer 5. FIG. 18c shows another embodiment which is characterized in that the contours 6 are particularly pronounced and the minimum thickness D determined by the contours 6 is less than half the maximum thickness Dmax of the plastic composite cover 1.

Figure 19:
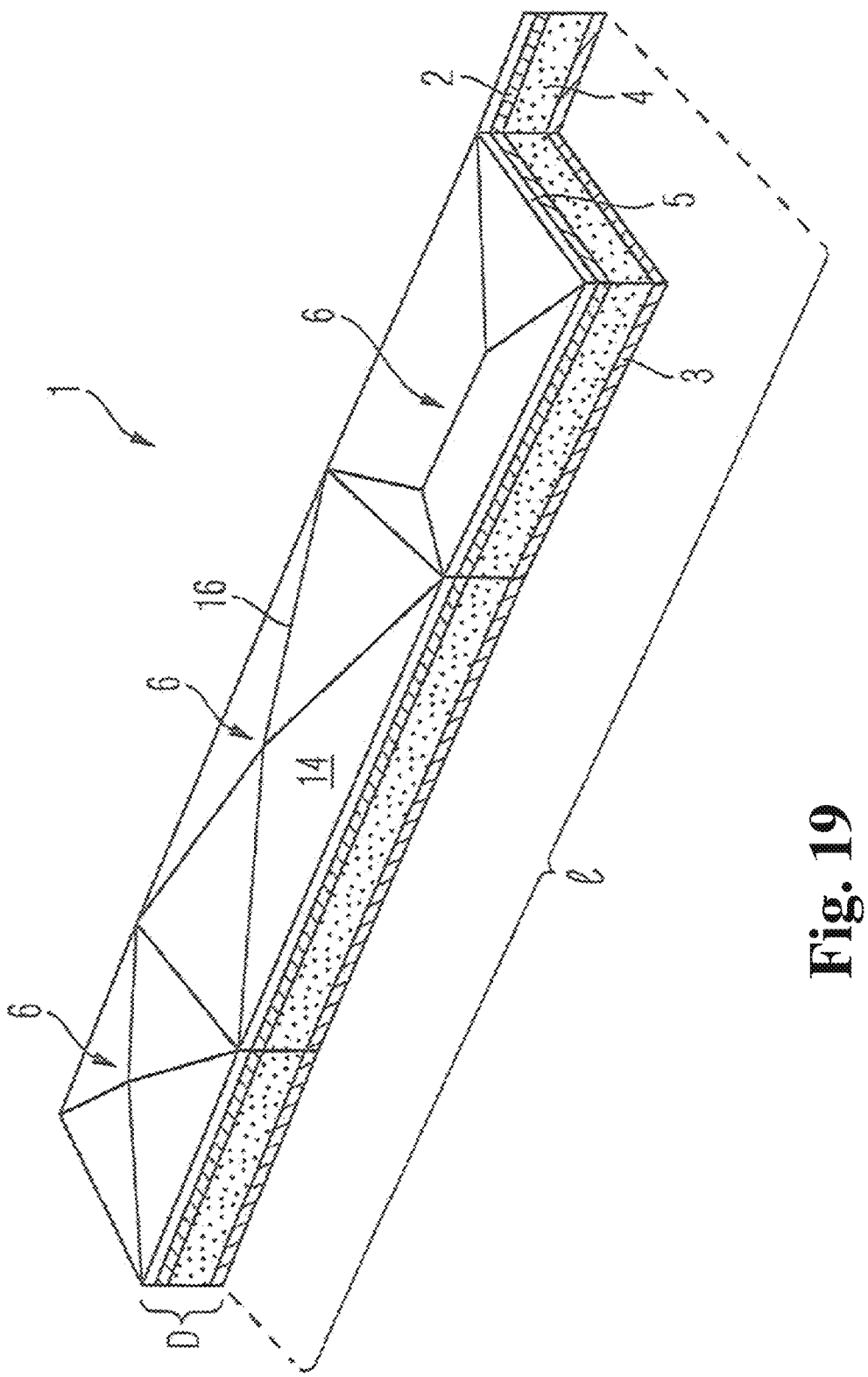

Fourth Aspect of the Invention According to the FIGS. 19 to 21C:

The plastic composite cover 1 according to the fourth aspect, and as shown in FIG. 19, is intended for use in a motor vehicle that is not shown, and is disposed, for example, in a dashboard or a center console that is part of the vehicle, and serves for covering a backlighted function display in a visually attractive manner. The plastic composite cover 1 has an elongated configuration; thus, the first plastic film 2 associated with the plastic composite cover 1 has a maximum dimension l which exceeds the minimum dimension D of the plastic composite panel 1 several times. The minimum dimension D is defined by the minimum thickness of the plastic composite cover 1 in the stacking direction of the layers or films of the plastic composite cover 1. Its maximum extent, which refers to the first plastic film 2, is marked with l and is greater than 50 cm, such as 1 m, for example. The minimum thickness D of the plastic composite cover 1 in the stacking direction of its layers and films, such as the first plastic film 2 and the second plastic film 3, is in the range of 1 to 3 cm. The layer structure has a casting resin layer 5 which, if installed as intended, defines an outer surface 14 facing towards the vehicle occupant. Seen from the vehicle occupant, the first plastic film 2 is located underneath the casting resin layer 5. A first layer 4 consisting of a first transparent thermoplastic material is located thereunder, adjacent to the first plastic film 2 and connected thereto by substance-to-substance connection. On its side facing away from the vehicle occupant, the first layer 4 is adjacent to the second plastic film 3 located at the rear as seen from the vehicle occupant, and is connected thereto by substance-to-substance connection. The second plastic film 3 is metallized in order to be translucent in some areas, while an opaque printing that depicts a symbol or pictogram is also partially provided in order to realize a function display.

Because of the thermal injection molding during the manufacturing process, the first plastic film 2 is connected to the first layer 4, and the latter to the second plastic film 3, by substance-to-substance connection. A comparatively thin casting resin layer 5, whose outer surface 14 facing towards the vehicle occupant is substantially determined by the molding tool used for producing the casting resin layer 5 in the cast molding step, is applied by cast molding to the surface of the first plastic film 2 facing away from the first layer 4. In this context, it must be noted that the illustration in the Figures is not to be understood as being to scale. This casting resin layer 5 is faceted multiple times and thus has pronounced edges 16 that imitate the visual impression of a supposed glass surface. Due to being faceted multiple times, this surface of the casting resin layer 5, but also the first plastic film 2, and to some extent also the second plastic film 3, have contours 6 that are configured three-dimensionally, particularly due to planar surfaces converging at an angle, and thus form contours 6 that form straight edges 16 at the converging surfaces, and thus imitate the visual impression of a cut crystal because of the possible multiple reflections.

Figure 20:
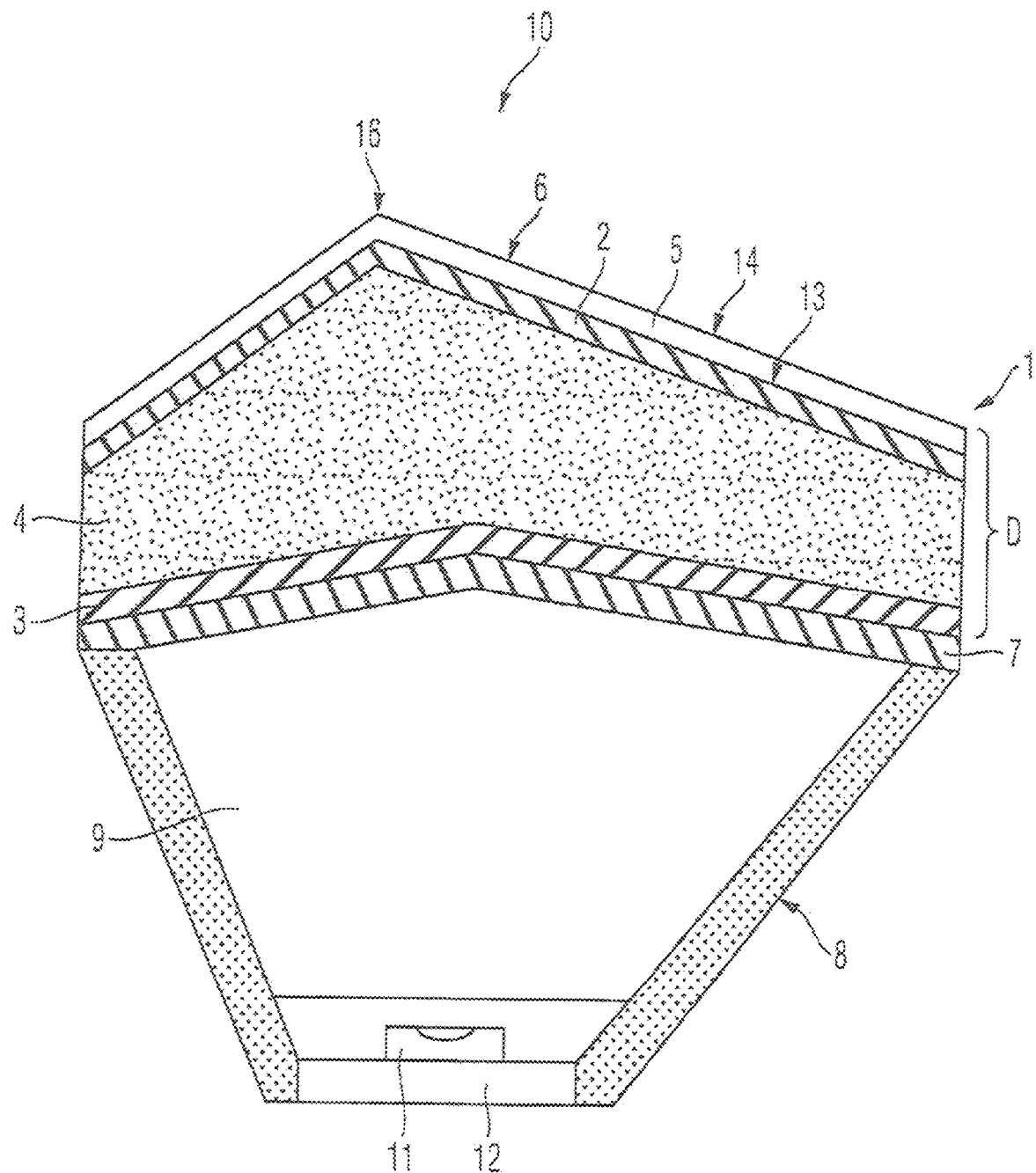

FIG. 20 shows an assembly 10 according to the invention consisting of the plastic composite cover 1 shown in FIG. 19 and a lighting means 11. The lighting means 11 is an LED with an SMD design mounted on a circuit board 12 and disposed on the side of the plastic composite cover 1 facing away from the vehicle occupant, in order to couple light into the plastic composite cover 1 via a diffuser layer 7 and the second plastic film 3, wherein the side of the second plastic film 2 facing away from the vehicle occupant defines the light-entry surface. The light penetrates the plastic composite cover 1 in the stacking direction of the layers or films and thus penetrates the transparent second plastic film 3, the transparent first layer 4, the transparent first plastic film 2 and the casting resin layer 5, which is transparent at least in the cured state. In order to avoid interface reflections and thus imitate the optical effect of a glass material, the transparent second plastic film 3, the transparent first layer 4, the transparent first plastic film 2 and the casting resin layer 5, which is transparent at least in the cured state, each have approximately the same refractive index. This is understood to mean that the refractive indices differ by no more than 0.2, preferably 0.1. In order to avoid unwanted scattered light and/or the entry of extraneous light, the lighting means 11 is disposed in a light channel 9 sealed laterally by the walls 8.

Figure 21A:
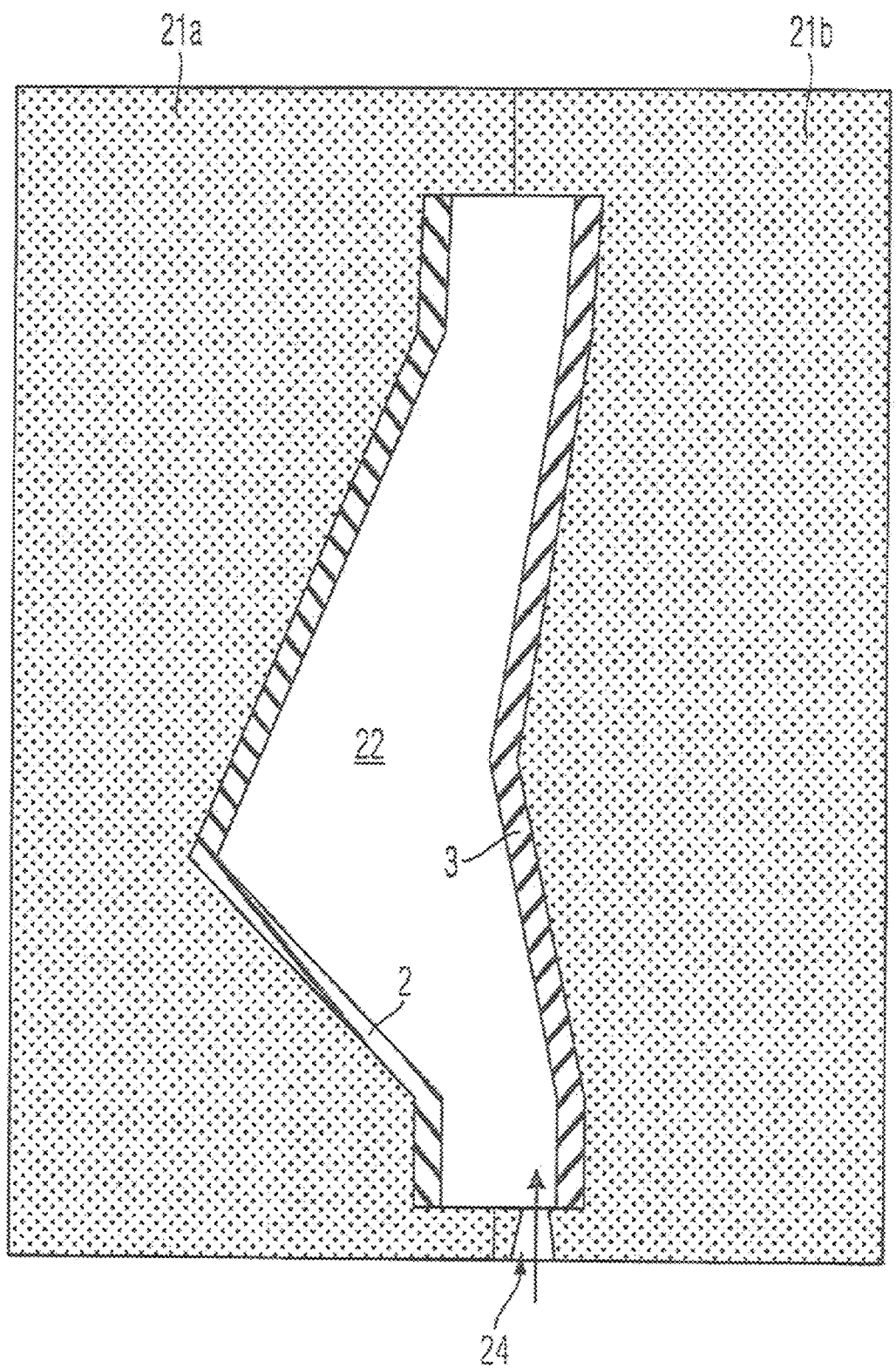
Figure 21B:
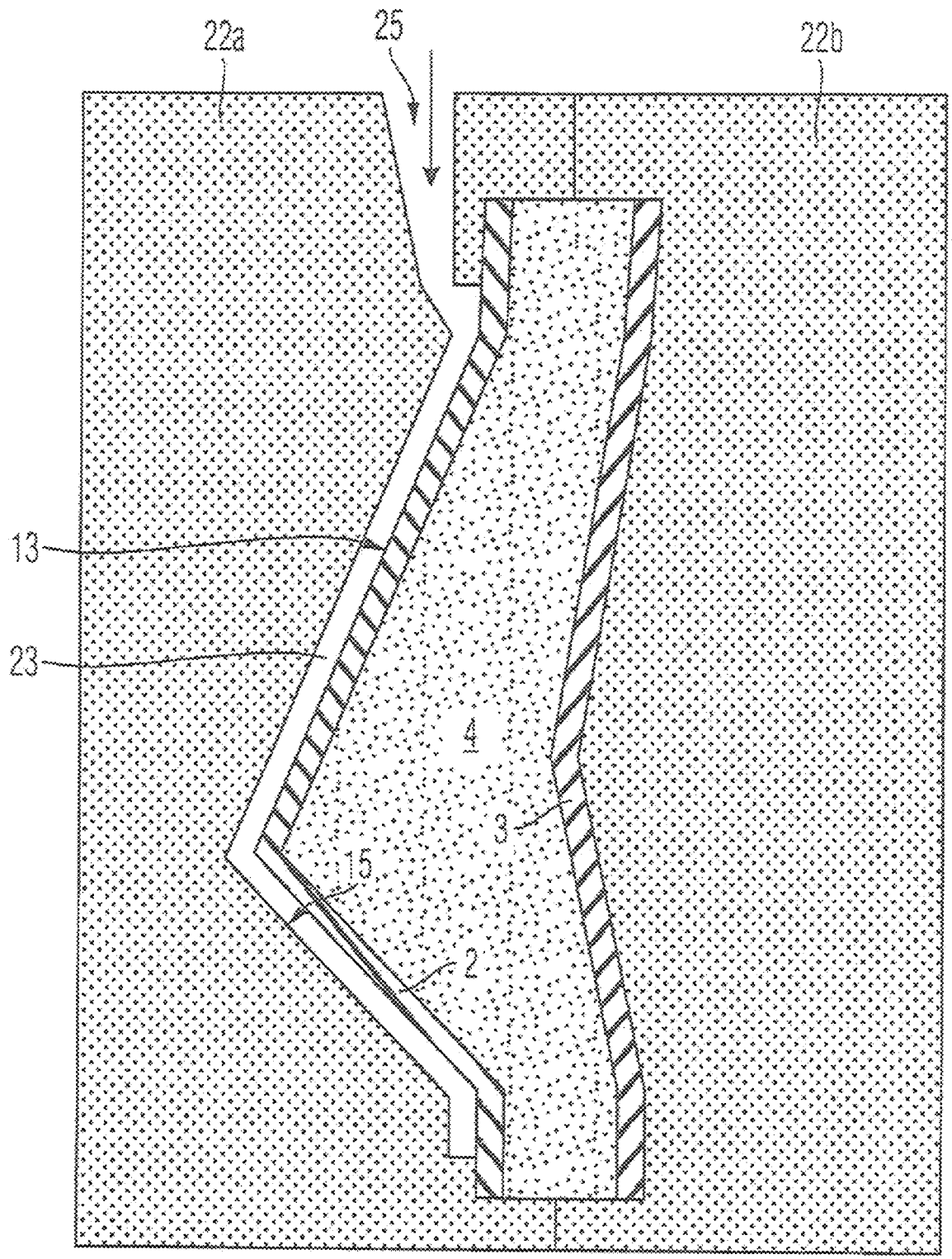
Figure 21C:
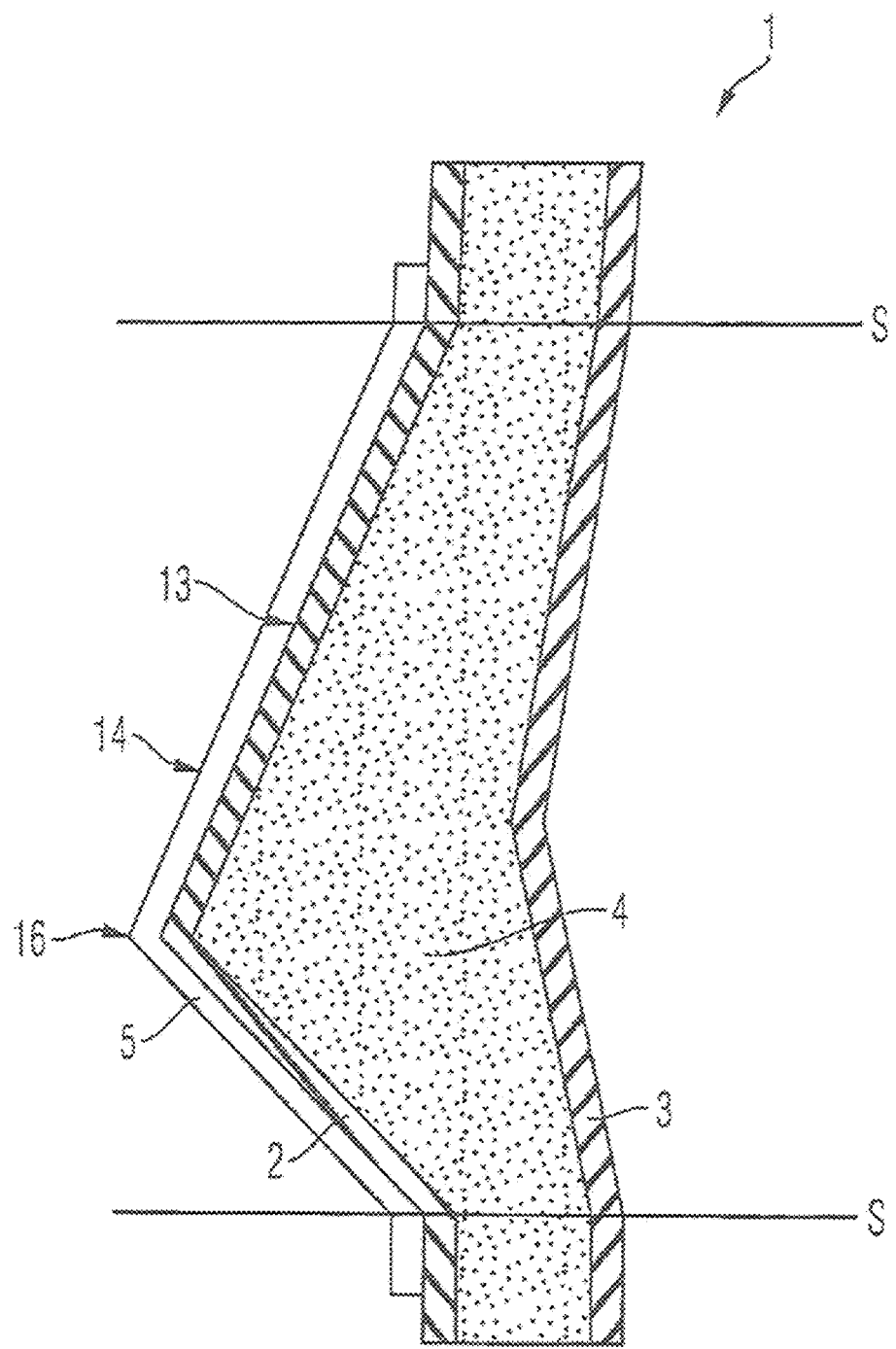

FIGS. 21*a* to 21*c* explain an embodiment of the method of the invention for producing a plastic composite cover 1 with a layer structure 2, 3, 4, in particular for a motor vehicle. FIG. 21*a* shows a first transparent plastic film 2 being disposed in a part 21*a* of a first molding tool 21*a*. 21*b* and a second transparent plastic film 3 being disposed in another part 21*b* of the first molding tool 21*a*, 21*b*, with the completion of the first molding tool 21*a*, 21*b* being shown in FIG. 21*a*, so that a first cavity 22 is formed between the first plastic film 2 and the second plastic film 3, which is disposed so as to be spaced apart from the first plastic film 2. As already indicated in FIG. 21*a*, the first plastic film 2 is subsequently laterally back-molded, via the feed portion 24, in a first thermal molding method step while introducing a first thermoplastic material into the first cavity 22, so that a partial layer structure 2, 3, 4 is produced as a molded article. The partial layer structure 2, 3, 4 is formed by the first plastic film 2 and a first layer 4 formed by the first thermoplastic material, and the second plastic film 3.

In a subsequent step, the partial layer structure 2, 3, 4 is at least partially demolded by the part 21*a* being removed. In a subsequent step shown in FIG. 21*b*, the partial layer structure 2, 3, 4 is subsequently disposed in a second molding tool 22*a*, 22*b* while forming a second cavity 23 formed between the second tool and the first plastic film 2. Specifically, the cavity is formed between the surface 13 of the first plastic film 2 and the second tool, in this case the part 22*a*. In order to obtain an improved seal of the second cavity 23, e.g. in the region between the second molding tool 22*a*, 22*b* and the partial layer structure 2, 3, 4, the second molding tool 22*a*, 22*b* is disposed adjacent to the first plastic film 2 in such a manner that the first plastic film 2 will laterally protrude over the casting resin layer produced later on.

Then, the second cavity 23 is flooded with a casting resin via the feed 25. The feed direction is substantially parallel to the first plastic film 2 also in this case. In a subsequent step, the plastic composite cover 1 is demolded. In a subsequent step, the casting resin is cured, also referred to as cross-linked, in order to form a casting resin layer 5 adjacent to the outer surface 13 of the first plastic film 2 and obtain the plastic composite cover 1 from FIG. 19. In the process, the outer surface 14 of the plastic composite cover 1 formed by the casting resin layer 5 is determined by the surface 15 of the second molding tool 22*a*, 22*b* delimiting the second cavity 23. Thus, the second cavity 23 determines the shape of the outer surface 14 of the casting resin layer 5 facing away from the first plastic film 2.

In a subsequent step, the plastic composite cover 1 produced in this way is demolded from the second molding tool 22*a*. 22*b*, as FIG. 21*c* shows. It may then be provided that the plastic composite cover 1 is cut or milled to size, as is indicated by the cut lines S, for example.

Because the casting resin layer 5 is produced by cast molding, its outer surface 14 is determined by the shape of the second tool, and thus, any contours can be introduced into the surface, which are visually attractive, for example, in that comparatively sharp-edged transitions, i.e. edges 16, are produced. For example, they have an edge radius of maximally 0.6 mm. For example, the mean thickness of the casting resin layer 5 is 0.2 to 3 mm.

Figure 22:
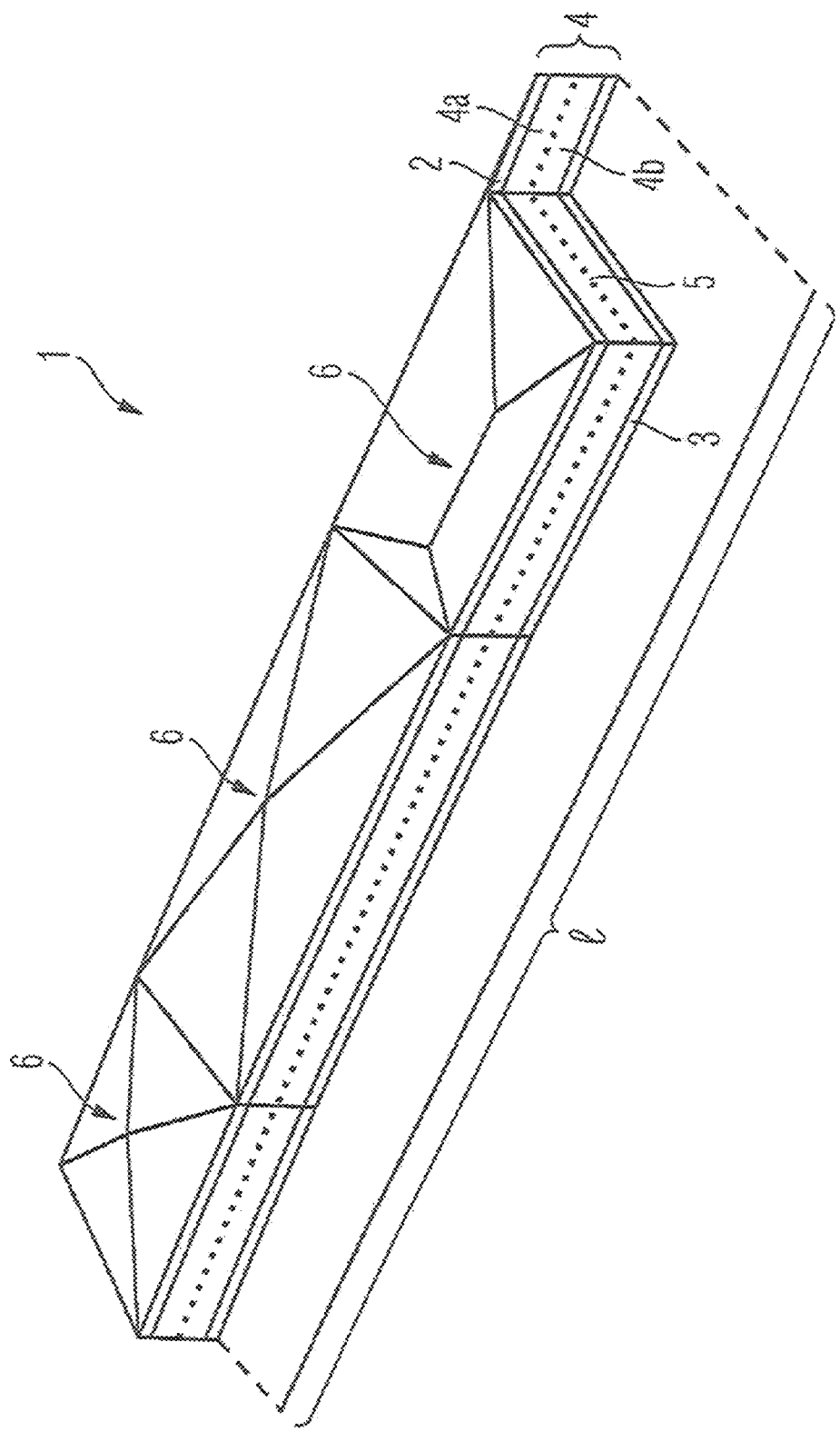
FIGS. 22 to 24e relate to the fifth aspect of the present.

Fifth Aspect of the Invention According to the FIGS. 22 to 24E:

The plastic composite cover 1 of the fifth aspect, as shown in FIG. 22, is intended for use in a motor vehicle that is not shown, and is disposed, for example, in a dashboard or a center console that is part of the vehicle, and serves for covering a backlighted function display in a visually attractive manner. The plastic composite cover 1 has an elongated configuration and, in proportion to its thickness, which is defined by the maximum distance of the two films from each other, as described below, has a maximum extent in the longitudinal direction defined by the elongated shape that is several times greater. Its maximum extent, with respect to the interface 5, is marked with 1. It has a layer structure consisting of a first transparent plastic film 2 defining the surface facing towards the vehicle occupant. A first layer 4a consisting of a first transparent thermoplastic material is located thereunder, adjacent to the first plastic film 2 and connected thereto by substance-to-substance connection. On its side facing away from the vehicle occupant, the first layer 4a forms an interface 5 to which a second layer 4b consisting of a second transparent thermoplastic material is adjacent in order to form a joint layer 4. The second plastic film 3 located at the rear as seen from the vehicle occupant is adjacent to the second layer 4b and is connected thereto by substance-to-substance connection. The second plastic film is metallized in order to be translucent in some areas, while an opaque printing that depicts a symbol or pictogram is also partially provided in order to realize a function display.

The first and the second thermoplastic material have a matching composition and matching properties. Due to the production process, the first 4a and second layers 4b are moreover connected by substance-to-substance connection in the region of the interface 5. Thus, the interface 5 does not appear as such, at least to the naked eye. The first film 3, the interface 5 and the second film 3 have "prism-like" contours 6 that result from the fact that they are configured to be three-dimensional and have contours 6 formed from surfaces that are placed at an angle relative to each other and converge at straight edges.

Figure 23:
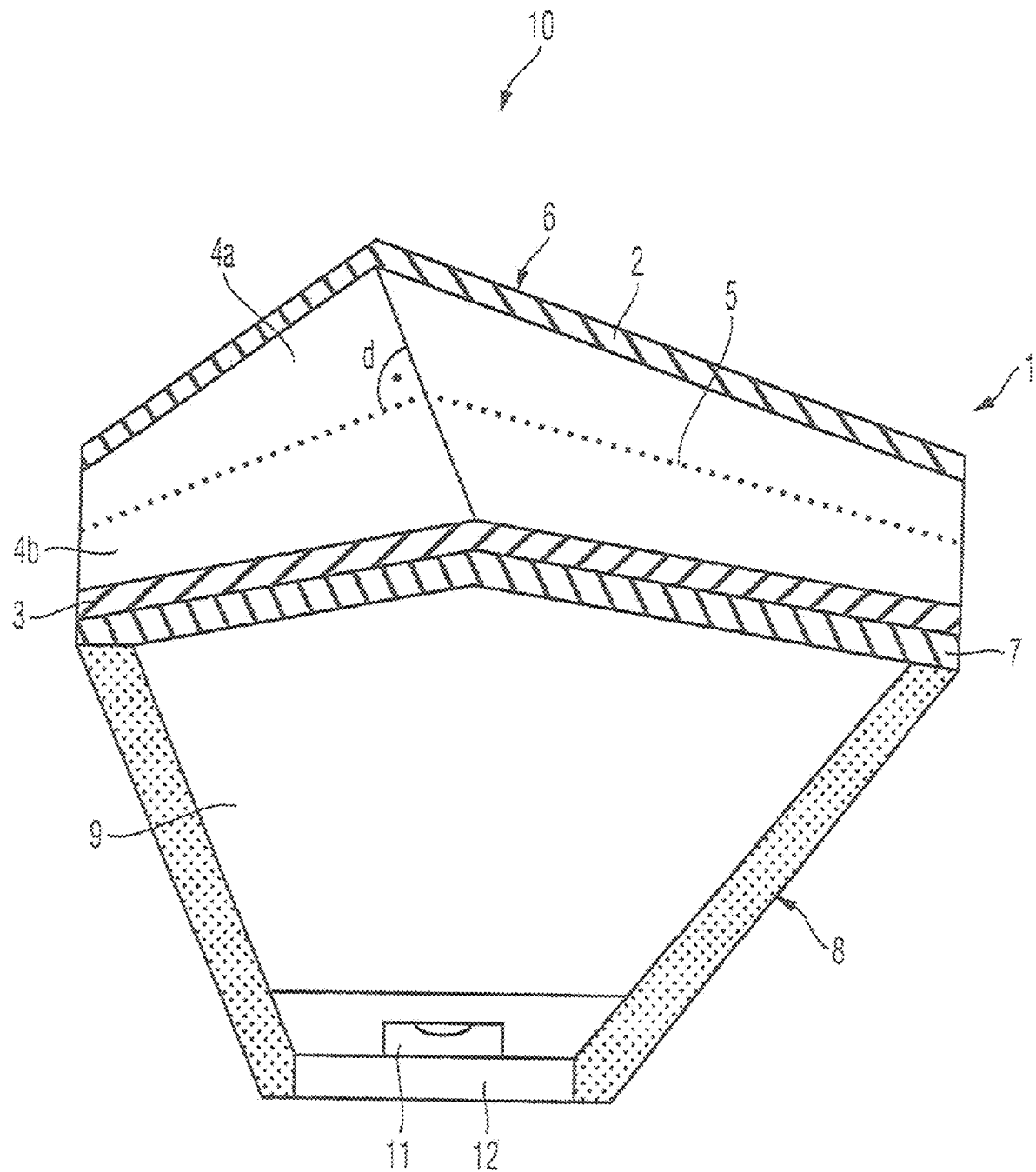

FIG. 23 shows an assembly 10 according to the invention consisting of the plastic composite cover 1 shown in FIG. 22 and a lighting means 11. The lighting means 11 is an LED with an SMD design mounted on a circuit board 12 and disposed on the side of the plastic composite cover 1 facing away from the vehicle occupant, in order to couple light into the plastic composite cover 1 via a diffuser layer 7 and the second plastic film 3, wherein the side of the second plastic film 3 facing away from the vehicle occupant defines the light-entry surface. In order to avoid unwanted scattered light, the lighting means 11 is disposed in a light channel 9 sealed laterally by the walls 8.

FIG. 23 shows that a maximum distance d determined by means of a perpendicular on the interface 5 is determined between the first plastic film 2 and the second plastic film 3 and, according to the invention, is smaller by at least 10 times, than the maximum extent of the interface 5.

Figure 24A:
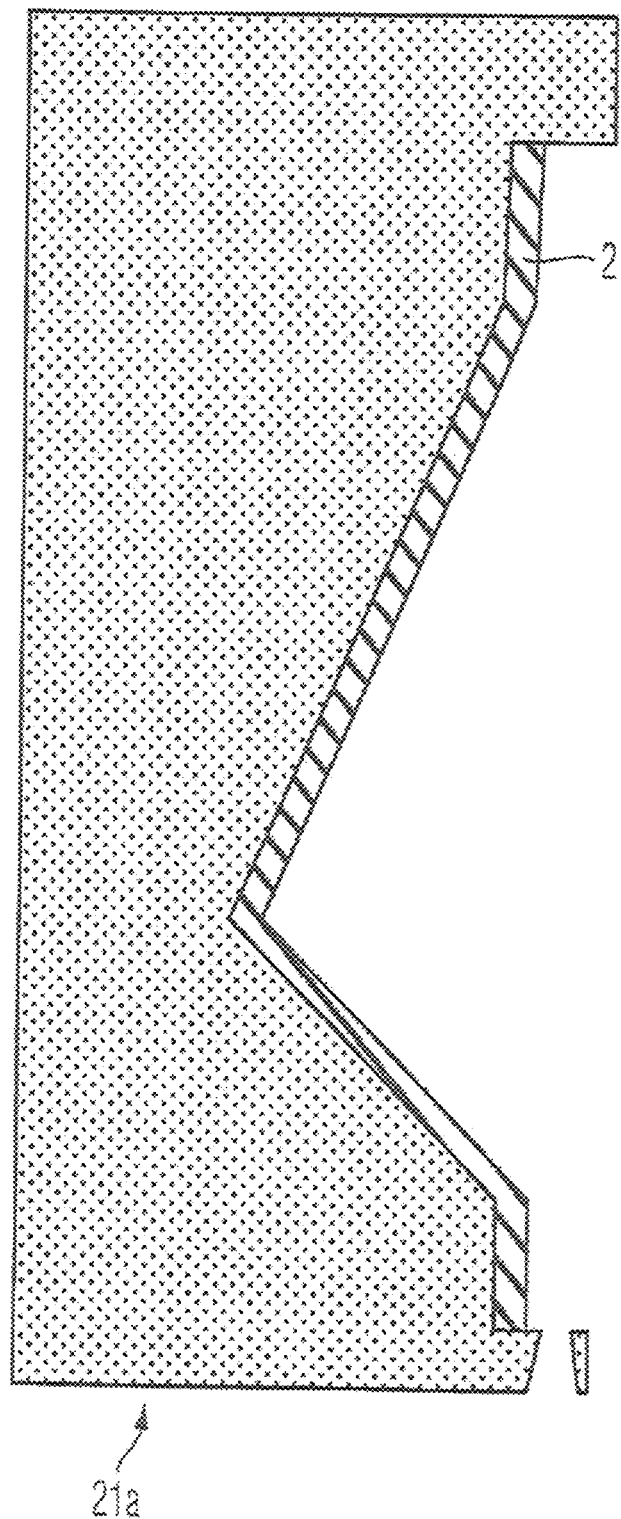
FIGS. 24a-c show the initial, final and intermediate states, respectively, of the method of the present invention for producing the plastic composite cover from FIG. 22.
Figure 24B:
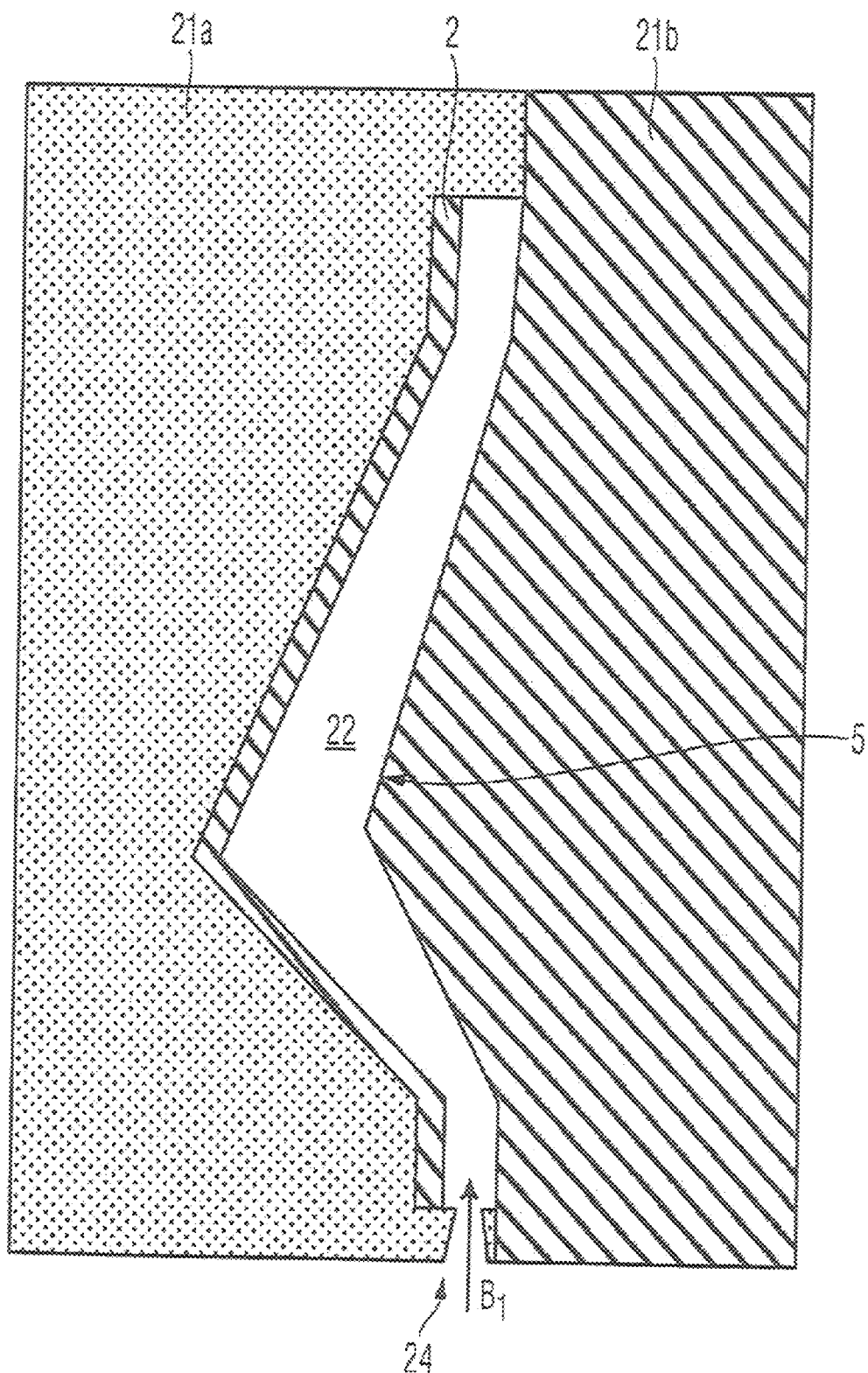

FIGS. 24a to 3e explain an embodiment of the method of the invention for producing a plastic composite cover 1 with a layer structure 2, 3, 4, in particular for a motor vehicle. FIG. 24a shows a first transparent plastic film 2 being disposed in a part 21a of a first molding tool 21a. 21b. FIG. 24b shows the completion of the first molding tool 21, 21b, so that a first cavity 22 is formed between the first plastic film 2 and the first molding tool 21a, 21b. As already indicated in FIG. 24b, the first plastic film 2 is subsequently back-molded, via the feed portion 24, in a first thermal molding method step while introducing a first thermoplastic material into the first cavity 22, so that a partial layer structure 2, 4a is produced as a molded article. As FIG. 24b shows, the feed direction B1 is substantially parallel to the adjacent interface 5. The partial layer structure 2, 4a is formed by the first plastic film 2 and a first layer 4a formed by the first thermoplastic material. In this case, the first layer 4a, on the side facing away from the first plastic film 2, forms an outer interface 5 that constitutes an outer surface of the partial layer structure 2, 4a but at the same time serves for stacking up further layers to form the layer structure forming the plastic composite cover.

Figure 24C:
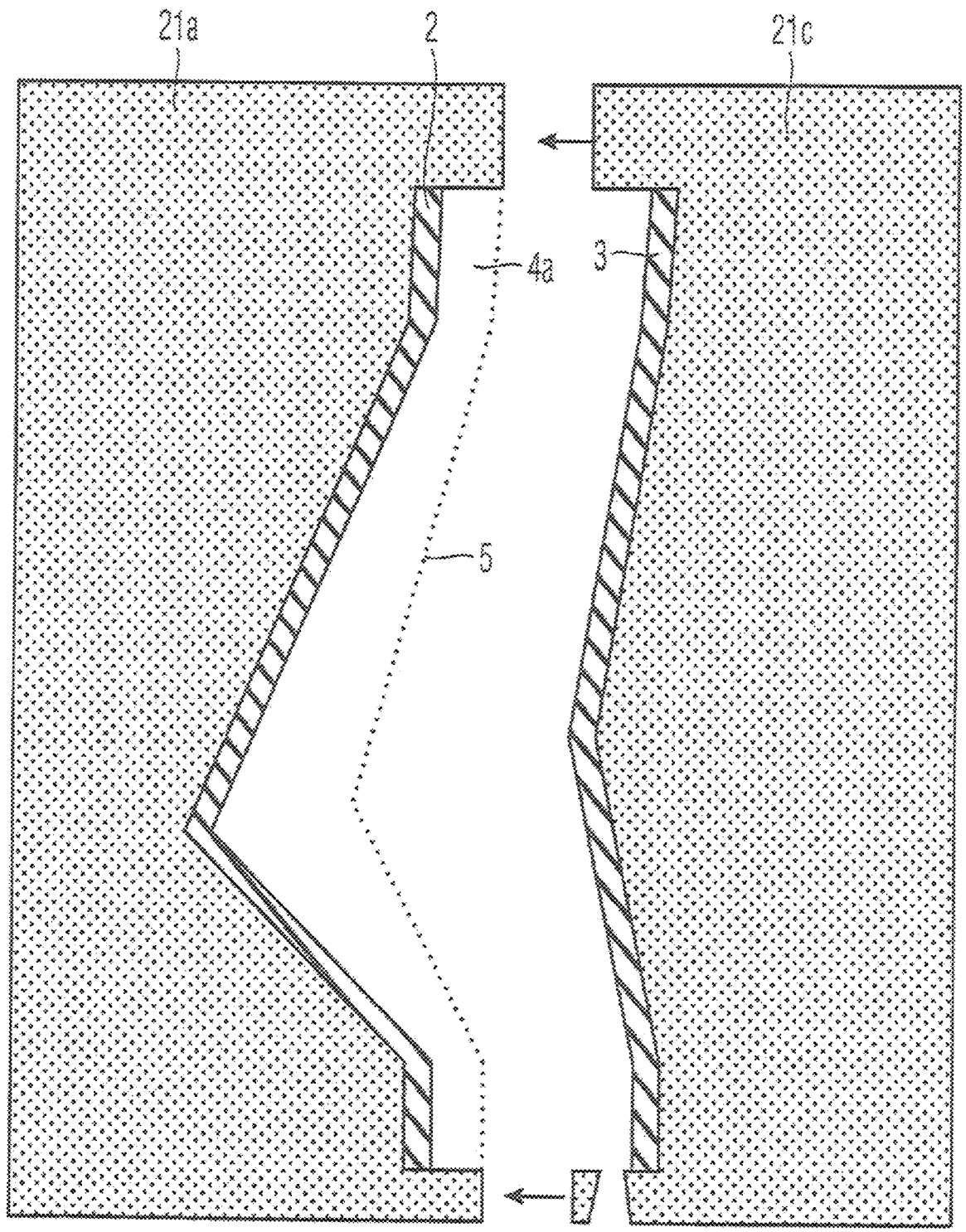
Figure 24D:
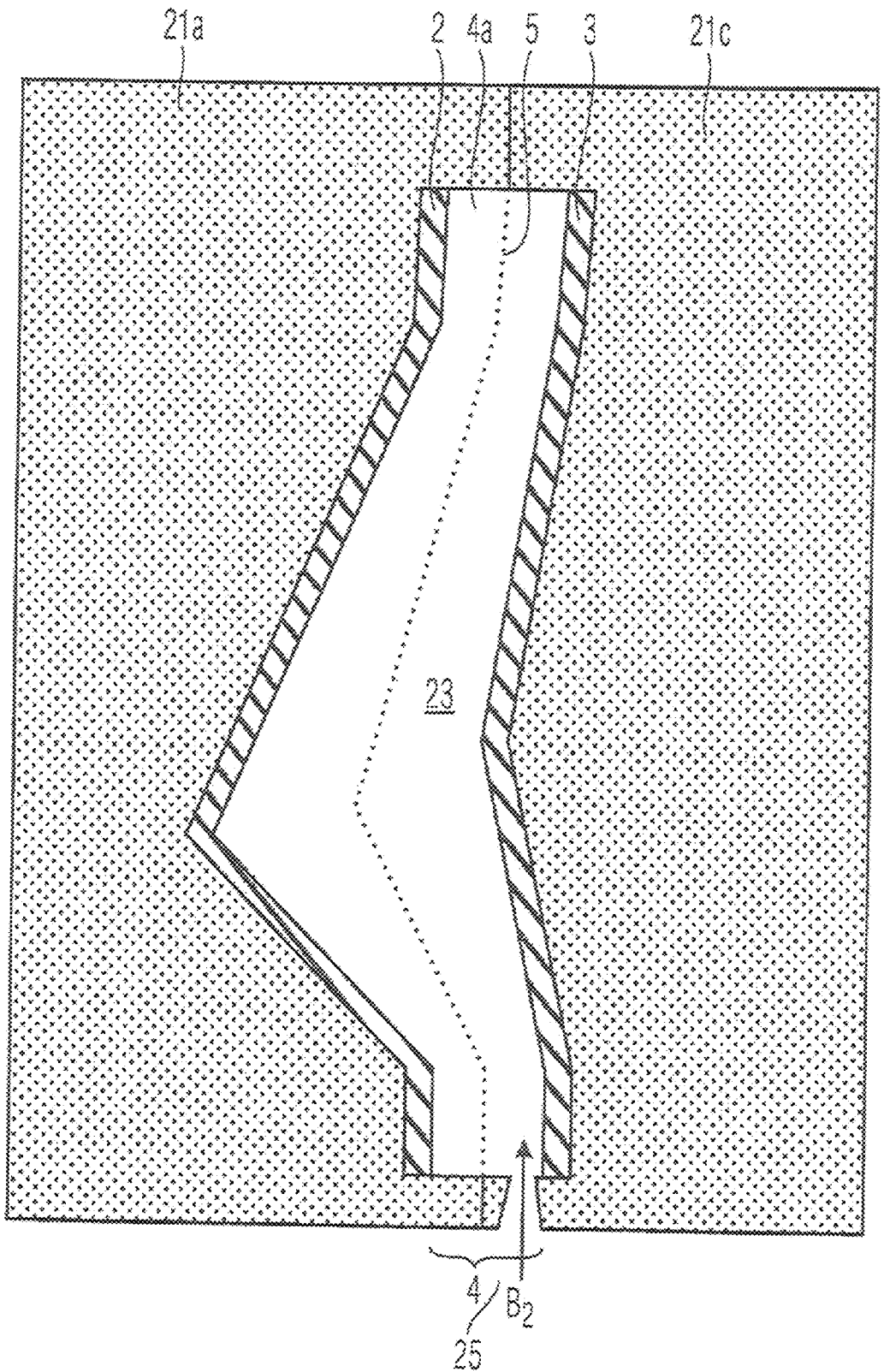
Figure 24E:
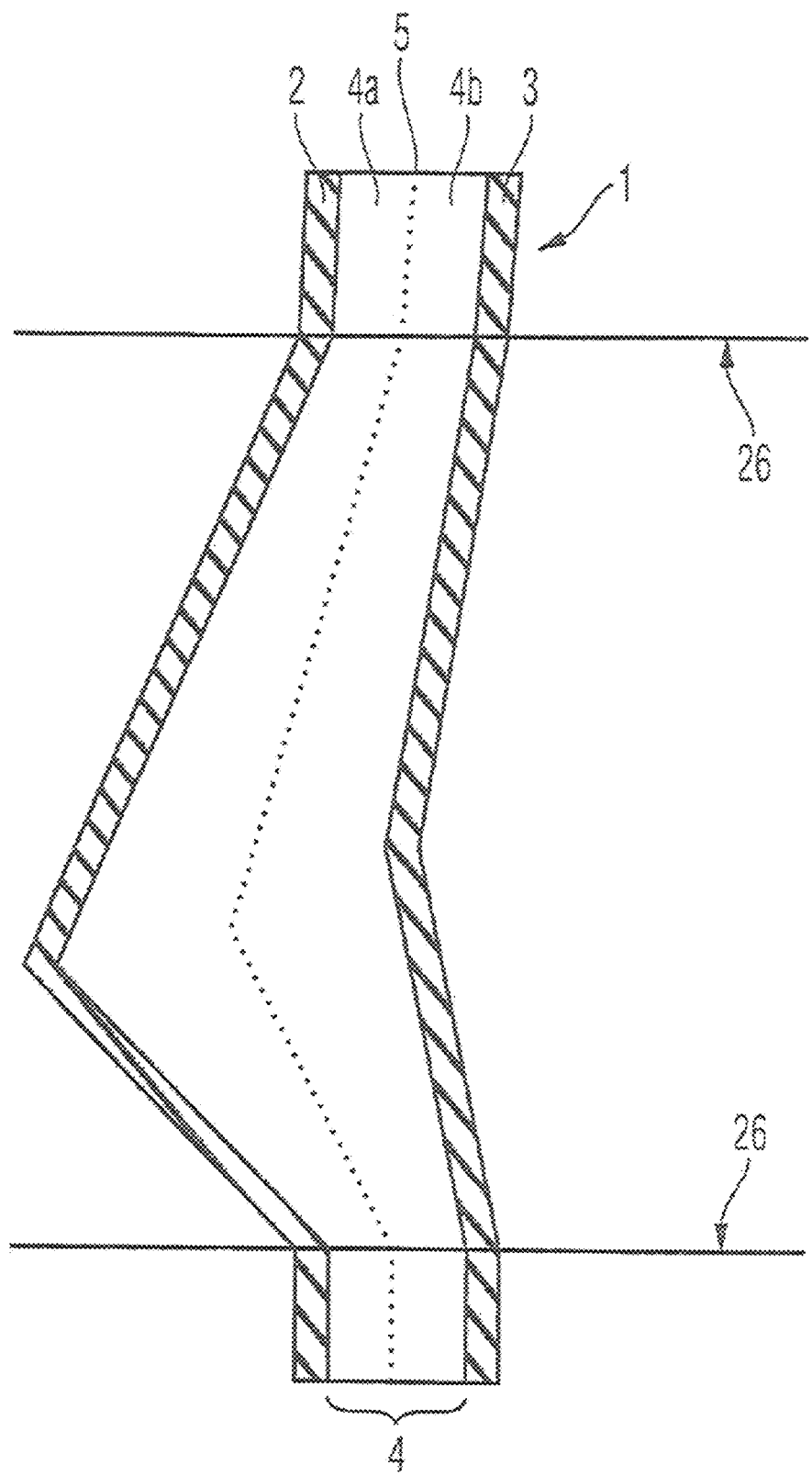

In a subsequent step, the partial layer structure 2, 4a is at least partially demolded by the part 21b being removed. In a subsequent step shown in FIG. 24c, the partial layer structure 2, 4a and a second plastic film 3 are subsequently disposed in a second molding tool 21a, 21c while forming a second cavity 23 formed between the interface 5 and the second plastic film 3, as FIG. 24c shows. Subsequently, the second plastic film 3 is back-molded in a second thermal molding method step while introducing a second thermoplastic material into the second cavity 23 via the feed 25. Also in this case, the feed direction B2 is substantially parallel to the adjacent interface 5. Thus, a second layer 4b of the second thermoplastic material as well as the second plastic film 3 are added to the partial layer structure 2, 4a, in order to obtain a layer structure 2, 3, 4 as a plastic composite cover 1 in which the first layer 4a and the second layer 4b are disposed, adjacent to each other at the common interface 5, between the first plastic film 2 and the second plastic film 3. In a subsequent step, the plastic composite cover 1 is demolded.

The present invention is not limited to embodiments described herein; reference should be had to the appended claims. It is thereby noted that the features cited individually in the claims can be combined with each other in any technologically meaningful manner and with the other respective embodiments of the present invention. The description, in particular in connection with the drawings, additionally characterizes and specifies the present invention.

What is claimed is:

1. A method for producing a plastic composite panel which is provided as a layer structure, the method comprising:
   providing a film layer structure comprising,
      at least one adhesive layer which is made from an adhesive which is not fully solidified and which is transparent at least in a solidified state, and
      at least two transparent plastic films comprising at least one first outer plastic film and a second inner plastic film, at least the second inner plastic film of the at least two transparent plastic films being translucently metallized,
      wherein the at least one adhesive layer is arranged between the at least two transparent plastic films so as to connect the at least two transparent plastic films over an entire extent of each of the adhesive layer and each of the at least two transparent plastic films and to provide a first main surface and a second main surface which is arranged opposite to the first main surface;
   pre-molding the film layer structure so that the film layer structure assumes a shape which approximates a final shape;
   providing a molding tool comprising a molding surface and a surface which is arranged opposite to the molding surface, the molding surface being arranged to form a plurality of three-dimensional contours formed from planar surfaces that are arranged at an angle with respect to each other and which adjoin each other in a straight edge;

arranging the pre-molded film layer structure in the molding tool so that the first main surface of the film layer structure is towards the molding surface of the molding tool and so that a cavity is formed between the second main surface of the film layer structure and the surface of the molding tool; and then back-molding the film layer structure in a thermal molding method step while introducing a thermoplastic material which is transparent at least in a rigid state into the cavity so as to provide the layer structure as a molded article, wherein an adjacent arrangement of the first main surface of the film layer structure to the molding surface of the molding tool and a final shape of the film layer structure replicates the plurality of three-dimensional contours, so that the layer structure comprises the at least one first outer plastic film, the second inner plastic film, the at least one adhesive layer between the at least one first outer plastic film and the second inner plastic film, and a thermoplastic layer arranged adjacent to the second main surface of the film layer structure which is formed by the thermoplastic material;

solidifying the at least one adhesive layer during at least one of the pre-molding and the back-molding so as to stabilize the film layer structure to correspond to the molding surface;

rigidifying the thermoplastic layer; and demolding the layer structure.

2. The method as recited in claim 1, wherein,
the adhesive of the at least one adhesive layer is a thermosetting adhesive, and
a temperature of the adhesive during the back-molding is set by selecting at least one of a temperature of the thermoplastic material and a temperature of the molding tool so as to achieve a solidification of the adhesive and thereby the solidification of the at least one adhesive layer.

3. The method as recited in claim 1, further comprising:
arranging an additional plastic film in the molding tool adjacent to the molding tool so that the cavity is formed between the additional plastic film and the second main surface of the film layer structure and the additional plastic film is an outer plastic film of the layer structure obtained.

4. The method as recited in claim 1, wherein, after the demolding of the layer structure, the method further comprises:
coating the layer structure with a casting resin in a cast molding step so as to form a casting resin layer which is arranged adjacent to the thermoplastic layer.

5. The method as recited in claim 4, wherein the casting resin is a polyurethane-containing casting resin.

6. The method as recited in claim 1, wherein each of the at least two transparent plastic films of the film layer structure are formed from a thermoplastic material.

7. The method as recited in claim 1, wherein at least one of the at least two transparent plastic films of the film layer structure comprises a coat of a transparent paint.

8. The method as recited in claim 1, wherein the pre-molding is provided as at least one of a thermal forming and an isostatic high-pressure forming of the film layer structure.

9. The method as recited in claim 1, wherein each edge of the molding surface comprises a curvature comprising a radius for finally shaping the first main surface of the film layer structure of less than 0.1 mm.

10. The method as recited in claim 9, wherein,
the pre-molding is performed in a pre-molding tool which comprises a pre-molding surface,
the pre-molding tool is either edge-free or comprises pre-edges which are arranged at locations which correspond to the edges of the molding surface, and
each of the pre-edges of the pre-molding tool comprises a curvature comprising a radius which is greater than the radius of the curvature of the edges of the molding surface corresponding thereto.

11. The method as recited in claim 10, wherein,
the film layer structure comprises a thickness, and
the pre-edges are configured so that, subsequent to the pre-molding of the film layer structure, the first main surface of the film layer structure will have a curvature comprising a radius which corresponds to at least the thickness of the film layer structure at a location corresponding to the edges.

12. The method as recited in claim 11, wherein the radius of the curvature of the film layer structure corresponds to at least twice the thickness of the film layer structure.

13. The method as recited in claim 1, wherein,
the film layer structure comprises a maximum extent,
the layer structure comprises a minimum dimension, and
the maximum extent of the film layer structure is at least 10 times greater than the minimum dimension of the layer structure.

* * * * *